US012654939B2

(12) United States Patent
    Cogley et al.

(10) Patent No.: US 12,654,939 B2
(45) Date of Patent: Jun. 16, 2026

(54) GRID FRAMEWORK STRUCTURE

(71) Applicant: Ocado Innovation Limited, Hatfield (GB)

(72) Inventors: William James Cogley, Hatfield (GB); Benjamin Arthur Portnoy Noar, Hatfield (GB); Stephen Millward, Hatfield (GB); Shafayet Rabby, Hatfield (GB); Nathan Gilson, Hatfield (GB); Andrew Ingram-Tedd, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 559 days.

(21) Appl. No.: 18/041,516

(22) PCT Filed: Aug. 12, 2021

(86) PCT No.: PCT/EP2021/072547
    § 371 (c)(1),
    (2) Date: Feb. 13, 2023

(87) PCT Pub. No.: WO2022/034195
    PCT Pub. Date: Feb. 17, 2022

(65) Prior Publication Data
    US 2023/0303326 A1    Sep. 28, 2023
    US 2025/0066120 A9    Feb. 27, 2025

(30) Foreign Application Priority Data

Aug. 14, 2020    (GB) ...................................... 2012740
  Aug. 14, 2020    (GB) ...................................... 2012751
                  (Continued)

(51) Int. Cl.
    *B65G 1/06*        (2006.01)
    *B61B 13/00*     (2006.01)

(52) U.S. Cl.
    CPC .............. *B65G 1/065* (2013.01); *B61B 13/00* (2013.01)

(58) Field of Classification Search
    CPC ........ B66F 9/07577; B66F 9/07; B66F 9/063; B65G 1/18; B65G 1/065; B65G 1/0464; B65G 1/0457; B65G 1/0407; B61B 13/00
    See application file for complete search history.

(56) References Cited

U.S. PATENT DOCUMENTS 3,022,980 A    2/1962  Barker
10,660,438 B2    5/2020  Hognaland et al.
                  (Continued)

FOREIGN PATENT DOCUMENTS

CA        3080839 A1    5/2019
CN      103612882 A    3/2014
                  (Continued)

OTHER PUBLICATIONS

First Office Action issued on Apr. 16, 2024, by the Japanese Patent Office in corresponding Japanese Patent Application No. 2023-510416, and an English Translation of the Office Action. (8 pages).
                  (Continued)

*Primary Examiner* — Glenn F Myers
(74) *Attorney, Agent, or Firm* — Buchanan Ingersoll & Rooney PC

(57) ABSTRACT

A grid framework structure configured to support one or more robotic load handling devices includes: a grid structure having a first set of parallel grid members extending in a first direction and a second set of parallel grid members extending in a second direction to form a grid pattern of grid cells; a track system; and a supporting framework structure for supporting the grid structure above ground to create a storage space for containers such that load handling devices can lift containers through a grid cell; wherein: the support-
                  (Continued)

ing framework structure includes a plurality of prefabricated modular panels.

32 Claims, 36 Drawing Sheets

(30) Foreign Application Priority Data

| | | |
|---|---|---|
| Oct. 9, 2020 | (GB) ..................................... | 2016081 |
| Oct. 9, 2020 | (GB) ..................................... | 2016097 |
| Jul. 1, 2021 | (GB) ..................................... | 2109567 |

(56) References Cited

U.S. PATENT DOCUMENTS

| | | | |
|---|---|---|---|
| 12,404,100 B2 | 9/2025 | Parks et al. | |
| 2004/0182025 A1 | 9/2004 | Moutsokapas et al. | |
| 2006/0003667 A1 | 1/2006 | Aisenbrey | |
| 2008/0075566 A1 | 3/2008 | Benedict et al. | |
| 2008/0213073 A1 | 9/2008 | Benedict et al. | |
| 2013/0343844 A1 | 12/2013 | Fosnight et al. | |
| 2016/0145058 A1 | 5/2016 | Lindbo | |
| 2017/0305668 A1 | 10/2017 | Bestic et al. | |
| 2017/0355524 A1 | 12/2017 | Hognaland | |
| 2018/0035625 A1 | 2/2018 | Lindbo et al. | |
| 2018/0037411 A1 | 2/2018 | Lindbo et al. | |
| 2018/0044110 A1 | 2/2018 | Clarke et al. | |
| 2018/0044111 A1 | 2/2018 | Clarke et al. | |
| 2018/0050869 A1 | 2/2018 | Lindbo et al. | |
| 2018/0051459 A1 | 2/2018 | Clarke et al. | |
| 2018/0086559 A1 | 3/2018 | Lindbo et al. | |
| 2018/0086573 A1 | 3/2018 | Lindbo | |
| 2018/0093828 A1 | 4/2018 | Lindbo et al. | |
| 2018/0148259 A1* | 5/2018 | Gravelle .................. | B65G 1/04 |
| 2018/0160150 A1 | 6/2018 | Wu et al. | |
| 2018/0194571 A1 | 7/2018 | Fryer et al. | |
| 2018/0237221 A1 | 8/2018 | Lindbo et al. | |
| 2019/0019707 A1 | 1/2019 | Suzuki | |
| 2019/0161273 A1 | 5/2019 | Ingram-tedd et al. | |
| 2019/0233213 A1 | 8/2019 | Phan-quiroga et al. | |
| 2019/0239640 A1 | 8/2019 | Lert et al. | |
| 2019/0241362 A1 | 8/2019 | Lindbo et al. | |
| 2019/0322452 A1* | 10/2019 | Austrheim ........... | B65G 1/1373 |
| 2020/0031575 A1* | 1/2020 | Hognaland ................ | B25J 5/02 |
| 2020/0042563 A1 | 2/2020 | Hognaland | |
| 2020/0130934 A1 | 4/2020 | Clarke et al. | |
| 2020/0140196 A1* | 5/2020 | Clarke ...................... | E04B 1/94 |
| 2020/0148471 A1 | 5/2020 | Lindbo et al. | |
| 2020/0208395 A1 | 7/2020 | Hall et al. | |
| 2020/0231381 A1 | 7/2020 | Lindbo et al. | |
| 2020/0318338 A1 | 10/2020 | Austrheim | |
| 2020/0343118 A1 | 10/2020 | Torazawa et al. | |
| 2020/0361707 A1 | 11/2020 | Lindbo et al. | |
| 2020/0391942 A1 | 12/2020 | Lindbo et al. | |
| 2021/0169219 A1 | 6/2021 | Lert et al. | |
| 2021/0179355 A1 | 6/2021 | Heggebøet al. | |
| 2021/0309459 A1 | 10/2021 | Clarke et al. | |
| 2023/0303323 A1 | 9/2023 | Millward et al. | |
| 2023/0303325 A1 | 9/2023 | Kirby et al. | |
| 2023/0303327 A1 | 9/2023 | Malinowski et al. | |
| 2024/0010425 A1 | 1/2024 | Noar et al. | |

FOREIGN PATENT DOCUMENTS

| | | | |
|---|---|---|---|
| CN | 111139939 A | 5/2020 | |
| CN | 211365948 U | 8/2020 | |
| CN | 109230155 B | 2/2021 | |
| DE | 202013007058 U1 | 11/2014 | |
| EP | 0081960 A1 | 6/1983 | |
| EP | 1116683 A1 | 7/2001 | |
| EP | 3017932 A1 | 5/2016 | |
| GB | 2012740 A | 8/1979 | |
| GB | 2013968 A | 8/1979 | |
| GB | 2016081 A | 9/1979 | |
| GB | 2016097 A | 9/1979 | |
| GB | 2554109 A | 3/2018 | |
| GB | 2594559 A | 11/2021 | |
| GB | 2594560 A | 11/2021 | |
| JP | 3025818 B2 | 6/1996 | |
| JP | 2000233812 A | 8/2000 | |
| JP | 2003253797 A | 9/2003 | |
| JP | 2004091095 A | 3/2004 | |
| JP | 2019507714 A | 3/2019 | |
| JP | 2020519551 A | 7/2020 | |
| JP | 2023512658 A | 3/2023 | |
| NO | 343387 B1 | 2/2019 | |
| NO | 20200118 A1 | 8/2021 | |
| WO | 2014195901 A1 | 12/2014 | |
| WO | 2015019055 A1 | 2/2015 | |
| WO | 2015185628 A2 | 12/2015 | |
| WO | 2016029205 A1 | 2/2016 | |
| WO | 2016063197 A1 | 4/2016 | |
| WO | 2016166294 A1 | 10/2016 | |
| WO | 2016172793 A1 | 11/2016 | |
| WO | 2016193767 A1 | 12/2016 | |
| WO | 2017081281 A1 | 5/2017 | |
| WO | 2017122150 A1 | 7/2017 | |
| WO | 2017153583 A1 | 9/2017 | |
| WO | 2017220651 A1 | 12/2017 | |
| WO | 2018049441 A1 | 3/2018 | |
| WO | 2018106358 A2 | 6/2018 | |
| WO | 2018146304 A1 | 8/2018 | |
| WO | 2018210952 A1 | 11/2018 | |
| WO | 2019032651 A1 | 2/2019 | |
| WO | 2019087618 A1 | 5/2019 | |
| WO | 2019094511 A1 | 5/2019 | |
| WO | 2019101367 A1 | 5/2019 | |
| WO | 2019101725 A1 | 5/2019 | |
| WO | 2019157197 A1 | 8/2019 | |
| WO | 2019238702 A1 | 12/2019 | |
| WO | 2020074257 A1 | 4/2020 | |
| WO | 2020092149 A1 | 5/2020 | |
| WO | 2020094339 A1 | 5/2020 | |
| WO | 2020224828 A1 | 11/2020 | |
| WO | 2021152170 A1 | 8/2021 | |
| WO | 2021175873 A1 | 9/2021 | |
| WO | 2022048973 A1 | 3/2022 | |

OTHER PUBLICATIONS

Office Action (Examination Report No. 1) issued on Jan. 15, 2024, by the Australian Patent Office in corresponding Australian Patent Application No. 2021325730. (4 pages).

Office Action issued on Dec. 30, 2024, by the U.S. Patent and Trademark Office in co-pending U.S. Appl. No. 18/041,530. (12 pages).

Office Action issued on Jun. 3, 2024, by the Canadian Patent Office in corresponding Canadian Patent Application No. 3,191,155. (8 pages).

Office Action issued on Jun. 3, 2024, by the Canadian Patent Office in corresponding Canadian Patent Application No. 3,191,324. (4 pages).

Office Action issued on Jun. 4, 2024, by the Canadian Patent Office in corresponding Canadian Patent Application No. 3,190,958. (4 pages).

The extended European Search Report issued on Jun. 14, 2024, by the European Patent Office in corresponding European Application No. 24164309.7. (11 pages).

International Search Report (PCT/ISA/210) and Written Opinion (PCT/ISA/237) mailed on Nov. 11, 2021, by the European Patent Office as the International Searching Authority for International Application No. PCT/EP2021/072532. (20 pages).

International Search Report (PCT/ISA/210) and Written Opinion (PCT/ISA/237) mailed on Nov. 12, 2021, by the European Patent Office as the International Searching Authority for International Application No. PCT/EP2021/072547. (20 pages).

International Search Report (PCT/ISA/210) and Written Opinion (PCT/ISA/237) mailed on Nov. 30, 2021, by the European Patent Office as the International Searching Authority for International Application No. PCT/EP2021/072539. (14 pages).

(56)                    References Cited

OTHER PUBLICATIONS

International Search Report (PCT/ISA/210) and Written Opinion (PCT/ISA/237) mailed on Nov. 5, 2021, by the European Patent Office as the International Searching Authority for International Application No. PCT/EP2021/072538. (12 pages).

International Search Report (PCT/ISA/210) and Written Opinion (PCT/ISA/237) mailed on Nov. 8, 2021, by the European Patent Office as the International Searching Authority for International Application No. PCT/EP2021/072536. (13 pages).

Patents Act 1977: Combined Search and Examination Report under Sections 17 and 18(3) dated Feb. 4, 2022 issued by the United Kingdom Intellectual Property Office in Application No. GB2111578.7. (3 pages).

Patents Act 1977: Combined Search and Examination Report under Sections 17 and 18(3) dated Feb. 4, 2022 issued by the United Kingdom Intellectual Property Office in Application No. GB2111587.8. (2 pages).

Patents Act 1977: Combined Search and Examination Report under Sections 17 dated Feb. 8, 2022 issued by the United Kingdom Intellectual Property Office in Application No. GB2111607.4. (9 pages).

Patents Act 1977: Examination Report under Sections 18(3) dated Nov. 9, 2022 issued by the United Kingdom Intellectual Property Office in Application No. GB2111607.4. (5 pages).

Patents Act 1977: Search Report under Sections 17 dated Dec. 14, 2021 issued by the United Kingdom Intellectual Property Office in Application No. GB2109567.4. (1 page).

Patents Action 1977: Combined Search and Examination Report under Section 17 & 18(3) dated Feb. 4, 2022 issued by the United Kingdom Intellectual Property Office in Application No. GB2111597.7. (4 pages).

Patents Action 1977: Combined Search and Examination Report under Section 17 and 18(3) dated Feb. 8, 2023, issued by the United Kingdom Intellectual Property Office in Application No. GB2218269.5. (5 pages).

Patents Action 1977: Combined Search and Examination Report under Sections 17 & 18(3) dated Feb. 4, 2022 issued by the United Kingdom Intellectual Property Office in Application No. GB2111582.9. (5 pages).

Patents Action 1977: Search Report under Section 17 dated Feb. 1, 2022 issued by the United Kingdom Intellectual Property Office in Application No. GB2111587.8. (1 page).

Patents Action 1977: Search Report under Section 17 dated Feb. 3, 2022 issued by the United Kingdom Intellectual Property Office in Application No. GB2111578.7. (2 pages).

Patents Action 1977: Search Report under Section 17(5) dated Feb. 15, 2021 issued by the United Kingdom Intellectual Property Office in Application No. GB2012751.0. (4 pages).

Patents Action 1977: Search Report under Section 17(5) dated Feb. 7, 2021 issued by the United Kingdom Intellectual Property Office in Application No. GB2012740.3. (3 pages).

Patents Action 1977: Search Report under Section 17(5) dated Jun. 16, 2021 issued by the United Kingdom Intellectual Property Office in Application No. GB2016081.8. (3 pages).

Patents Action 1977: Search Report under Section 17(5) dated May 20, 2021 issued by the United Kingdom Intellectual Property Office in Application No. GB2016097.4. (4 pages).

Office Action (Examination Report No. 1) issued on Jun. 7, 2024, by the Australian Patent Office in corresponding Australian Patent Application No. 2021399015. (4 pages).

Office Action issued on Jun. 27, 2024, by the Canadian Patent Office in corresponding Canadian Patent Application No. 3,190,648. (6 pages).

Office Action issued on Jun. 28, 2024, by the Canadian Patent Office in corresponding Canadian Patent Application No. 3,190,629. (5 pages).

First Office Action issued on Feb. 13, 2024, by the Japanese Patent Office in corresponding Japanese Patent Application No. 2023-510417, and an English Translation of the Office Action. (6 pages).

First Office Action issued on Feb. 13, 2024, by the Japanese Patent Office in corresponding Japanese Patent Application No. 2023-510419, and an English Translation of the Office Action. (8 pages).

First Office Action issued on Mar. 19, 2024, by the Japanese Patent Office in corresponding Japanese Patent Application No. 2023-510421, and an English Translation of the Office Action. (10 pages).

Office Action (Examination Report No. 1) issued on Apr. 17, 2024, by the Australian Patent Office in corresponding Australian Patent Application No. 2021325368. (4 pages).

Office Action (Examination Report No. 1) issued on Apr. 4, 2024, by the Australian Patent Office in corresponding Australian Patent Application No. 2021324116. (4 pages).

Office Action (Examination Report No. 1) issued on Jan. 30, 2024, by the Australian Patent Office in corresponding Australian Patent Application No. 2021325729. (4 pages).

Office Action (Examination Report No. 1) issued on Mar. 22, 2024, by the Australian Patent Office in corresponding Australian Patent Application No. 2021324385. (4 pages).

Office Action issued on Mar. 13, 2025 by the Korean Patent Office in corresponding Korean Application No. 10-2023-7008138 (11 pages) corresponding to Applicant's U.S. Appl. No. 18/041,516.

Office Action issued on Apr. 30, 2025 by the European Patent Office in corresponding European Application No. 21762672.0 (13 pages) corresponding to Applicant's U.S. Appl. No. 18/041,516.

Office Action issued on Jul. 3, 2025 by the Canadian Patent Office in corresponding Canadian Application No. 3,191,324 (4 pages) corresponding to Applicant's U.S. Appl. No. 18/041,516.

Office Action issued on Dec. 26, 2025 by the Chinese Patent Office in corresponding Chinese Application No. 202180070364.5 (18 pages) corresponding to U.S. Appl. No. 18/041,516.

* cited by examiner

30

32

34

36

38

39

10

56

64

58

60

62

144

140

142

144

144

142

144

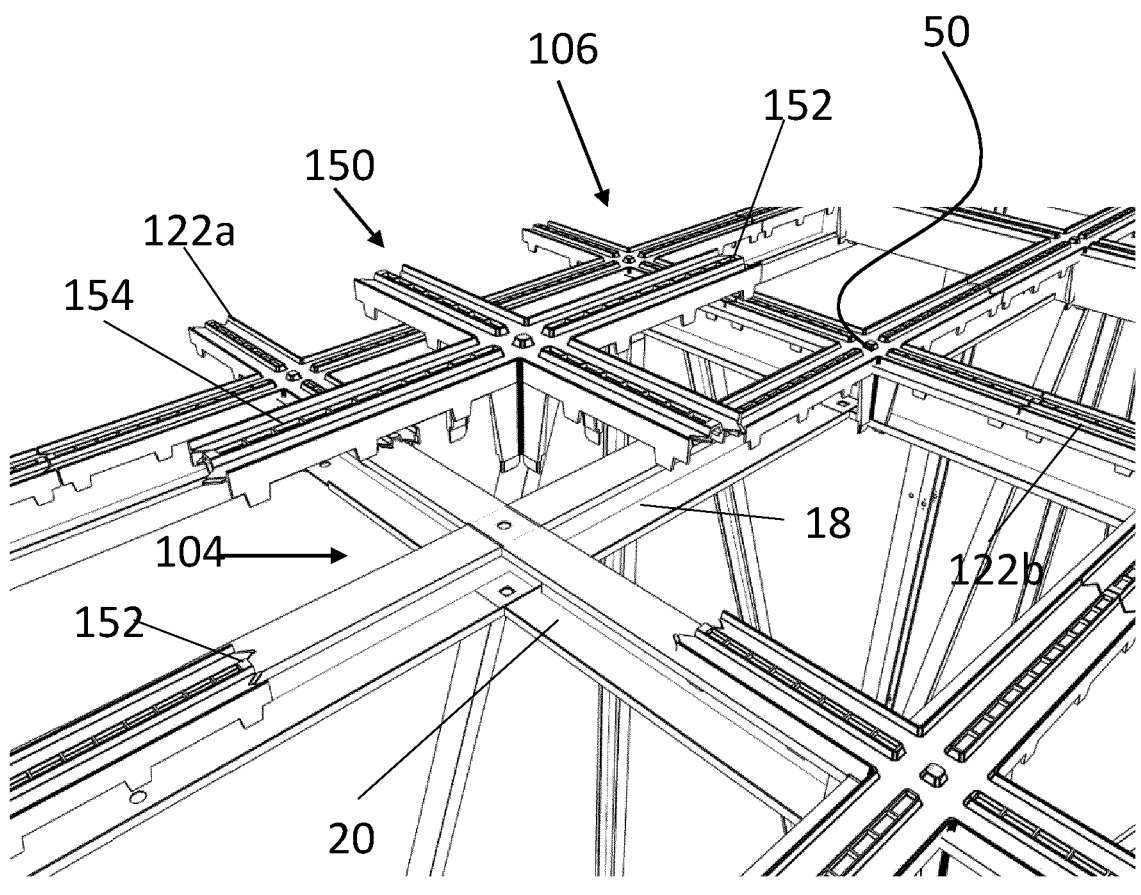
Figure 29
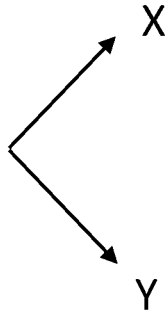

Corner Section

Peripheral Section

Central Section

182

108

184

180

186

108

182

180

102

102a

188

102

102a

190

102

102b

102a

GRID FRAMEWORK STRUCTURE

FIELD OF INVENTION

The present invention relates to the field of remotely operated load handling devices on tracks located on a grid framework structure for handling storage containers or bins stacked in the grid framework structure, more specifically to a grid framework structure for supporting remotely operated load handling devices.

BACKGROUND

Storage systems 1 comprising a three-dimensional storage grid framework structure, within which storage containers/bins/totes are stacked on top of each other, are well known. PCT Publication No. WO2015/185628A (Ocado) describes a known storage and fulfilment or distribution system in which stacks of bins or containers are arranged within a grid framework structure. The bins or containers are accessed by load handling devices remotely operative on tracks located on the top of the grid framework structure. A system of this type is illustrated schematically in FIGS. 1 to 3 of the accompanying drawings.

As shown in FIGS. 1 and 2, stackable containers, known as storage bins or containers 10, are stacked on top of one another to form stacks 12. The stacks 12 are arranged in a grid framework structure 14 in a warehousing or manufacturing environment. The grid framework structure is made up of a plurality of storage columns or grid columns. FIG. 1 is a schematic perspective view of the grid framework structure 14, and FIG. 2 is a top-down view showing a stack 12 of bins 10 arranged within the grid framework structure 14. Each bin 10 typically holds a plurality of product items (not shown), and the product items within a bin 10 may be identical, or may be of different product types depending on the application.

In detail, the grid framework structure 14 comprises a plurality of vertical uprights or upright members or upright columns 16 that support horizontal grid members 18, 20. A first set of parallel horizontal grid members 18 is arranged perpendicularly to a second set of parallel horizontal grid members 20 to form a grid structure or grid 15 comprising a plurality of grid cells 17. Each grid cell in the grid framework structure has at least one grid column for storage of a stack of containers. For the avoidance of doubt, the term "grid framework structure" is used to mean a three-dimensional structure within which the storage containers are stored, and the terms "grid structure" and "grid" are used interchangeably to mean the two-dimensional structure in a substantially horizontal plane upon which the load handling devices operate. The grid cell has an opening to allow a load handling device to lift a container or storage bin through the grid cell. In the grid structure, the first set of parallel horizontal grid members 18 intersect the second set of parallel horizontal grid members at nodes. The grid structure is supported by the upright members 16 at each of the nodes or at the point where the grid members intersect such that the upright members are interconnected at their tops ends by the intersecting grid members. The grid members 16, 18, 20 are typically manufactured from metal and typically welded or bolted together or a combination of both. The storage bins or containers 10 are stacked between the upright members 16 of the grid framework structure 14, so that the upright members 16 guard against horizontal movement of the stacks 12 of bins 10, and guide vertical movement of the storage bins 10.

The top level of the grid framework structure 14 includes rails or tracks 22 arranged in a grid pattern across the top of the stacks 12 to define a track system. Referring additionally to FIG. 3, the rails 22 support a plurality of load handling devices 30. The track system comprises a first set 22a of parallel rails 22 to guide movement of the robotic load handling devices 30 in a first direction (for example, an X-direction) across the top of the grid framework structure 14, and a second set 22b of parallel rails 22, arranged perpendicular to the first set 22a, to guide movement of the load handling devices 30 in a second direction (for example, a Y-direction), perpendicular to the first direction. In this way, the rails 22 allow movement of the robotic load handling devices 30 laterally in two dimensions in the horizontal X-Y plane, so that a load handling device 30 can be moved into position above any of the stacks 12.

The track or rail can be a separate component to the grid member (sometime referred to as a 'track support') or alternatively, the track is integrated into the grid member as a single body, i.e. forms part of the grid member. For example, each of the first and second sets of horizontal grid members 18, 20 of the grid structure can function as a track support and the first and second sets of tracks of the track system can be mounted to the grid structure for guiding the load handling devices in two dimensions on the grid structure.

A known load handling device otherwise known as a bot 30 shown in FIGS. 4 and 5 comprising a vehicle body 32 is described in PCT Patent Publication No. WO2015/019055 (Ocado), hereby incorporated by reference, where each load handling device 30 only covers a single grid space or grid cell of the grid framework structure 14. Here, the load handling device 30 comprises a wheel assembly comprising a first set of wheels 34 consisting of a pair of wheels on the front of the vehicle body 32 and a pair of wheels 34 on the back of the vehicle 32 for engaging with the first set of rails or tracks to guide movement of the device in a first direction, and a second set of wheels 36 consisting of a pair of wheels 36 on each side of the vehicle 32 for engaging with the second set of rails or tracks to guide movement of the device in a second direction. Each of the sets of wheels are driven to enable movement of the vehicle in X and Y directions respectively along the rails. One or both sets of wheels can be moved vertically to lift each set of wheels clear of the respective rails, thereby allowing the vehicle to move in the desired direction, e.g. X or Y direction on the grid structure.

The load handling device 30 is equipped with a lifting device or crane mechanism to lift a storage container from above. The crane mechanism comprises a winch tether or cable 38 wound on a spool or reel (not shown) and a grabber device 39 in the form of a lifting frame. The lifting device comprises a set of lifting tethers 38 extending in a vertical direction and connected nearby or at the four corners of the lifting frame 39, otherwise known as the grabber device (one tether near each of the four corners of the grabber device) for releasable connection to a storage container 10. The grabber device 39 is configured to releasably grip the top of a storage container 10 to lift it from a stack of containers in a storage system of the type shown in FIGS. 1 and 2.

The wheels 34, 36 are arranged around the periphery of a cavity or recess, known as a container-receiving recess or container receiving space 41, in the lower part. The recess is sized to accommodate the container 10 when it is lifted by the crane mechanism, as shown in FIG. 5 (a and b). When in the recess, the container is lifted clear of the rails beneath, so that the vehicle can move laterally to a different location. On reaching the target location, for example another stack, an access point in the storage system or a conveyor belt, the bin or container can be lowered from the container receiving portion and released from the grabber device. The container receiving space may comprise a cavity or recess arranged within the vehicle body, e.g. as described in WO 2015/ 019055 (Ocado Innovation Limited). Alternatively, the vehicle body of the load handling device may comprise a cantilever as taught in WO2019/238702 (Autostore Technology AS) in which case the container receiving space is located below a cantilever of the load handing device. In this case, the grabber device is hoisted by a cantilever such that the grabber device is able to engage and lift a container from a stack into a container receiving space below the cantilever.

To ensure stability of the grid framework structure, prior art storage systems are largely dependent on various supports and bracing arranged within or at least partly along the periphery of the grid framework structure. However, the use of various supports and bracing (anti-movement braces) to stabilise the grid framework structure from internal and external forces is disadvantageous for a number of reasons. The grid framework structure occupies space or area which could be utilised to store containers, in that it prevents optimum usage of available space or area for the storage of containers. The need of a supporting structure may limit the available options for positioning of the grid framework structure since any auxiliary grid supporting structure often requires connection to a surrounding structure such as the inner walls of a building. The requirement of a supporting structure to stabilise the grid framework structure is generally not cost efficient and occupies useful storage space.

WO2019/101367 (Autostore Technology AS) teaches a free-standing storage grid requiring a less extensive auxiliary grid supporting structure by integrating a grid supporting structure in the storage grid structure. The grid supporting structure is made up of four storage columns interconnected by multiple vertically inclined support struts. The storage column profiles have a cross-section comprising a hollow centre section and four corner sections, each corner section comprising two perpendicular bin guiding plates for accommodating a corner of a storage bin. The support struts have a width which allows them to fit in between two parallel guiding plates so as to not compromise the ability of the storage columns to accommodate a stack of containers or storage bins.

To erect the grid framework structure in the art, a plurality of vertical uprights are individually positioned one piece at a time in a grid-like pattern on the ground. The assembling of individual vertical uprights together one piece at a time is sometimes referred to as "stick-built" structures. The "stick-built" approach of the assembling the grid framework structure requires numerous time-consuming adjustments to be made for reliable operation of the robotic load handling devices on the tracks. The height of the vertical uprights and thus the level of the grid mounted thereon is adjusted by one or more adjustable feet at the base or bottom end of each of the vertical uprights. A sub-group of the vertical uprights are braced together to provide structural stability to the grid framework structure. The vertical uprights are interconnected at their top ends by grid members so that the grid members adopt the same grid pattern as the vertical uprights, i.e. the vertical uprights support the grid members at the point or node where each of the grid members intersect in the grid pattern. For the purpose of explanation of the present invention, the points or junctions where the grid members intersect or are interconnected constitute the nodes of the grid structure and correspond to the area where the grid structure is supported by a vertical upright. The resultant grid framework structure can be considered as a free standing rectilinear assemblage of upright columns supporting the grid formed from intersecting horizontal grid members, i.e. a four wall shaped framework.

The arrangement of the vertical uprights provides multiple vertical storage columns for the storage of one or more containers in a stack. The vertical uprights help to guide the grabber device of the lifting mechanism as the grabber device engages with a container within the grid framework structure and is lifted towards the load handling device operative on the grid. The size of the grid framework structure and thus the ability to store containers containing different items or stock keeping units (SKUs) is largely dependent on the number of vertical uprights spanning over a given footprint of the grid framework structure. However, one of the biggest bottlenecks in the building of a fulfilment or distribution centre is the erection of the grid framework structure. The time and cost to assemble the grid framework structure represents a huge proportion of the time and cost to build a fulfilment or distribution centre. The biggest and the most time consuming operation involves erecting the vertical uprights individually and fixing the grid structure to the vertical uprights.

WO2019/157197 (Alert Innovation Inc.) attempts to address this problem by providing an automated fulfilment system comprising a plurality of storage modules, wherein each storage module of the plurality of storage modules comprises a pair of shelf modules comprising a number of defined storage locations for storing containers otherwise known as totes. The pair of shelf modules are spaced apart from each other so as to allow a mobile robot to pass between the pair of shelf modules and retrieve or deliver inventory to storage locations. However, the automated storage system taught in WO2019/157197 (Alert Innovation Inc.) does not provide a dense storage system as taught in WO2015/185628A (Ocado) since the shelf modules takes up valuable storage space.

A grid framework structure is thus required that allows the grid framework structure to be erected quicker and/or cheaper than current grid framework structures in the art. Moreover, the grid framework structure should also maximise the available space or area for the storage of multiple containers.

This application claims priority from GB patent application numbers GB2012740.3 filed 14Aug. 2020, GB2012751.0 filed 14Aug. 2020, GB2016081.8 filed 9Oct. 2020, and GB2016097.4 filed 9Oct. 2020, the contents being herein incorporated by reference.

SUMMARY OF INVENTION

The present applicant has mitigated the above problem by forming the grid framework structure from fewer structural components than is currently practised as described above, yet still maintaining the same structural integrity as the existing grid framework structure for bearing the weight of one or more robotic load handling devices (which can weigh as much as 150 kg) operative on the grid framework structure. In contrast to the existing grid framework structure as described above, the grid framework structure according to the present invention is erected from a plurality of prefabricated modular components. More specifically, the present invention provides a grid framework structure configured to support one or more robotic load handling devices thereupon, said grid framework structure comprising:

i) a grid structure lying in a horizontal plane, said grid structure comprising a first set of parallel grid members extending in a first direction and a second set of parallel grid members extending in a second direction, the second direction being substantially perpendicular to the first direction such that the first and second set of parallel grid members are arranged in a grid pattern comprising a plurality grid cells or grid spaces;

ii) a track system mounted to the grid structure, the track system comprising a plurality of tracks arranged in the grid pattern of the grid structure, ii) a supporting framework structure for supporting the grid structure above the ground to create a storage space for the storage of one or more containers in a stack such that, in use, one or more load handling devices operative on the track system is able to lift one or more containers through a grid cell from a stack below the grid structure, characterised in that:

the supporting framework structure comprises a plurality of prefabricated modular panels, said prefabricated modular panels being arranged in a three dimensional grid pattern comprising a first set of parallel prefabricated modular panels extending in the first direction and a second set of parallel prefabricated modular panels extending in the second direction to define a plurality of grid cells.

To achieve a three dimensional grid pattern of the supporting framework structure, each of the prefabricated modular components is planar—hence, the prefabricated modular components can also be known as prefabricated modular panels.

The grid members form a track support to which is mounted a track. Thus, the grid structure can be defined as a first set of parallel track supports extending in a first direction and a second set of parallel tracks extending in a second direction, the second direction being substantially perpendicular to the first direction such that the first and second sets of parallel track supports are arranged in a grid pattern comprising a plurality of grid cells or grid spaces. The track support making up the grid structure in transverse cross section can be a solid support of C-shaped or U-shaped or I-shaped cross section, or even a double-C or double-U shaped support. The grid structure is supported on a supporting framework structure comprising a plurality of vertical uprights forming multiple storage columns. In comparison to the "stick-built" approach of constructing the supporting framework structure where individual vertical uprights are first erected one at a time to form multiple storage columns for storing a plurality of storage containers in a stack and the grid structure is mounted to the plurality of vertical uprights by interconnecting the upper ends of the vertical uprights by a plurality of intersecting grid members in a grid pattern forming the grid structure comprising a plurality of grid cells or grid spaces, the supporting framework structure according to the present invention is formed from a plurality of prefabricated modular panels that are arranged in a three dimensional grid pattern comprising a plurality of grid cells. Each of the plurality of grid cells provided by the three dimensional grid pattern defines a storage space for storing one or more stacks of storage containers. The prefabricated modular panels are load bearing in the sense that, when assembled together to form the supporting framework structure, they provide a load bearing structure to support one or more load handling devices moving on the grid structure mounted to the supporting framework structure. The use of prefabricated modular panels to erect the grid framework structure according to the present invention allows the grid framework structure to be assembled at a much faster rate than the traditional 'stick-built' approach where individual vertical uprights are initially erected one by one on the floor and the track supports mounted to the upper end of the vertical uprights. The modular construction of the supporting framework structure and each of the prefabricated modular panels extending in a single plane also facilitates the ability to flat pack the supporting framework structure for transport. The prefabrication of the modular panels permits quick assembly of the supporting framework structure at a site or within a building. This has the advantage that the supporting framework structure can be constructed in existing vacant buildings or warehouses.

In a broad construction of the supporting framework structure, the plurality of prefabricated modular panels can be assembled such that the external walls of the supporting framework structure comprise at least one of the prefabricated modular panels. Since each of the grid cells of the supporting framework structure define a storage space for storing one or more stacks of storage containers, preferably the grid pattern arrangement of the prefabricated modular panels are such that each of the grid cells of the supporting framework structure is sized to support a subset of the plurality of grid cells of the grid structure, said subset comprising two or more grid cells of the grid structure. Each of the grid cells of the supporting framework structure therefore functions as a storage column for the storage of two or more stacks of storage containers. This permits a robotic handling device operative on the track system to position itself over a grid cell of the grid structure and retrieve or lower a storage container from a stack stored within a storage column of the supporting framework structure.

Optionally, one or more of the plurality of prefabricated modular panels comprises an opening for a vehicle to enter within the grid framework structure. Access can be required for assembly or maintenance of the grid framework structure. In some cases access to the interior of the grid framework structure can be difficult, particularly where access is required at a height from the ground. Vehicle access is convenient because a service vehicle with an elevated platform can be used to access areas that are raised above the ground. The vehicle footprint may be such that it fits within a single grid cell of the supporting framework structure.

Optionally, the first and/or the second set of parallel prefabricated modular panels comprises the one or more of the plurality of prefabricated modular panels (each of the one or more of the plurality of prefabricated modular panels comprising an opening for a vehicle to enter the grid framework structure), the one or more of the plurality of prefabricated modular panels of the first and/or the second set being arranged such that their respective openings align to define an access corridor for a vehicle to enter within the grid framework structure. Access corridors are convenient for allowing a vehicle to drive into the interior of the grid framework structure. In some examples the access corridor may extend along the full width or depth of the grid framework structure, so that a vehicle can drive all the way through the grid framework structure from one side to the opposing side of the grid framework structure.

In examples where the grid cells of the supporting framework structure are rectangular in shape, it may be advantageous for the openings of the prefabricated modular panels to be on the shorter sides of the grid cell. An operator on the elevated platform of a vehicle will then be able to access the adjacent grid cells of the supporting framework without needing to lean too far from the elevated platform.

There are numerous examples of the prefabricated modular panels according to the present invention such that the prefabricated modular panels can be arranged in a grid pattern comprising a plurality of grid cells. One example of the prefabricated modular panels involves the use of additive manufacturing to prefabricate the modular panels, e.g. the use of 3D printing. Preferably, one or more of the plurality of prefabricated modular panels are formed by additive manufacturing. Optionally, one or more of the plurality of prefabricated modular panels comprises a prefabricated braced frame, said prefabricated braced frame comprising a plurality of parallel uprights extending in a common vertical plane and connected together by one or more bracing members lying in the common vertical plane of the plurality of parallel uprights. Each of the prefabricated braced frames can be envisaged as panel frames such that the supporting framework structure is formed from an assembly of panel frames. Constructing the supporting framework structure from a plurality of prefabricated braced frames involves assembling the prefabricated braced frames together to form a three dimensional braced framework structure, wherein each of the plurality of prefabricated braced frames comprises a plurality of parallel uprights extending in a common vertical plane and connected together by one or more bracing members lying in the vertical plane of the plurality of parallel uprights. In other words, the supporting framework structure can be a modular construction so as to facilitate transport and assembly of the supporting framework structure.

The one or more bracing members extending between the plurality of parallel uprights of a prefabricated braced frame provides a lightweight rigid framed panel comprising a triangulated system of straight interconnected structural bracing elements that are in axial tension or compression. Preferably, the one or more bracing members of each of the plurality of prefabricated braced frames comprises one or more horizontal and/or diagonal bracing members. There are different arrangements of the bracing members to provide different triangulated systems of straight interconnected structural bracing elements that are in axial tension or compression known in the art. Optionally, the one or more bracing members are arranged between the plurality of parallel uprights of the prefabricated braced frame in a cross-brace or a K-brace or a V-brace or an eccentric brace arrangement. Optionally, the one or more horizontal bracing members connect the respective upper ends and/or the lower ends of the plurality of vertical uprights of the prefabricated braced frame, and the one or more diagonal bracing members extends diagonally between the horizontal bracing members at the upper and lower ends of the plurality of vertical uprights. Bracing the plurality of uprights by a straight horizontal bracing member forms at least one drag strut or collector commonly known in the art. A drag strut or collector is where the at least two uprights are braced by the horizontal bracing member at the top or bottom of the two uprights and functions to collect and transfer diaphragm shear forces to the uprights.

Optionally, the one or more bracing members are arranged to form an A-frame comprising diagonal bracing members joined by a horizontal bracing member. Optionally, the horizontal bracing member joining the diagonal bracing members is removable to form an opening for a vehicle to enter within the grid framework structure. Access for a vehicle can be convenient for assembly or maintenance of the grid framework structure, particularly where a vehicle with an elevated platform can be used to access areas that are raised above the ground. As described above, a plurality of prefabricated braced frames may have openings that are aligned to form an access corridor for a vehicle.

The arrangement of the prefabricated braced frames in a grid pattern improves the structural integrity of the supporting framework structure to bear the weight of one or more robotic load handling devices operative on the grid structure. Preferably, the plurality of prefabricated braced frames are assembled together by connecting one of the plurality of uprights of a prefabricated braced frame with one of the plurality of vertical uprights of an adjacent prefabricated braced frame. The supporting framework structure can be considered as a free standing (or self-supporting) rectilinear assemblage of the plurality of prefabricated braced frames comprising a four wall shaped supporting framework structure. To generate the rectilinear assemblage of the plurality of prefabricated braced frames, optionally, the plurality of prefabricated braced frames comprises a first type and a second type prefabricated braced frame, the first type prefabricated braced frame comprising a different number of uprights to the second type prefabricated braced frame. For example, the first type prefabricated braced frame can comprise three parallel uprights lying in their common vertical plane such that two of the three parallel uprights are laterally disposed either side of a middle upright, the two laterally disposed uprights being connected to the middle upright columns by the one or more bracing members. Having different types of prefabricated braced frames, each of the different type of prefabricated braced frame comprising different numbers of uprights, allows the prefabricated braced frames to be assembled in a staggered arrangement. To achieve the staggered arrangement of the first and second sets of parallel prefabricated braced frames, preferably, one of the plurality of uprights of a first type prefabricated braced frame is connected to one of the plurality of uprights of a second type prefabricated brace frame. Numerous types of fasteners can be used to connect adjacent prefabricated braced frames together. These include but are not limited to bolts, welding and/or the use of an adhesive.

To improve the structural rigidity in one direction, preferably, the first set of parallel prefabricated modular panels are sub-divided into a first subset of parallel prefabricated modular panels and a second subset of parallel prefabricated modular panels. The first subset of parallel prefabricated modular panels is spaced apart from the second subset of parallel prefabricated modular panels in the second direction. The first set of parallel prefabricated modular panels are arranged such that the first subset of the first set of parallel prefabricated modular panels are offset from the second subset of the first set of parallel prefabricated modular panels by at least one grid cell of the supporting framework structure in the first direction.

One way to achieve this staggered arrangement of the first set of parallel prefabricated modular panels is have the first and second subsets of the first set of parallel prefabricated modular panels being arranged in an alternating pattern.

Similarly, to improve the structural rigidity in the other (second) direction, preferably, the second set of parallel prefabricated modular panels is sub-divided into a first subset of parallel prefabricated modular panels and a second subset of parallel prefabricated modular panels. The first subset of parallel prefabricated modular panels is spaced apart from the second subset of parallel prefabricated modular panels in the first direction. The second set of parallel prefabricated modular panels are arranged such that the first subset of the second set of parallel prefabricated modular panels are offset from the second subset of the second set of parallel prefabricated modular panels by at least one grid cell of the supporting framework structure in the second direction. Again, one way to achieve this staggered arrangement is have the first and second subsets of the second set of prefabricated modular panels being arranged in an alternating pattern.

In addition to prefabricating the supporting framework structure from a plurality of modular panels so as to facilitate easy transport and assembly of the supporting framework structure, the grid structure can also be modularised so as to enable the grid structure to be flat packed to facilitate easy transport and assembly. Preferably, the grid structure comprises a plurality of prefabricated modular sub-grid structures that are assembled together to form the grid structure, each of the plurality of prefabricated modular sub-grid structures comprising two or more grid cells. More preferably, each of the prefabricated modular sub-grid structures comprises a portion of the first set of grid members and a portion of the second set of grid members.

Traditionally, tracks or rails can either be integrated into the grid members or are separately mounted to the grid members such that the grid members function as a track support. Each of the rails or tracks making up the track system is extruded from metal as a single strip, e.g. aluminium. Sometimes a gap is left in between the ends of adjacent tracks for the purpose of thermal expansion of the rail segments or sections. The cut of the rail sections are such that the gap perpendicularly intersects the track. In WO2018/146304 (Autostore Technology AS), when making the intersection between the first and second sets of rails or tracks, the second set of rails or tracks all comprise a recess into which the first set of rails or tracks may be arranged. The first set of rails comprise areas where there are no ridges so that when received in the recess of the second set of rails, the area is coincident with the recesses of the second set of rails, thus providing the intersection areas/crossroad of the grid. The recess of the second set of rails have right angle cuts so that when joined with the first set of rails, the joint at the intersections are at right angles to the longitudinal direction of the rails, i.e. extend across the width of the rails or tracks. As a result, the joint at the intersections tends to present a small step to an oncoming vehicle travelling on the rails or tracks. When a vehicle approaches a track joint at the intersections, the wheels of the vehicle tend to snag or strike the edge of the rails or tracks as the vehicle crosses the sets of rails. Although the vertical displacement of the wheel is minute as the vehicle travels across the intersections, this up and down bumping impact to the wheels is one of the main source of noise and vibration of the travelling vehicle or load handling device. In a worst case scenario, the bumping of the wheels on the rails or tracks imparts wear and tear not only to the wheels or tyres of the vehicles but also to the rails or tracks to the extent that damage occurs to either or both of the wheels and the rails. The bumping is exacerbated when there is a gap between the intersecting sets of rails or tracks. In this case, when a vehicle approaches a track joint, the wheel will sink in to the gap once it passes the first set of rails. Because of the narrow gap, as the wheel sinks down, it will strike the edge of the next section of the track. After the wheel rolls over the gap, it rises to the surface of the next section of the track.

In addition, multiple rail or track sections are necessary to build the track or rail. The greater the number of rail or track sections necessary to build the track, the more complicated the assembly of the rail or track. In a majority of cases, there is a two to one relationship between the number of rail or track sections or segments at each of the nodes or the intersections of the track or rail sections in the grid structure, in the sense that more than one rail or track sections are connected together at each node of the grid structure. For example, in WO2018/146304 (Autostore Technology AS), when making the intersections between the first and second sets of rails or tracks, the second set of rails or tracks all comprise a recess into which the first set of rails or tracks may be arranged. Additionally, to provide a plurality of rectangular or square shaped grid cells, multiple different sized track or rail sections are connected together in the grid structure. For example, for each grid cell there is a rail or track section extending in one direction of one length and another track or rail section extending in a second direction of a different length. The different lengths of the rail or track sections meet at a node in the grid structure where they intersect. The need to have different lengths of rail or track sections complicates the assembly of the track or rail sections in a grid pattern. A track or rail is thus required that would not only mitigate the bumping of the wheels of the load handling device as it travels across the junctions between two intersecting sets of rails or tracks, but also require the use of a small number of rail or track sections when assembling the track.

To overcome this problem, preferably, the track system comprises a plurality of interconnected modular track sections, each modular track section of the plurality of interconnected modular track sections comprising substantially perpendicular elements so as to provide a track surface extending in the first direction and the second direction. By having a track system whereby each track section of the plurality of track sections is formed as an unitary or single body so as to provide a track surface or path extending in transverse directions, the number of track sections necessary to build the track is reduced in comparison to prior art track systems—thereby simplifying the layout of the track sections on the grid structure. For example, a one to one relationship can exist between each of the plurality of track sections and a single node in the grid structure, in the sense that only a single track section is required at each of the nodes of the grid structure. A 'node' in the grid structure is the point where the first and second sets of parallel grid member intersect in the grid pattern. In prior art track systems, there is a two to one relationship between the number of track sections and a single node in the grid structure in the sense they have one track section extending in a first direction and another separate track section extending in the second direction. In one example of achieving a one to one relationship between each of the plurality of track sections and each node in the grid structure, preferably each track section of at least a portion of the plurality of track sections comprises:

a) a first track section element extending in the first direction; and b) a second track section element intersecting with the first track section element and extending in the second direction so that the track section is configured for mounting at the nodes of the grid members. More preferably, each of the plurality of track sections is formed as a unitary body or a single piece body. In other words, each of the plurality of track sections can be cross shaped, having a first track section element extending in the first direction and a second track section element intersecting with the first track section element and extending in the second direction. The first and second track section elements can also be termed transverse portions or branches of the track section. Being formed as a single or unitary body allows the track sections to be mounted at each of the nodes of the grid structure where the grid members intersect, and therefore able to extend in both the first and second direction of the grid structure. This removes the need to have separate track or rail elements that separately extend in the first and second direction as found in prior art solutions. However, the present invention is not limited to having a one to one relationship between a single track section and the number of nodes of the grid structure. For example, a single track section formed as a unitary body can be configured to extend across multiple nodes of the grid structure and yet provide a track surface extending in transverse directions.

Ideally, the surface of the track system mounted to the grid structure is continuous and substantially smooth to prevent the undesirable up and down bumping impact to the wheels of the load handling device travelling on the track. It is believed that the areas of the grid structure that are most vulnerable to cause this up and down bumping of the wheels of the load handling device are where the track sections meet at the nodes in the grid structure. This is the area of the grid structure where the grid members intersect or converge.

Generally in the art, to ensure that the grid structure is level and to compensate for an uneven floor, the level of the grid structure mounted to vertical uprights is adjusted by having an adjustable levelling foot at the base or lower end of the vertical uprights comprising a threaded shaft that can be extended or retracted relative to the base of the vertical upright. Adjusting the level of the grid structure can be partially attributable to the vertical displacement of the interconnected grid members where they intersect at the top ends of the vertical uprights, i.e. at the nodes of the grid structure.

In prior art grid structures, as one or more track sections mounted on the grid members meet at the nodes of the grid structure, such vertical displacement of the underlying grid members at the nodes creates an undesirable edge or step that is transferred to the track sections mounted thereon, which in turn is susceptible to being struck by the wheels of the load handling devices as they travel on the tracks. The problem of misalignment of the grid members at the junction where the grid members meet at the nodes is exacerbated when the supporting framework structure is assembled from the plurality of prefabricated braced frames as defined in the present invention. As the plurality of the prefabricated braced frames are assembled together by connecting one of the plurality of uprights of the prefabricated braced frames with one of the plurality of uprights of an adjacent prefabricated braced frame, the junction where the uprights of adjacent prefabricated braced frames join or meet are susceptible to misalignment. This may result in the junction or connection between adjacent prefabricated modular sub-grid structures on the supporting framework structure to misalign leaving a physical step or bump which is translated to the overlying track system.

The present applicant has realised that devising a track section element that covers areas of the grid structure that are most vulnerable to this variation in height displacement of the grid members, namely at the nodes of the grid structure, mitigates the up and down bumping impact of the wheels of the load handling devices as they travel on the track/grid structure. In other words, the track section of the present invention masks any imperfections or edges in the underlying grid members which largely occur at the nodes where the grid members intersect or converge together and transfers the joint where adjacent track sections meet to the areas of the grid structure that are less susceptible to such height variations. The areas of the grid structure that are less susceptible to such height variations as a result of adjoining grid members are along the length of the grid members, more specifically between or intermediate of adjacent or neighbouring nodes of the grid structure. Preferably, the plurality of track sections are assembled in the track system such that adjacent modular track sections in the track system meet between the areas of the grid structure where the first and second sets of grid members intersect or converge in the grid pattern.

In the present invention, the distal or connecting ends of the substantially perpendicular elements of adjacent track sections meet between the intersections. Optionally, the substantially perpendicular elements of adjacent modular track sections meet half way or at the mid-point between their respective intersections. This has the advantage that only track sections having a single size would be necessary to cover a substantial portion of the grid members instead of having multiple separate parts, thereby improving the manufacturability of the track sections, i.e. a single tool design or one size fits all. In the case where the grid cells are square, preferably, each track section of the plurality of track sections can have rotational symmetry in a horizontal plane with an order of rotational symmetry of four. Having an angle of rotational symmetry of 90°, the track section of the present invention can be rotated four times and still coincide with itself. This provides the flexibility to mount the track sections of the present invention to the grid structure in multiple different orientations, thereby removing the "jig-saw" effect of assembling the track, i.e. limited to one orientation.

The ability to have adjacent track sections meet between the nodes or intersections of the grid structure also allows different types or shapes of the joints or connecting ends to be incorporated into the track sections. To further mitigate the up and down bumping of the wheels of the load handling device, preferably, the plurality of track sections are connected by a joint comprising tapered edges. For the purpose of the present invention, the term "joint" is broadly construed to mean abutting ends of adjacent track sections. The meeting ends of adjacent track sections are cut or shaped in such a way that they are mitred together. Preferably, the plurality of track sections are connected by a joint comprising tapered edges. Before the wheels of the load handling device roll over the edge of a track section element completely, part of the wheel has already touched the mitred edge of the track section element of an adjacent track section. This provides a gradual transition of the track joint and prevents a greater portion of the wheel from striking an edge of the joint further mitigating this up and down bumping impact, reducing any noise and vibration of the wheels of the load handling device in comparison to a joint cut at right angles to the direction of travel of the load handling devices on the track.

To further increase the structural integrity of the joint connecting adjacent track sections together, preferably, the joint comprises at least one tongue receivable in a correspondingly shaped groove. Preferably, the joint comprises an overlapping joint. To assist with guiding of the track sections so that they are seated correctly onto the areas of the grid structure where the grid members intersect at the nodes, preferably, each of the plurality of track sections comprises downwardly extending guides at the intersection of the first and second track section elements for guiding the track section into engagement with the grid structure at the intersection or convergence of the grid members. The downwardly extending guides help to locate the track section into the correct position on the node of the grid structure.

Preferably, the downwardly extending guides comprise a downwardly extending skirt at the junction of the first and second track section elements so as to lock the track section from movement in both lateral directions on the grid structure. Each of the downwardly extending guides comprise two perpendicular plates (two guiding plates perpendicular to each other) that extend downwardly in the direction of the upright column, i.e. vertically. Each of the two perpendicular plates of the downwardly extending guides is arranged for cooperating with the corner sections of the vertical uprights. The downwardly extending guides also prevent snagging of the grabber device or containers at the intersection of the grid members.

To secure the track to the grid structure, each of the plurality of track sections comprises means for snap fitting the track section to the grid members. For example, each of the plurality of track sections comprises one or more lugs that engage with the grid members to secure the track section to the grid member.

It is essential that each of the plurality of track sections is fabricated to very tight dimensional tolerances as any variation in the dimensional tolerances of one or more track sections such as thickness or width would have an impact on the connection between adjacent track sections, which in turn would affect or create dimensional disparity of the track surface of the track between the adjacent track sections. This would create one or more steps and/or gaps between adjacent track sections that would cause the wheels of a load handling device to strike as it passes across the junction between the adjacent track sections leading to noise and vibration of the wheels. The importance of each of the track sections meeting strict dimensional tolerances is exacerbated as each of the plurality of track sections comprises one or more profiles for guiding one or more wheels of the load handling device on the track. To ensure the structural integrity of the track system to support one or more load handling devices operative on the track system, typically each of the track sections is composed of a metallic material, e.g. aluminium. To fabricate each of the plurality of track sections in metal, typically, each of the plurality of track sections is extruded. Metal extrusion is a metal forming manufacturing process in which a billet inside a closed cavity is forced to flow through a die of a desired cross section. However, one of the drawbacks of metal extruded parts is that they do not provide the level of tight dimensional tolerances required for a track so as to provide a continuous uninterrupted travelling surface between adjacent track sections. To achieve the tight tolerances, generally the extrusion process is subsequently followed by a machining process which is not only time consuming but is open to errors as it does not always produce a reproducible part.

The present applicant has realised that by mounting the track system to a track support or grid member whereby the track support bears at least a portion or the full weight of the load handling device operative on the grid structure, the track system mounted thereon can be fabricated from less structurally supporting materials that can be moulded to very tight dimensional tolerances. This is because the track system does not need to be composed from materials that gives it sufficient load bearing capability, e.g. metal. For the purpose of the present invention, the grid members function as a track support, such that the track sections are mountable to the track support. In an aspect of the present invention, each of the plurality of track sections is formed from plastic material. The use of plastic material to fabricate the track sections allows the track sections to be fabricated to tighter tolerances that can be achieved by extrusion alone. The use of plastic material to fabricate the track section of the present invention, allows the track sections to be injection moulded. Unlike extrusion, injection moulding allows parts to be formed to very tight tolerances removing or mitigating the need to carry out excessive machining on the finished parts. In addition, injection moulding allows one or more profiles to be incorporated to the track in precise or intricate detail, which is essential to guide the wheels of the load handling device on the track without the possibility of derailing. For example, depending on the number of profiles, the track system can be a single or double track where the profile of the single track comprises opposing lips, i.e. a lip either side of the track, to guide or constrain each wheel on the track. In the case of the profile of a double track, the track comprises two pairs of opposing lips along the track to allow load handling devices to pass each other in both directions, i.e. having at least a central ridge separating two tracks either side of the at least the central ridge. The track system of the present invention is not limited to a single track or a double track and can comprise one or more profiles to provide one or more track surfaces.

One of the possible drawbacks of using a plastic track is the accumulation of static electricity as the tyres of the load handling device continuously ride over the track. The static electricity may build up on the track surface until there is opportunity for the static electricity to electrically discharge. In an extreme case, the build-up of static electricity on the tracks can be large enough to cause harm when discharged through a person touching the tracks. To mitigate the build-up of static electricity on the tracks, the tracks are preferably made conductive so as to safely conduct the build-up of charge on the tracks to ground. To maintain the benefits of injection moulding the track sections from plastic, preferably, the track system is made conductive by incorporating a conductive material into the plastic. Various conductive materials are known to be incorporated into plastic material to make the plastic material conductive. These include but are not limited to various types of carbon materials, e.g. graphite in micro or nano form.

The grid structure and thus the track system is raised above the floor by being mounted to the assembly of prefabricated modular panels to create a storage space for the storage of multiple stacks of storage containers. Traditionally, as discussed above, the containers or storage bins in a stack are guided through a respective grid cell by the vertical uprights at each of the node or intersections of the grid members. The removal of the vertical uprights has meant that the containers are lifted and raised through a grid cell in free space by a load handling device operative on the grid structure. Whilst the set of lifting tethers or tapes at the four corners of the grabber device (see FIG. 5) provides sufficient lateral stability of the grabber device to prevent the container attached thereto from swinging when lifting the container through a grid cell without colliding or disrupting neighbouring containers being lifted from adjacent stacks of containers, the lateral stability of the grabber device decreases as the height of the grid framework structure increases. As a result, the vertical uprights in traditional grid framework structures double up as guides for guiding the grabber and the storage container attached thereto along the vertical uprights through a grid cell. Each of the vertical uprights can be considered to function as a structural element under compression for supporting the grid structure above. Typically, each of the plurality of vertical uprights comprises a box section. To at least one corner of the box section is mounted or formed a guide or corner section. The guides comprises two perpendicular plates (two container guiding plates perpendicular to each other) that extend longitudinally along the length of the vertical upright.

Traditionally, the vertical uprights are arranged such that the grid structure is supported by a vertical upright at each node or junction where the grid members intersect or are interconnected to form multiple storage columns for storing storage containers one or top of the other in vertical stacks. As a result, all four corners of the storage containers cooperate with the vertical uprights as the container is lifted or hoisted towards the load handling device operative on the grid structure so as to prevent the containers from swinging side to side. The assembly of the prefabricated modular panels to form a three dimensional grid framework structure generates one or more open storage spaces for accommodating multiple stacks of storage containers. The open storage space has a surface area so as to accommodate multiple grid cells of the grid structure. To prevent the grabber device and any storage container attached thereto from swinging when being lifted through a grid cell of the grid structure, the grid framework structure further comprises a plurality of guides extending vertically between the grid structure and the floor. The plurality of guides are arranged in a pattern for accommodating a plurality of stacks of storage containers between the plurality of guides and to guide the plurality of storage containers through a grid cell. Unlike the uprights of the prefabricated modular panels, which are largely load bearing, the guides are intended to guide the grabber device and/or storage container through a grid cell of the grid structure. Preferably, each guide of the plurality of guides comprises two perpendicular bin guiding plates extending between the grid structure and the floor for accommodating a corner of a storage container. The two perpendicular bin guiding plates are configured to accommodate a corner section of a grabber device and/or storage container. Thus, four guides would be necessary to accommodate the four corner sections of a standard storage container, which is generally rectilinear in shape. Optionally, one or more of the plurality of guides are secured to a cap plate and arranged at the junction where the plurality of grid members intersect in the grid structure, i.e. the nodes of the grid structure. Preferably, upper ends of the one or more of the plurality of guides are secured to the cap plate.

Optionally, the plurality of guides comprises four guides, said four guides being symmetrically arranged about a centre point defined by the four guides such that the four guides are arranged for guiding the corners of four adjacent storage containers. The centre point can be the cap plate that is used to secure the plurality of guides together such that the plurality of guides can be arranged around the cap plate.

Whilst it is not necessary to engage or accommodate all four corners of a storage container along the guides as the container is hoisted towards the grid structure by the lifting mechanism of the load handling device, in another embodiment of the present invention, the plurality of guides are arranged for guiding one or more containers in a stack along only a pair of diagonally opposed corners of the one or more containers. This gives the grabber device and/or the storage containers a level of lateral stability in the X and Y direction as the storage container is hoisted along diagonally opposed guides. By guiding the grabber device and/or the storage container attached thereto by only diagonally opposed guides, the number of guides necessary to guide the grabber device and/or the storage container attached thereto is reduced. In fact, the plurality of guides can be arranged at alternate nodes in the first direction (e.g. x direction) and in the second direction (e.g. y direction) such that the one or more containers are stacked between two guides at only the diagonally opposed corners of the storage containers.

Optionally, the supporting framework structure comprises a lower layer of prefabricated modular panels and an upper layer of prefabricated modular panels, and the prefabricated modular panels of the lower layer and the prefabricated modular panels of the upper layer are attached together in a vertical configuration on top of one another. For ease of manufacturing, handling, storage, and assembly, in large storage systems it may be convenient to use prefabricated modular panels that have a height less than the full height of the supporting framework structure. The advantage of using prefabricated modular panels of a smaller height is that they can be assembled either on site or in a separate manufacturing facility, and they can be handled more easily, either by human operators or by AGVs. Transport of shorter panels is also more convenient, since the panels can fit into a smaller vehicle rather than requiring a specialized larger vehicle. Storage of smaller panels is also more convenient.

One of the key features of the grid framework structure is its ability to be flat packed to facilitate easy transport and assembly. The present invention further provides a kit of parts for erecting a grid framework structure according to the present invention; comprising:

i) a plurality of prefabricated modular sub-grid structures for assembling together to form a grid structure comprising a first set of grid members extending in a first direction and a second set of grid members extending in a second direction, the second direction being substantially perpendicular to the first direction, such that the first and second set of grid members are arranged in a grid pattern comprising a plurality grid cells or grid spaces, each of the plurality of prefabricated modular sub-grid structures comprising a portion of the first set of grid members and a portion of the second set of grid members;

ii) a plurality of modular track sections, each modular track section of the plurality of modular track sections comprising transverse elements so as to provide a track surface extending in the first direction and the second direction, such that when assembled together, the plurality of modular track sections form a track system for guiding one or more robotic load handling devices on the grid structure;

iii) a plurality of prefabricated modular panels for arranging into a three dimensional grid pattern.

Preferably, at least a portion of the plurality of prefabricated modular panels comprises a plurality of prefabricated braced frames, each of the plurality of the prefabricated braced frames comprising parallel uprights extending in a common vertical plane connected together by one or more bracing members lying in the vertical plane of the plurality of parallel uprights.

In another aspect, the invention provides a storage and retrieval system comprising:

i) a grid framework structure as defined in above;

ii) a plurality of stacks of containers arranged in storage columns located below the track system, wherein each storage column is located vertically below a grid cell;

iii) a plurality of load handling devices for lifting and moving containers stacked in the stacks, the plurality of load handling devices being remotely operated to move laterally on the track system above the storage columns to access the containers through the grid cells, each of said plurality of load handling devices comprising:

a) a wheel assembly for guiding the load handling device on the track system;

b) a container-receiving space located above the track system; and c) a lifting device arranged to lift a single container from a stack into the container-receiving space.

Further features of the present invention will be apparent from the detailed description with reference to the drawings.

DESCRIPTION OF DRAWINGS

Further features and aspects of the present invention will be apparent from the following detailed description of an illustrative embodiment made with reference to the drawings, in which:

FIG. 29 is a perspective view showing the mounting of the track sections to the track support or the grid members of the grid structure according to the present invention.

DETAILED DESCRIPTION

Figures 6, 7:
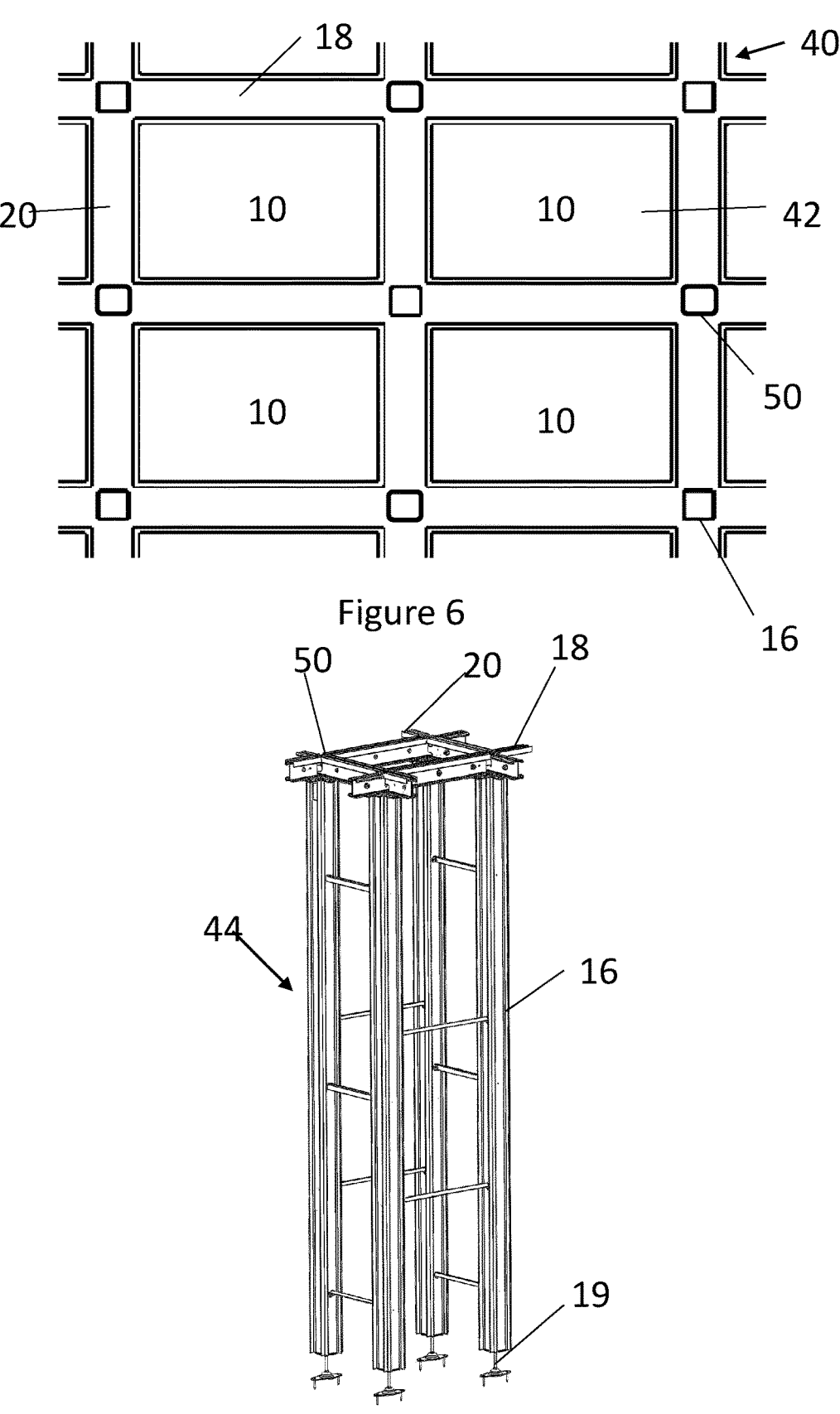
FIG. 6 is a top plan view of a section of a known grid structure comprising four adjoined grid cells showing the intersections or nodes of the grid members being supported by a vertical upright, each of the grid cells constituting a storage column.
FIG. 7 is a perspective view showing four vertical uprights making up a storage space or storage column within a grid framework structure.

It is against the known features of the storage system such as the grid framework structure and the load handling device described above with reference to FIGS. 1 to 5, that the present invention has been devised. FIG. 6 shows a top view of a section or a portion of a traditional grid structure 40 comprising four adjoined grid cells 42 and FIG. 7 shows a perspective side view of a single grid cell 42 supported by four vertical uprights 16 to form a single storage column 44 for the storage of one or more containers 10 in a stack. The grid framework structure can be considered to be divided into a supporting framework structure comprising the plurality of vertical uprights and a grid structure. The grid structure is supported by the supporting framework structure and comprises a plurality of grid members arranged in a grid pattern comprising a plurality of grid cells.

Each of the vertical uprights 16 are generally tubular. In transverse cross-section in the horizontal plane of the storage column 44 shown in FIG. 2, each of the vertical uprights 16 comprises a hollow centre section 46 (typically a box section) with one or more guides 48 mounted to or formed at the corners of the hollow centre section 46 that extends along the longitudinal length of the vertical upright 16 for guiding the movement of the containers along the storage column 44. The one or more guides 48 comprises two perpendicular container guiding plates. The two perpendicular container guiding plates are arranged to accommodate a corner of a container or a corner of a stack of containers. In other words, each of the corners of the hollow centre section 46 defines two sides of a substantially triangular area which may accommodate a corner of a container or storage bin. The corners are evenly arranged around the hollow centre section 46, such that multiple vertical uprights 16 may provide multiple adjacent storage columns, wherein each vertical upright 16 may be common to or shared by up to four separate storage columns. Also shown in FIG. 7 is that each of the vertical uprights 16 is mounted on an adjustable grid levelling mechanism 19 at the foot of the vertical uprights comprising a base and a threaded shaft that can be extended or retracted to compensate for an uneven floor.

Figure 1:
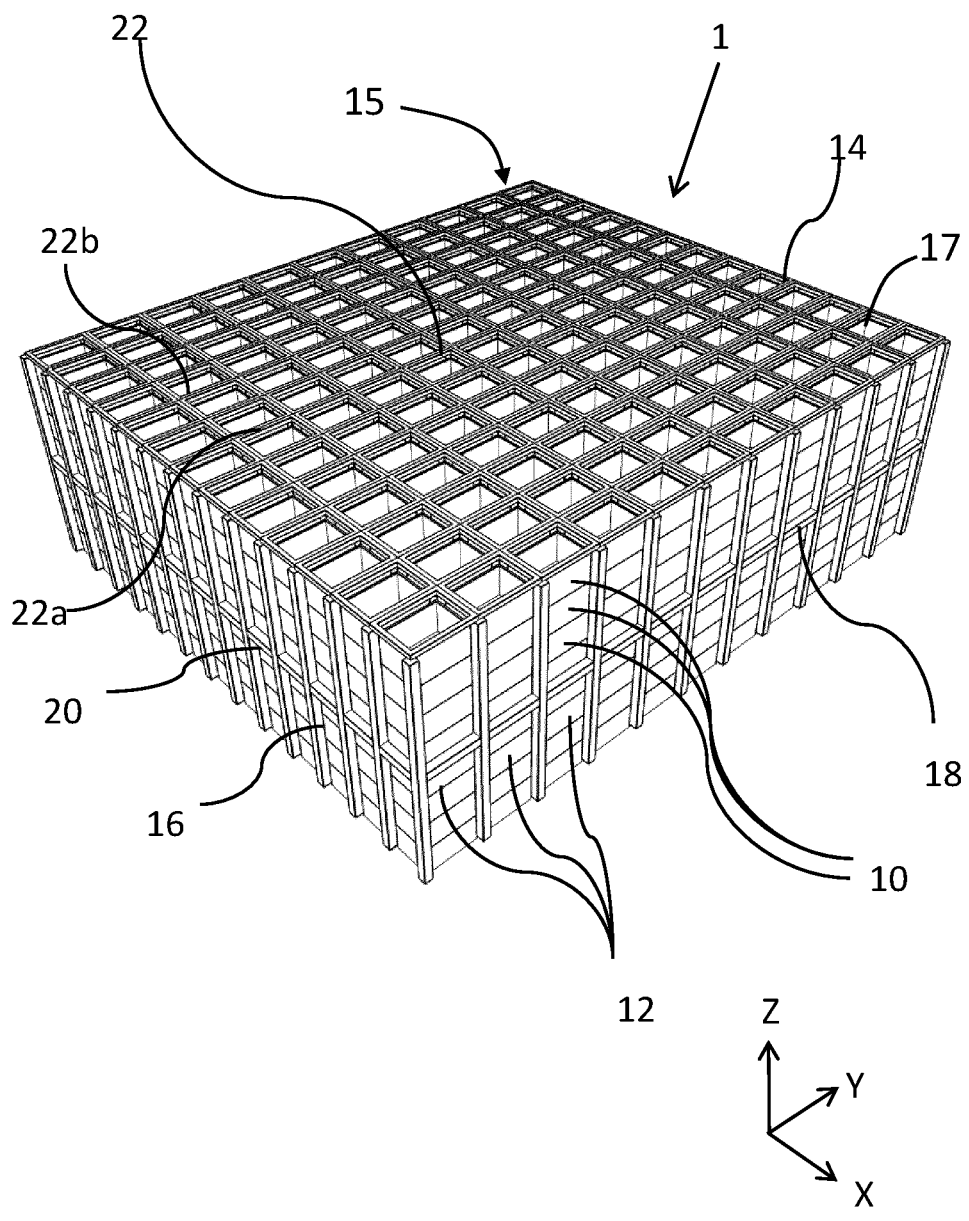
FIG. 1 is a schematic diagram of a grid framework structure according to a known system.
Figure 2:
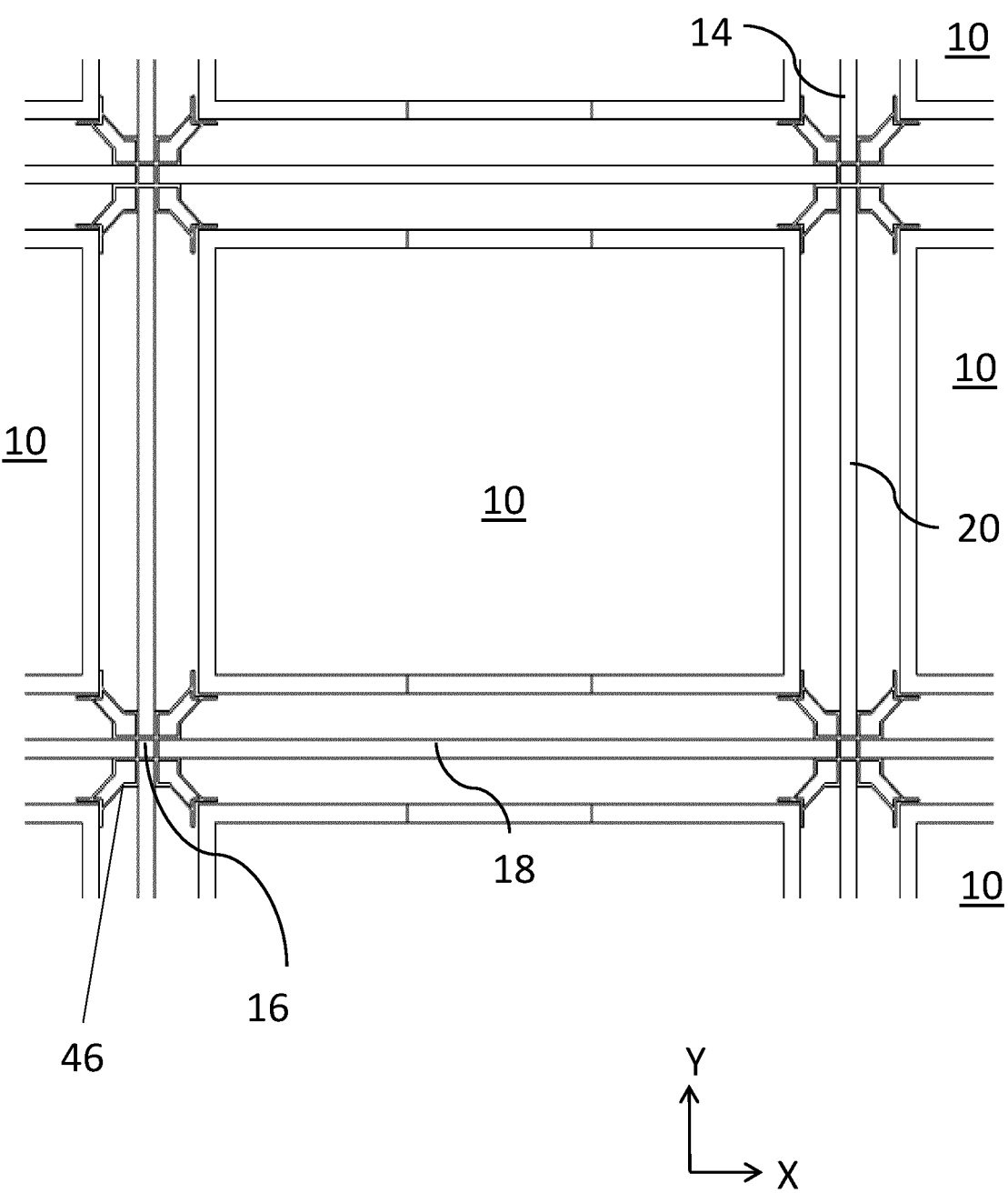
FIG. 2 is a schematic diagram of a top down view showing a stack of bins arranged within the supporting framework structure of FIG. 1.
Figure 3:
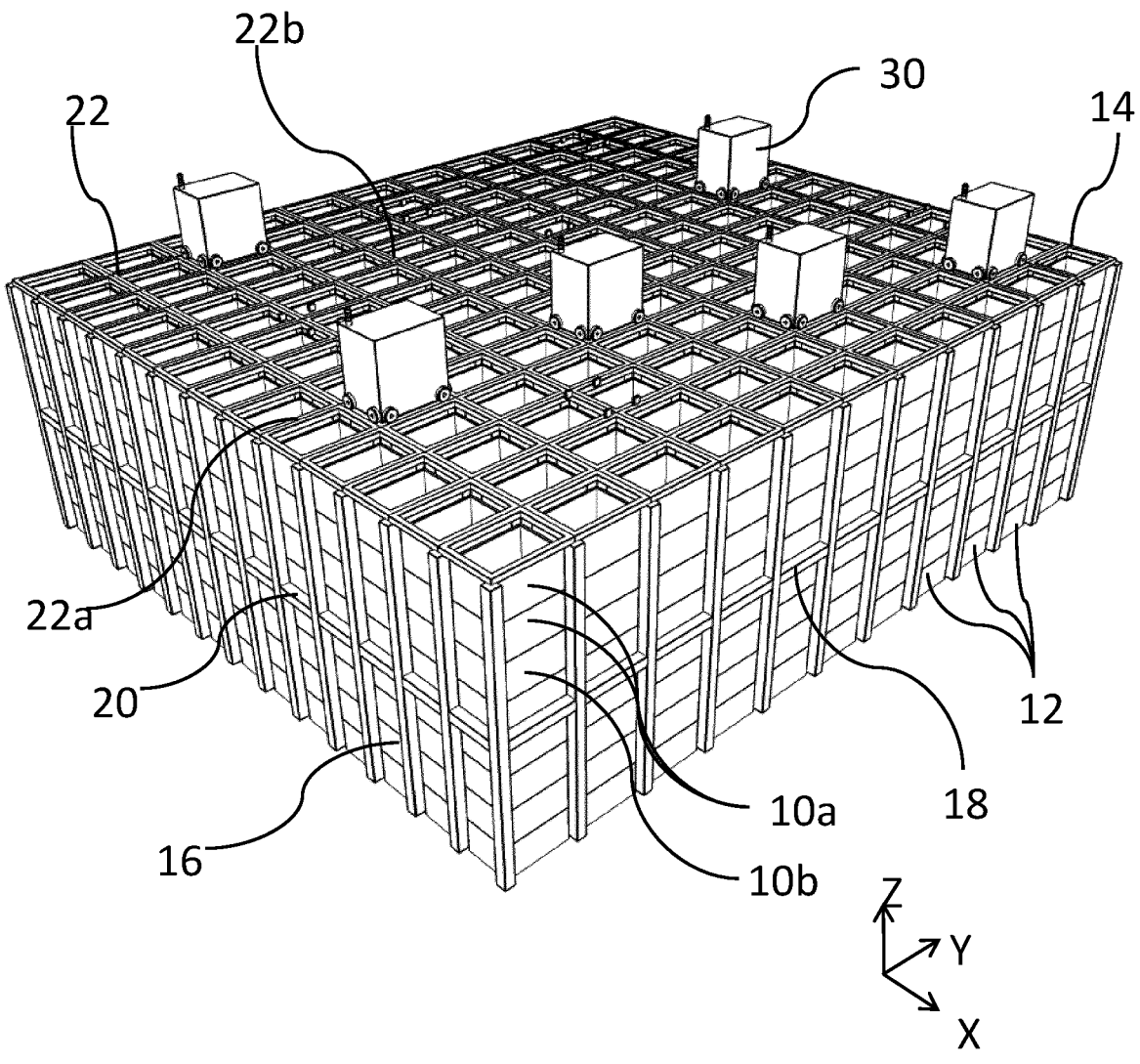
FIG. 3 is a schematic diagram of a known storage system of a load handling device operating on the grid framework structure.
Figure 4:
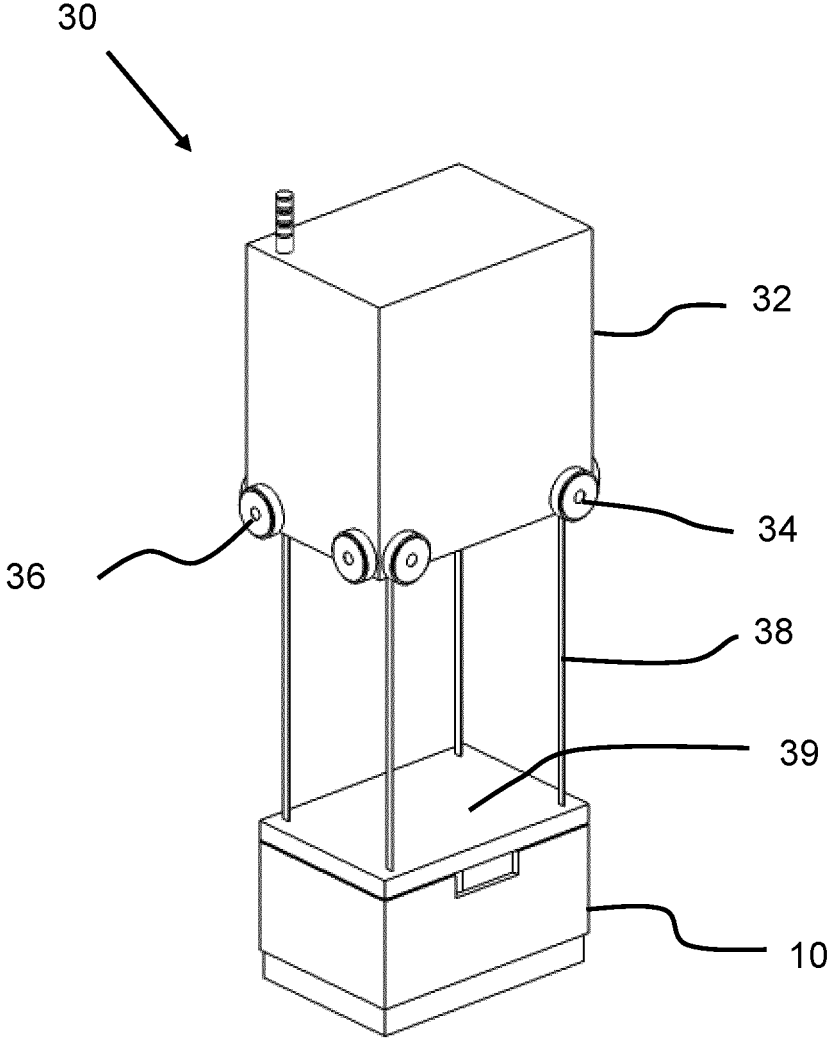
FIG. 4 is a schematic perspective view of the load handling device showing the lifting device gripping a container from above.
Figure 5:
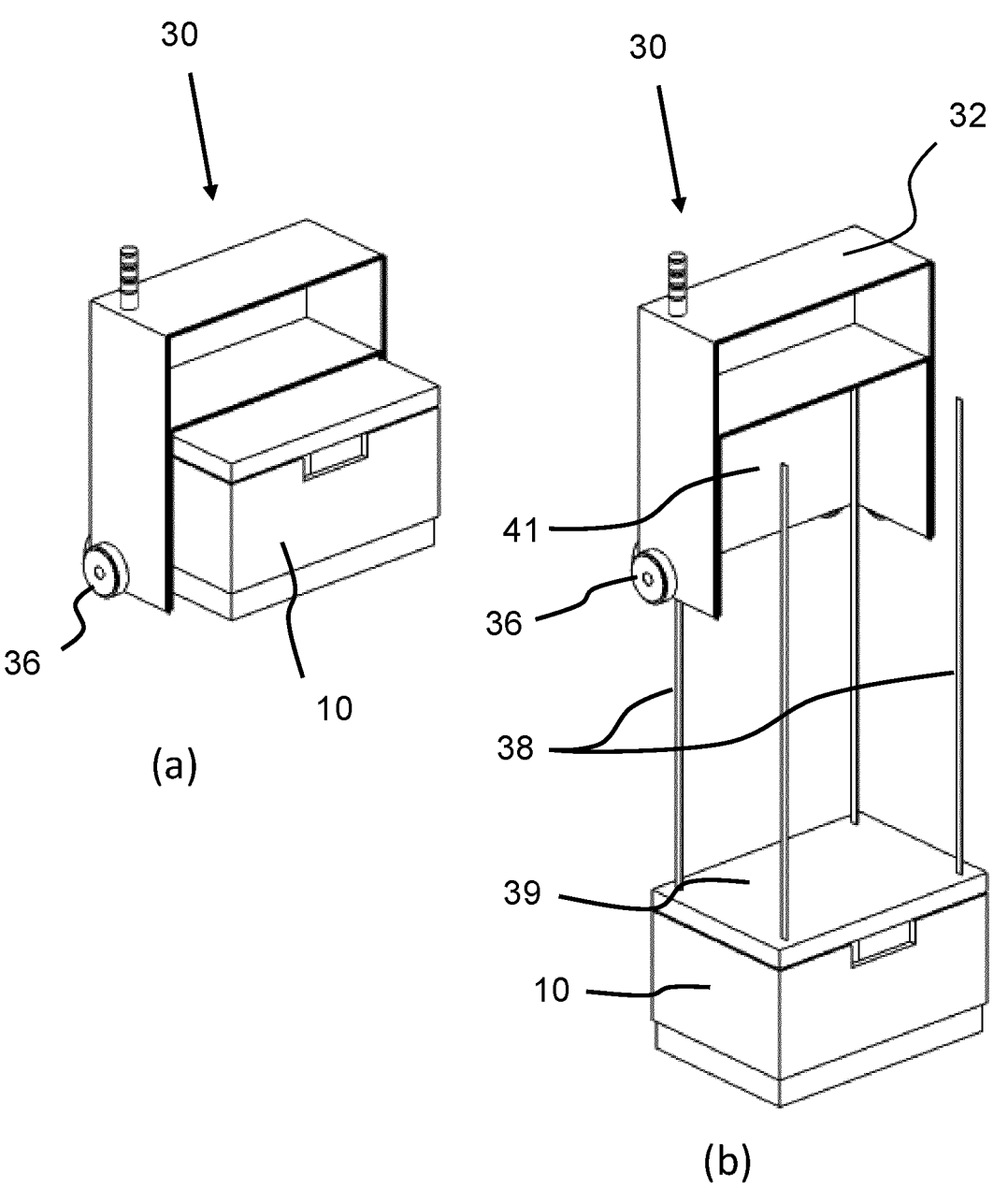
FIGS. 5(*a*) and 5(*b*) are schematic perspective cut away views of the load handling device of FIG. 4 showing (a) a container accommodated within the container receiving space of the load handling device and (b) the container receiving space of the load handling device.

The transverse cross-section in the horizontal plane of the storage column 44 in FIG. 2 shows that an individual storage column 44 is made up of four vertical uprights 16 arranged at the corners of the container or storage bin 10. A storage column 44 corresponds to a single grid cell. The cross section of the vertical upright 16 is constant over the whole length of the vertical upright. The periphery of a container or storage bin in the horizontal plane in FIG. 2 shows the container or storage bin having four corners and the arrangement of four vertical uprights 16 at the corners of the containers or storage bins within the storage column 44. A corner section of each of the four vertical uprights, one from each of the four vertical uprights, ensures that a container or storage bin stored in the storage column 44 is guided into a correct position relative to any container or storage bin stored within the storage column and the stacks of containers or storage bins in the surrounding storage columns. A load handling device operative (not shown) on the grid structure 40 is able to lift a container or storage bin as it is guided along the vertical uprights 16 through a grid cell 42. The vertical uprights 16 have a dual purpose; (a) to structurally support the grid structure 40, and (b) to guide the containers or storage bins 10 in the correct position through a respective grid cell 42.

Traditionally, during assembly of the grid framework structure, the individual vertical uprights 16 are erected first. The procedure for assembling the individual vertical uprights 16 is sometimes referred to as a 'stick-built' approach. The upper or top ends of the vertical uprights 16 are then interconnected by a plurality of grid members. A top plan view of a section of the grid structure 40 shown in FIG. 6 shows a series of horizontal intersecting beams or grid members 18, 20 arranged to form a plurality of rectangular frames constituting grid cells 42, more specifically a first a set of grid members 18 extending in a first direction x and a second set of grid members 20 extending in a second direction y, the second set of grid members 20 running transversely to the first set of grid members 18 in a substantially horizontal plane, i.e. the grid structure is represented by Cartesian coordinates in the X and Y direction. The term "vertical upright(s)", "upright member(s)" and "upright column(s)" are used interchangeably in the description to mean the same thing. For the purpose of explanation of the present invention, the points or junctions where the grid members intersect or cross shown by the shaded squares in FIG. 6 can be defined as nodes or intersections 50. It is clearly apparent from the layout of at least a portion or section of a known grid structure 40 constituting four adjoining grid cells 42 shown in FIG. 6 that each intersection or node 50 of the grid structure 40 is supported by a vertical upright 16. From the section or at least a portion of the grid structure 40 shown in FIG. 6, the four adjoining grid cells are supported by nine vertical uprights 16, i.e. three sets of vertical uprights 16 supporting the grid structure at three rows, where each row comprises three nodes 50.

Figure 8:
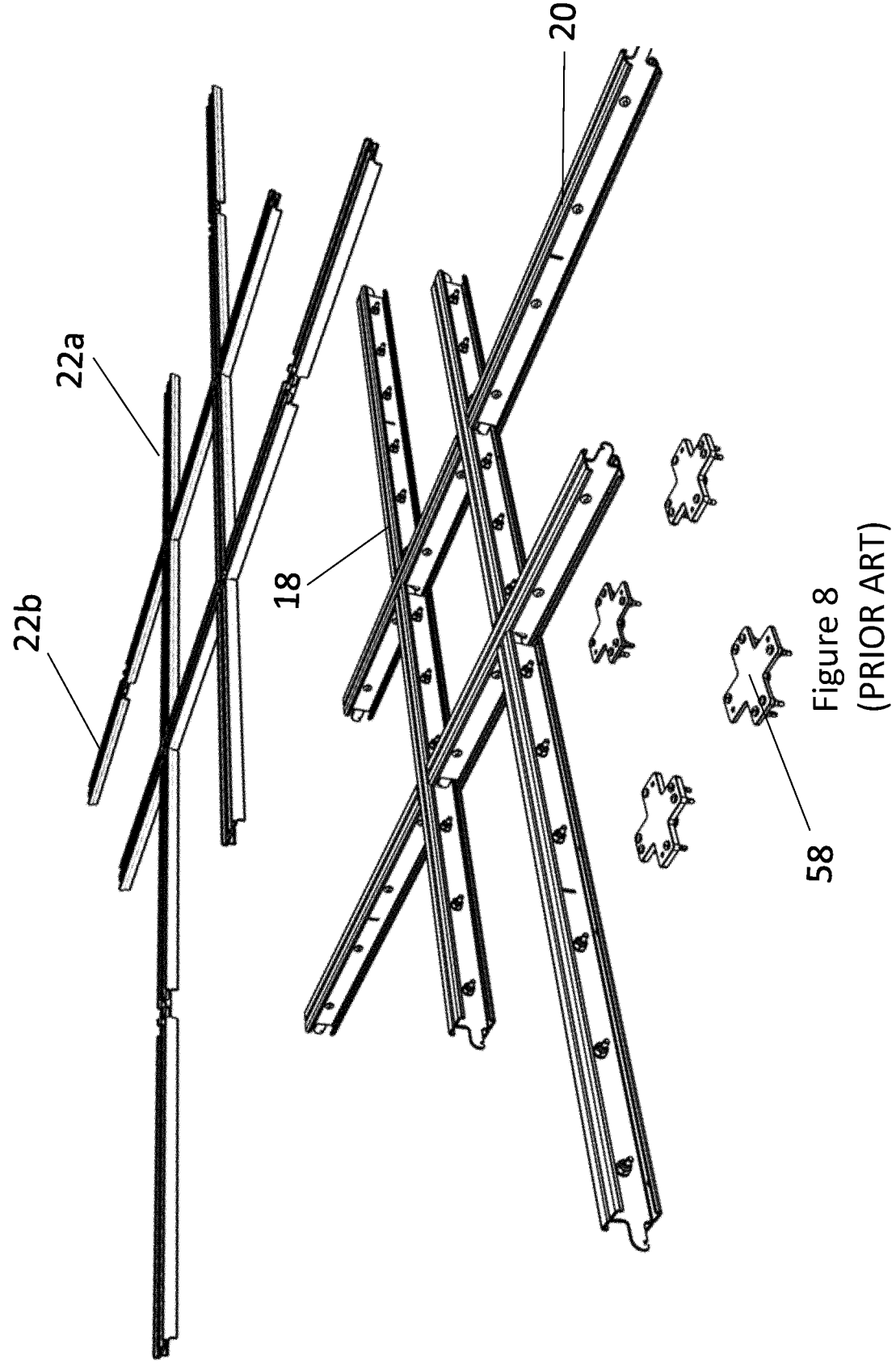
FIG. 8 is a perspective view showing the arrangement of the tracks and track supports interconnected at their nodes or intersections by a cap plate.
Figure 9:
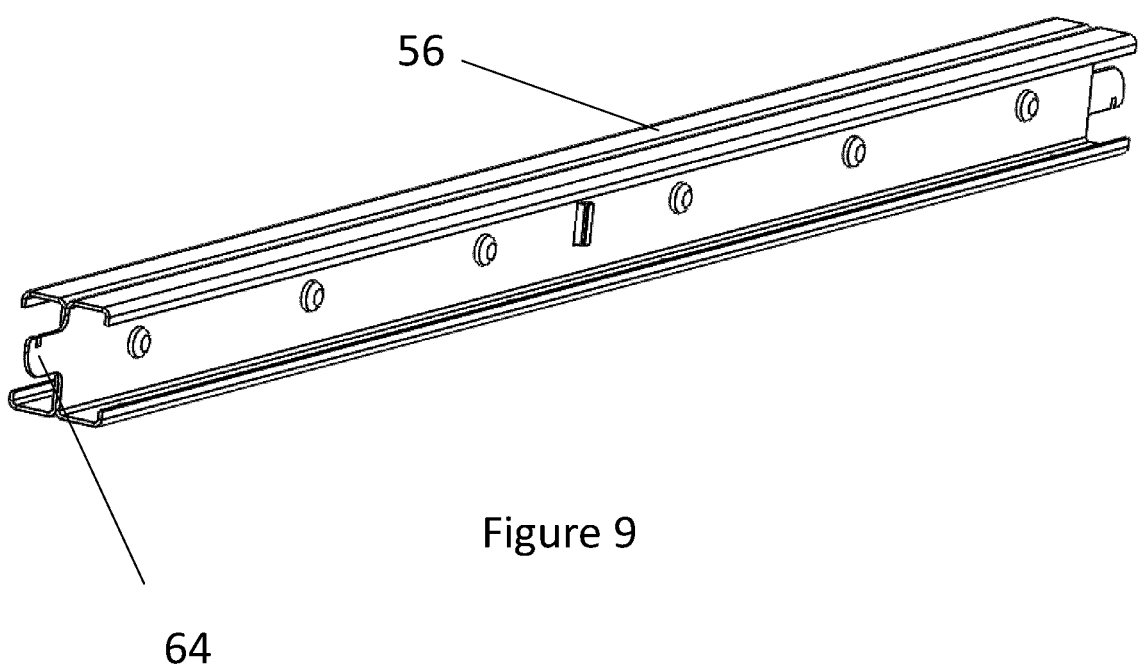
FIG. 9 is a perspective view of a track support or grid member.

Each of the grid members can comprise a track support 18, 20 and/or a track or rail 22a, 22b (see FIG. 8) whereby the track or rail 22a, 22b is mounted to the track support 18, 20. A load handling device is operative to move along the track or rail 22a, 22b of the present invention. Alternatively, the track 22a, 22b can be integrated into the track support 18, 20 as a single body, e.g. by extrusion. At least one grid member in a set, e.g. a single grid member, can be subdivided or sectioned into discrete grid elements that can be joined or linked together to form a grid member 18, 20 extending in the first direction or in the second direction. Where the grid members comprise a track support, the track support can also be sub-divided into discrete track support elements that are linked together to form the track support. The discrete track support elements making up a track support extending in the first axial direction and in the second axial direction are shown in FIG. 8. An individual track support element 56 used to make up a track support 18, 20 is shown in FIG. 9. The track support 18, 20 in transverse cross section can be a solid support of C-shaped or U-shaped or I-shaped cross section, or even double-C or double-U shaped support. In the particular embodiment of the present invention, the track support element 56 is a double back-to-back C section bolted together.

Figure 10:
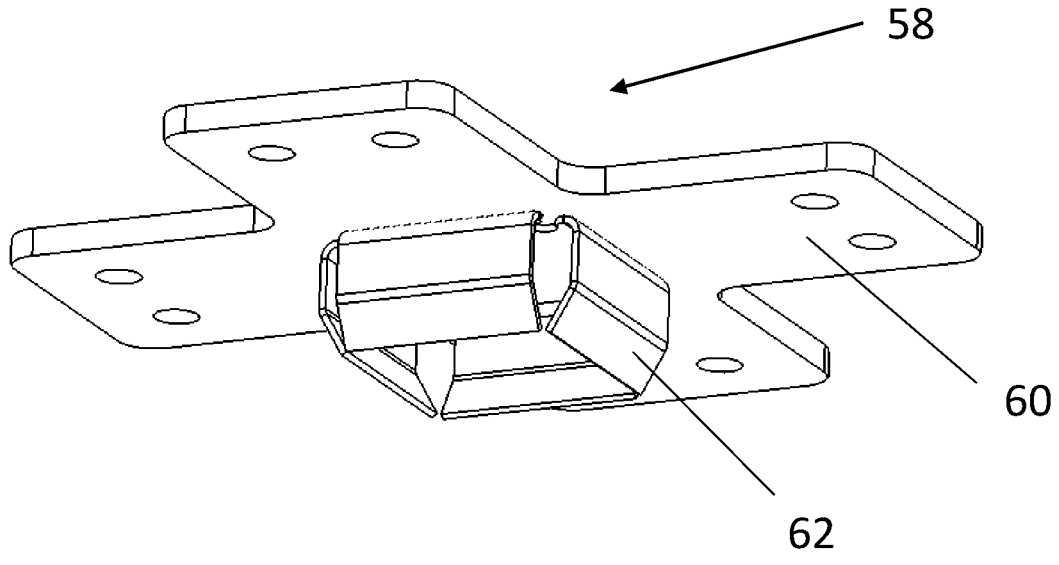
FIG. 10 is a perspective view of a cap plate for interconnecting the vertical uprights to the grid members at the nodes.
Figure 11:
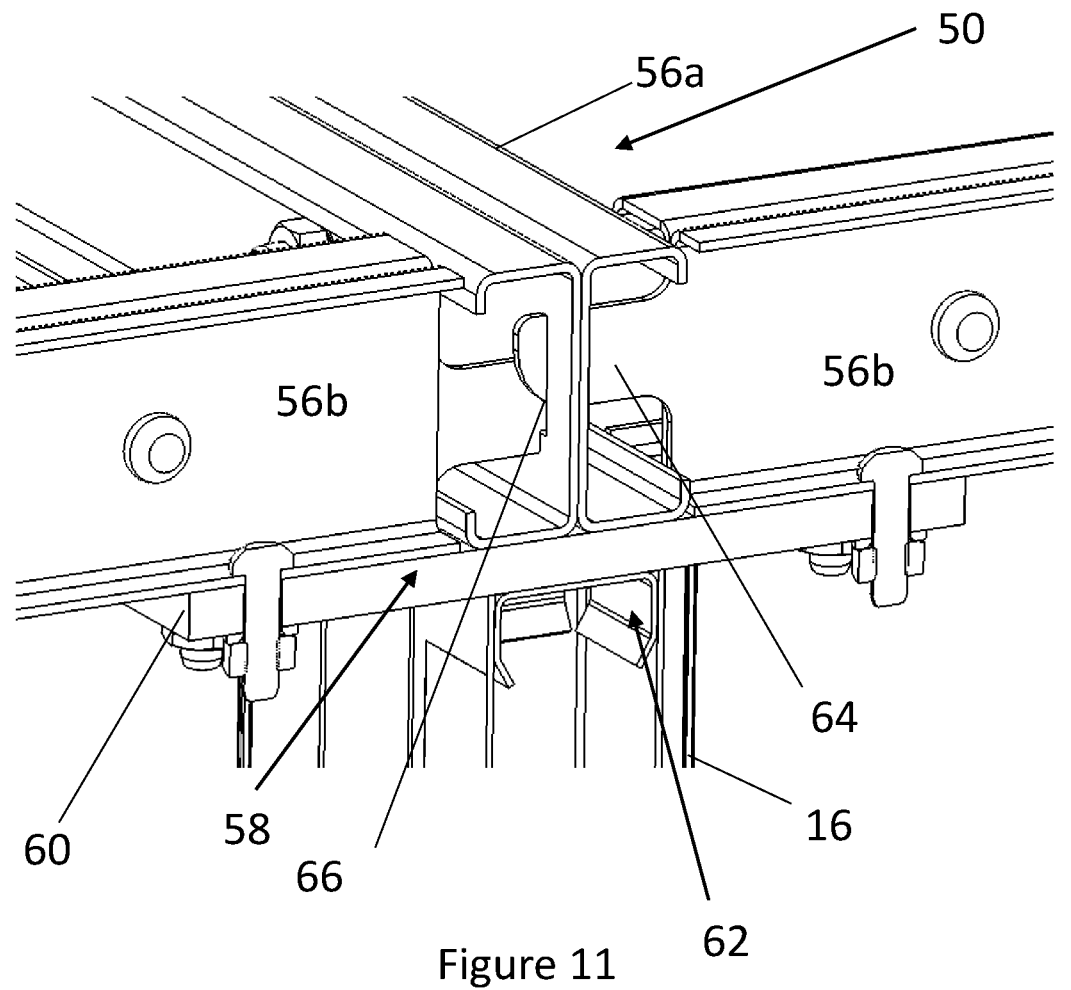
FIG. 11 is a perspective cross sectional view of the interconnection of the vertical uprights to the grid members by the cap plate at a node.

A connection plate or cap plate 58 as shown in FIG. 8 can be used to link or join the individual track support elements 56 together in both the first and the second direction at the junction where multiple track support elements cross in the grid structure 40, i.e. the cap plate 58 is used to connect the track support elements 56 together to the vertical uprights 16. As a result, the vertical uprights 16 are interconnected at their upper ends at the junction where the multiple track support elements cross in the grid structure 40 by the cap plate 58, i.e. the cap plate is located at the node 50 of the grid structure 40. As shown in FIG. 10, the cap plate 58 is cross shaped having four connecting portions 60 for connecting to the ends or anywhere along the length of the track support elements 56 at their intersections 50. The interconnection of the track support elements to the vertical uprights at the nodes by the cap plate 58 is demonstrated in the cross-sectional profile of the node 50 shown in FIG. 11. The cap plate 58 comprises a spigot or protrusion 62 that is sized to sit in the hollow central section 46 of the vertical upright 16 in a tight fit for interconnecting the plurality of vertical uprights 16 to the track support elements as shown in FIG. 11. Also shown in FIG. 11 are the track support elements 56a, 56b extending in both perpendicular directions corresponding to the first direction (x-direction) and the second direction (y-direction). The connecting portions 60 are perpendicular to each other to connect to the track support elements 56a, 56b extending in the first direction and in the second direction respectively. The cap plate 58 is configured to be bolted to the ends of the track support elements 56a, 56b or along the length of the track support elements. Each of the track support elements 56a, 56b is arranged to interlock with each other at the nodes to form the grid structure 40 according to the present invention. To achieve this, distal or opposing ends of each of the track support elements 56a, 56b comprise locking features 64 for interconnecting to corresponding locking features 66 of adjacent track support elements. In the particular embodiment of the present invention, opposing or distal ends of one or more track support elements comprise at least one hook or tongue 64 that is receivable in openings or slot 66 midway along an adjacent track support element 56 at the junction where the track support elements cross in the grid structure 40. Referring back to FIG. 9 in combination with FIG. 11, the hooks 64 at the end of a track support element 56 are shown received in an opening 66 of an adjacent track support element extending across a vertical upright 16 at the junction where the track support elements 56 cross. Here, the hooks 64 are offered up to an opening 66 either side of a track support element 56b. The opening 66 is halfway along the length of the track support element 56 so that when assembled together, adjacent parallel track support elements 56 in the first direction and in the second direction are offset by at least one grid cell. This is demonstrated in FIG. 8.

Figure 12:
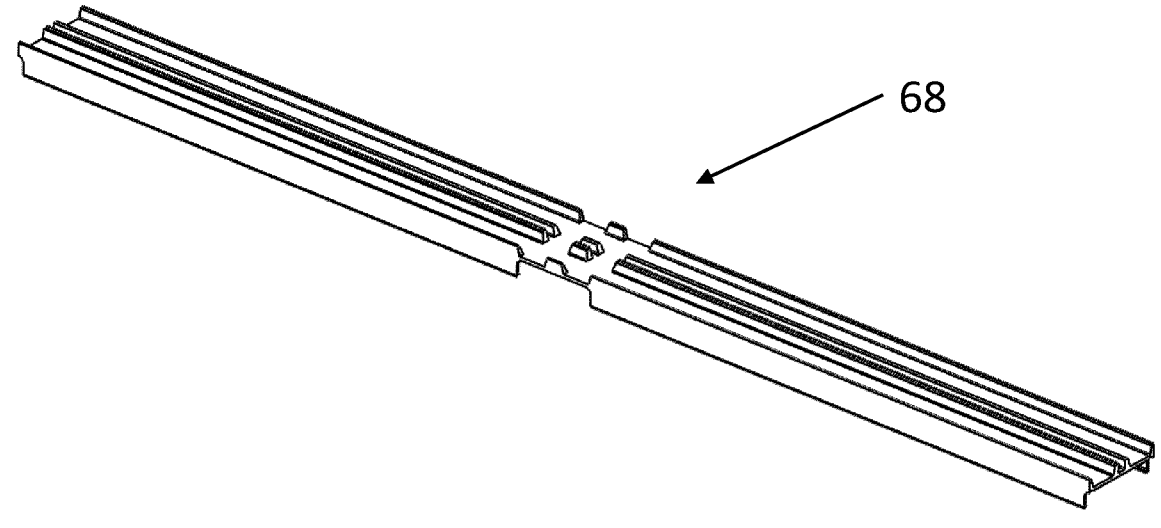
FIG. 12 is a perspective view of a track or rail.

To complete the grid structure 40 once the track support elements are interlocked together in a grid pattern comprising track supports 18 extending in the first direction and track supports 20 extending in the second direction, a track 22a, 22b is mounted to the track support elements 56. The track 22a, 22b is either snap-fitted and/or fitted over the track support 18, 20 in a slide fit arrangement (see FIG. 8). Like the track support, the track comprises a first set of tracks 22a extending in the first direction and a second set of tracks 22b extending in the second direction, the first direction being perpendicular to the second direction. A first set of tracks 22a is sub-divided into multiple track elements 68 in the first direction such that, when assembled, adjacent parallel track elements in the first direction are offset by at least once grid cell. Similarly, a second set of tracks 22b is sub-divided into multiple track elements 68 in the second direction such that, when assembled, adjacent track elements in the second direction are offset by at least one grid cell. This is demonstrated in FIG. 8. An example of a single track element 68 is shown in FIG. 12. As with the track support elements, multiple track elements in the first direction and the second direction are laid together to form a track in both directions. The fitting of the track element 68 to the track support 18, 20 comprises an inverted U-shaped cross-sectional profile that is shaped to cradle or overlap the top of the track support 18, 20. One or more lugs extending from each branch of the U shape profile engage with the ends of the track support 18, 20 in a snap fit arrangement. Equally plausible is that the track 22a, 22b can be integrated into the track supports 18, 20 rather than being separate components.

As can be appreciated from the above description, the process of assembling the grid framework structure involving erecting the vertical uprights, connecting the grid members and mounting the tracks is very time consuming since multiple separate components are necessary to assemble the grid framework structure. The process of erecting the grid framework structure can take several weeks and in a worst case scenario, the process can take several months. As the demand for e-commerce grows rapidly, there has been an increased demand for distribution centres, otherwise known as customer fulfilment centres (CFCs), in more locations rather than just a few locations that serve major cities in order to fulfil a growing demand from customers. The increased presence of distribution centres in more locations also has the effect of reducing the time to complete the last mile logistics for the movement of goods from the distribution centre to its final destination. Such last mile logistics is also an important consideration in order to keep goods such as perishable grocery products fresh at their final destination. One of the major bottlenecks to providing distribution centres in more locations is the time and cost to erect the grid framework structure. Not only is the time and cost to erect the grid framework structure a cause of concern when setting up a distribution centre, but also the grid framework structure should have the flexibility to be assembled in a number of existing locations including existing warehouses rather than building bespoke warehouses purely to house the grid framework structure.

The present applicant has mitigated the above problem by forming the grid framework structure according to the present invention from fewer structural components than is currently practised described above, while still maintaining the structural integrity of the existing grid framework structure for bearing the weight of one or more robotic load handling devices (which can weigh as much as 150 kg) operative on the grid framework structure. In contrast to the existing grid framework structure as described above, the grid framework structure according to the present invention is erected from prefabricated modular components. The prefabricated modular components are load bearing in the sense that when assembled together to form the grid framework structure, the prefabricated modular components provide a three dimensional load bearing structure to support one or more load handling devices moving on the grid structure. The use of prefabricated modular components to erect the grid framework structure according to the present invention allows the grid framework structure to be assembled at a much faster rate than the traditional 'stick-built' approach where individual vertical uprights are initially erected one by one on the floor, and then subsequently mounting the track supports to the upper end of the vertical uprights.

Figure 13:
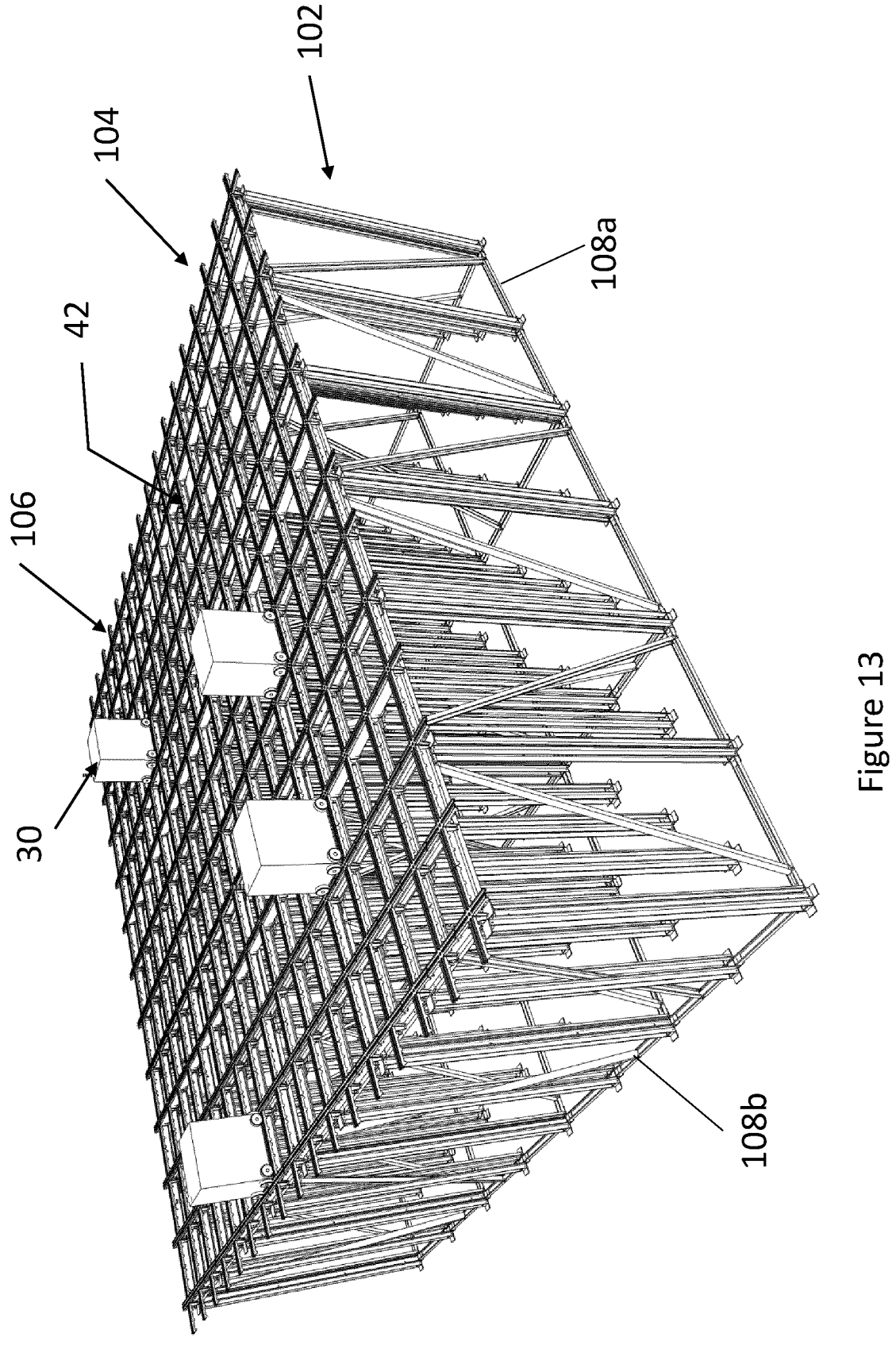
FIG. 13 is a perspective view of the grid framework structure according to an embodiment of the present invention.

FIG. 13 is a grid framework structure 101 assembled from prefabricated modular structural components according to the present invention. The grid framework structure can be divided into a supporting framework structure 102, a grid structure 104 and a track system 106 for guiding one or more robotic load handling devices 30 on the grid structure 104. When assembling the grid framework structure 101, the supporting framework structure 102 is first assembled and then the grid structure 104 is mounted to the supporting framework structure 102. The grid structure 104 is raised above the ground by the supporting framework structure 102 to create an open storage space for the storage of multiple stacks of storage containers. The supporting framework structure 102 or the grid structure 104 or both the supporting framework structure 102 and the grid structure 104 can be assembled from modular structural components. In the particular embodiment shown in FIG. 13, both the supporting framework structure 102 and the grid structure 104 are assembled from prefabricated modular structural components to form a three dimensional grid framework structure 101. Details of the assembly of the supporting framework structure 102, grid structure 104 and the track system 106 from modular components will be discussed below.

Supporting Framework Structure

In accordance with the present invention, the supporting framework structure 102 is constructed from a plurality of prefabricated modular panels 108*a,b*. The term "supporting framework structure" and "framework structure" are used interchangeably in the patent specification to mean the same feature in the sense of supporting the grid structure and the track system. The grid framework structure is the combination of the supporting framework structure, grid structure and the track system. Prefabrication of the modular panels 108*a,b* involves assembling and fixing separate components of the supporting framework structure 102 together prior to erecting the supporting framework structure 102 such that the components of each of the prefabricated modular panels 108*a,b* lie in a common plane. In other words, the prefabricated modular panels 108*a,b* can be envisaged to be planar. This allows ease of assembly of the supporting framework structure 102 since the use of prefabricated modular panels 108*a,b* greatly reduces the time and effort to assemble the supporting framework structure 102 rather than erecting a plurality of vertical uprights one by one in a "stick by stick" approach and then mounting the grid structure to the supporting framework structure as currently practised in the art. To assemble the supporting framework structure 102 according to the present invention, a plurality of the prefabricated modular panels 108*a,b* are arranged in a grid pattern comprising a plurality of grid cells or grid spaces 110. To arrange a plurality of prefabricated modular panels 108*a,b* in a grid pattern, the plurality of prefabricated modular panels 108*a,b* comprises a first set of parallel prefabricated modular panels 108*a* and a second set of parallel prefabricated modular panels 108*b*. The first set of parallel prefabricated modular panels 108*a* extend in a first direction and the second set of parallel prefabricated modular panels 108*b* extend in a second direction, the second direction being substantially perpendicular to the first direction such that the plurality of the prefabricated modular panels are arranged in a grid pattern comprising a plurality of grid cells or grid spaces 110. The first and second directions can represent X and Y axes of a Cartesian coordinate system.

Figures 14, 15:
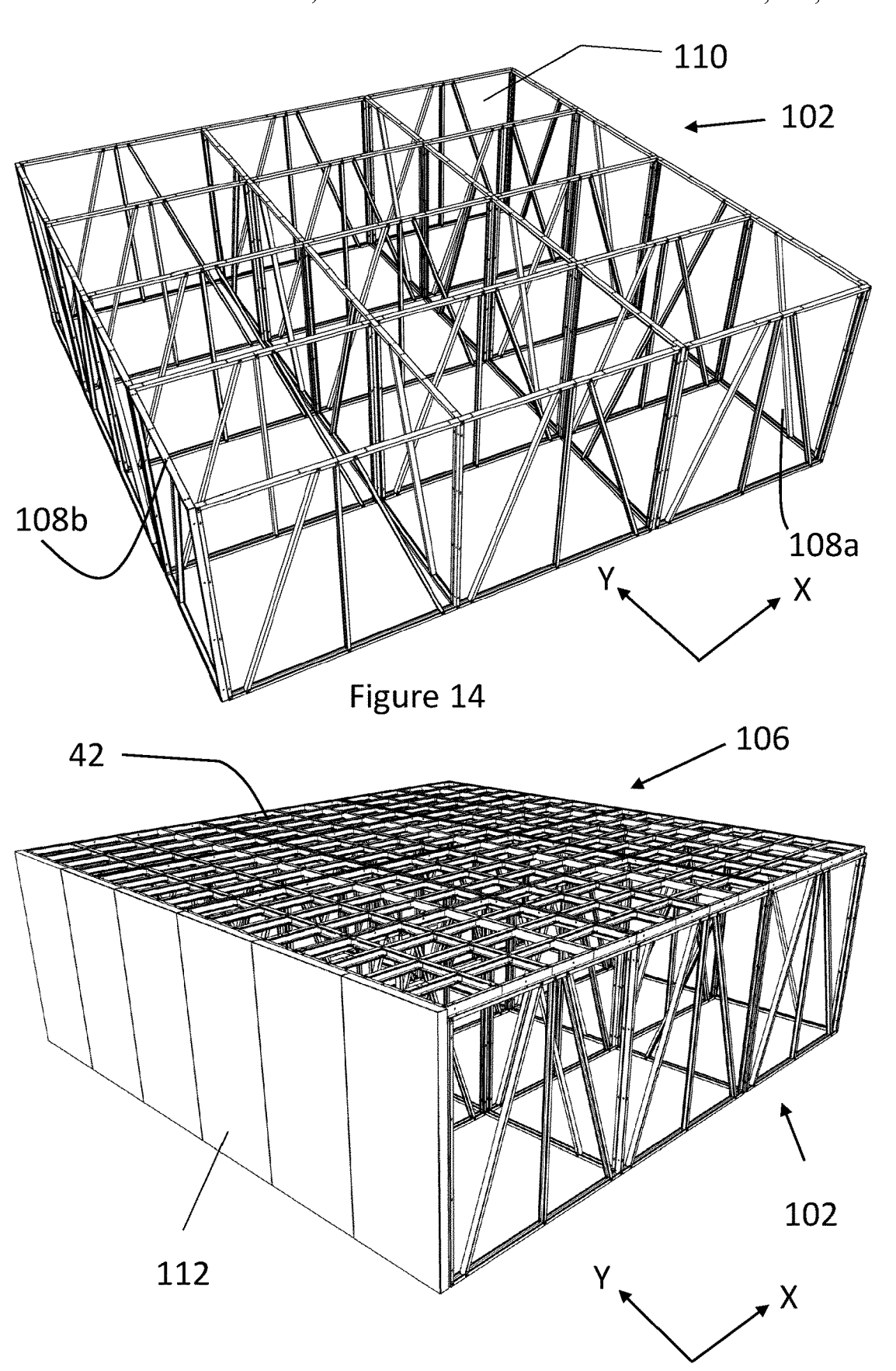
FIG. 14 is a perspective view of the supporting framework structure according to the present invention.
FIG. 15 is a perspective view of cladding at least one exterior wall of the supporting framework structure according to the present invention.

FIG. 14 is an example of the supporting framework structure 102 for supporting the grid structure 104 according to the present invention fabricated from an assembly of prefabricated modular panels 108*a,b* to create one or more storage spaces 110. Each of the one or more storage spaces 110 is sized to store a plurality of stacks of storage containers commonly known as storage bins. Prefabrication of the modular panels involves assembling and fixing separate components of the supporting framework structure together prior to erecting the supporting framework structure. There are numerous ways in which this can be achieved in accordance with the present invention. In one example, prefabrication of the modular panels can be achieved through additive manufacturing, e.g. 3D printing. The 3D printed modular panels can then be assembled into the supporting framework structure. In a particular embodiment of the present invention, prefabrication of the modular panels involves prefabricating a sub-group of the plurality of uprights together to form prefabricated braced frames that would facilitate ease of assembly of the supporting framework structure. Further detail of the assembly of the prefabricated braced frames is discussed below. The same principle of prefabrication can be applied to the grid structure and the track system for guiding the robotic load handling devices on the grid structure. Various lightweight materials can be used in the prefabrication of modular panels. These include but are not limited to metal, plastic, or a fibre reinforced composite material. One of the key features of the prefabricated modular panels is that fewer components are needed to assemble the supporting framework structure and the prefabricated modular panels can be flat packed to facilitate ease of transport. The other key feature of the prefabricated modular panels making up the supporting framework structure is that they are planar in the sense that each of the prefabricated modular panels lies in its respective plane. The planar configuration of the prefabricated modular panels enables a plurality of prefabricated modular panels to be arranged in a grid pattern comprising a plurality of grid cells or grid spaces. For example, a plurality of prefabricated modular panels comprises a first set of parallel prefabricated modular panels extending in a first direction and a second set of parallel prefabricated modular panels extending in the second direction, the second direction being substantially perpendicular to the first direction.

The prefabricated modular panels 108*a,b* forming the supporting framework structure according to the particular embodiment of the present invention shown in FIG. 14 are each configured as prefabricated braced frames or panels as shown in FIGS. 16*a* to 16*d* comprising a plurality of uprights braced together by one or more bracing members extending between the plurality of uprights. Not all of the prefabricated modular panels in the supporting framework structure can be prefabricated braced frames as shown in FIG. 14, and the prefabricated modular panels can be a combination of one or more of the prefabricated braced frames and one or more of another type of prefabricated modular panel, e.g. 3D printed panel. However, in the particular embodiment of the present invention shown in FIG. 14, each of the prefabricated modular panels 108*a,b* is a prefabricated braced frame comprising a plurality of upright members braced together by one or more bracing members. The bracing allows a sub-group of uprights to be assembled together prior to being assembled in the supporting framework structure. To enable the prefabricated braced frames to be flat packed to facilitate transport, the plurality of uprights of each of the prefabricated braced frames extend in a common plane and are secured together by one or more bracing members. The one or more bracing members connecting the plurality of uprights lie in the same plane as the plurality of the uprights such that each of the prefabricated braced frames is planar. Each upright of the plurality of uprights can be a solid support beam of I-shape or H-shape comprising opposing beam flanges to enable the uprights to be braced together by the one or more bracing members.

One or more external walls of the supporting framework structure 102 can be cladded with one or more solid walled panels 112 as shown in FIG. 15 so as to encase the interior space of the supporting framework structure. The one or more solid walls 112 can be insulated providing a thermal barrier to prevent escape of heat from the interior space of the supporting framework structure 102. In the case where the contents of the storage containers are temperature sensitive such as grocery items, insulating cladding 112 encasing the exterior walls of the supporting framework structure 102 has the advantage of preventing the transfer of heat between the interior of the supporting framework structure 102 and the exterior. For example, the interior space of the supporting framework structure 102 can be the chilled zone operating within the temperature range between substantially 0° C. to substantially 5° C. or the frozen zone operating within the temperature range between substantially –25° C. to substantially 0° C., preferably between substantially –21° C. to substantially –18° C. The exterior walls of the supporting framework structure can also be cladded to improve the aesthetic appearance of the supporting framework structure.

In the particular embodiment shown in FIGS. 16a to 16d, the plurality of uprights 116 of each of the prefabricated braced frames 114 making up the supporting framework structure are braced by both horizontal 120a,b and diagonal bracing members 118. The plurality of horizontal bracing members 120a,b connecting the upper and lower ends of the plurality of uprights 116 and the diagonal bracing members 118 extend between the uprights 116. The horizontal bracing members 120a,b function as a load bearing beam extending between the uprights 116, particularly mounted at their upper ends. The horizontal bracing members 120a,b include but are not limited to load bearing beams having cross-sectional shapes like L (angles), C (channels) or tubes. The horizontal bracing members 120a,b can be envisaged to represent the chords that connect the uprights 116 at their upper and/or lower ends. Bracing at least two of the uprights 116 at their upper and/or lower ends by at least one horizontal bracing member 120a,b forms at least one drag strut or collector commonly known in the art. A drag strut or collector is where the at least two vertical uprights are braced by a horizontal beam at the upper end of two uprights and functions to collect and transfer diaphragm shear forces to the uprights.

In addition to at least one horizontal bracing member 120a,b extending between the plurality of uprights 116 of each of the prefabricated brace frames 114(a to d), at least one diagonal bracing member 118 can be connected to the uprights to provide additional stability to the prefabricated braced frame. The bracing members 118, 120a,b extending between the plurality of uprights 116 are designed to work in tension and compression similar to a truss. The bracing between the plurality of uprights can be designed in different patterns including cross-bracing, K-bracing, V-bracing and/or eccentric bracing. Cross-bracing, also known as X-bracing, is made of two diagonal bracing members crossing each other. The bracing members in K bracing are arranged to form a K shape between the plurality of uprights. In the particular embodiment of the present invention, the pattern of the bracing members 118, 120a,b connecting the plurality of uprights 116 of each of the prefabricated braced frames 114(a to d) shown in FIGS. 16a to 16d adopts an eccentric bracing pattern which generally provides a V shaped pattern of bracing. The bracing members 118, 120a,b are fixedly connected to the uprights 116 by fasteners commonly known in the art. These include but are not limited to welding, bolts, rivets, or a combination thereof.

Figures 16A, 16B:
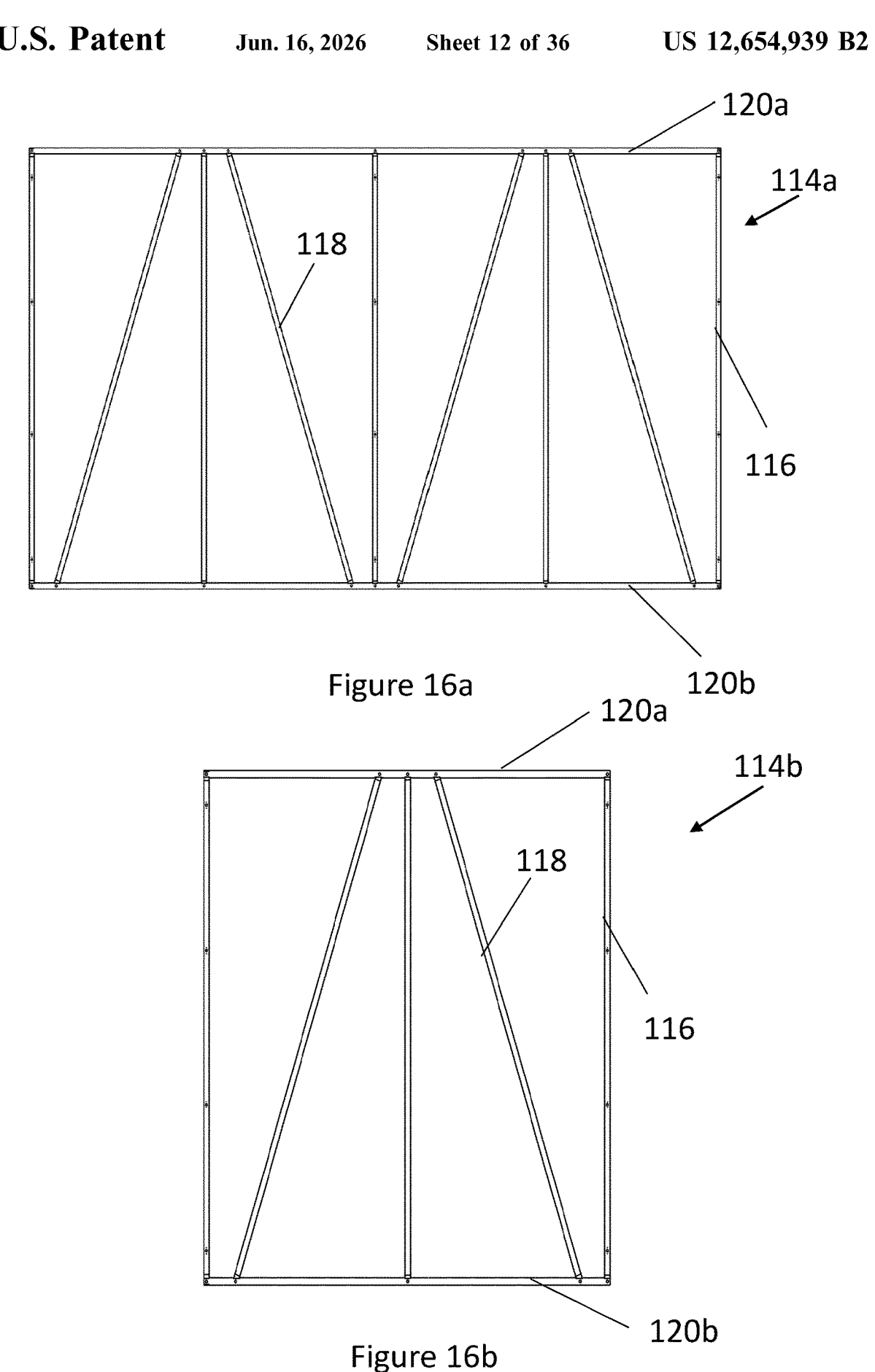
FIGS. 16*a* to 16*d* are a perspective view showing the different prefabricated braced frames for assembling into the supporting framework structure shown in FIG. 14.
Figures 16C, 16D:
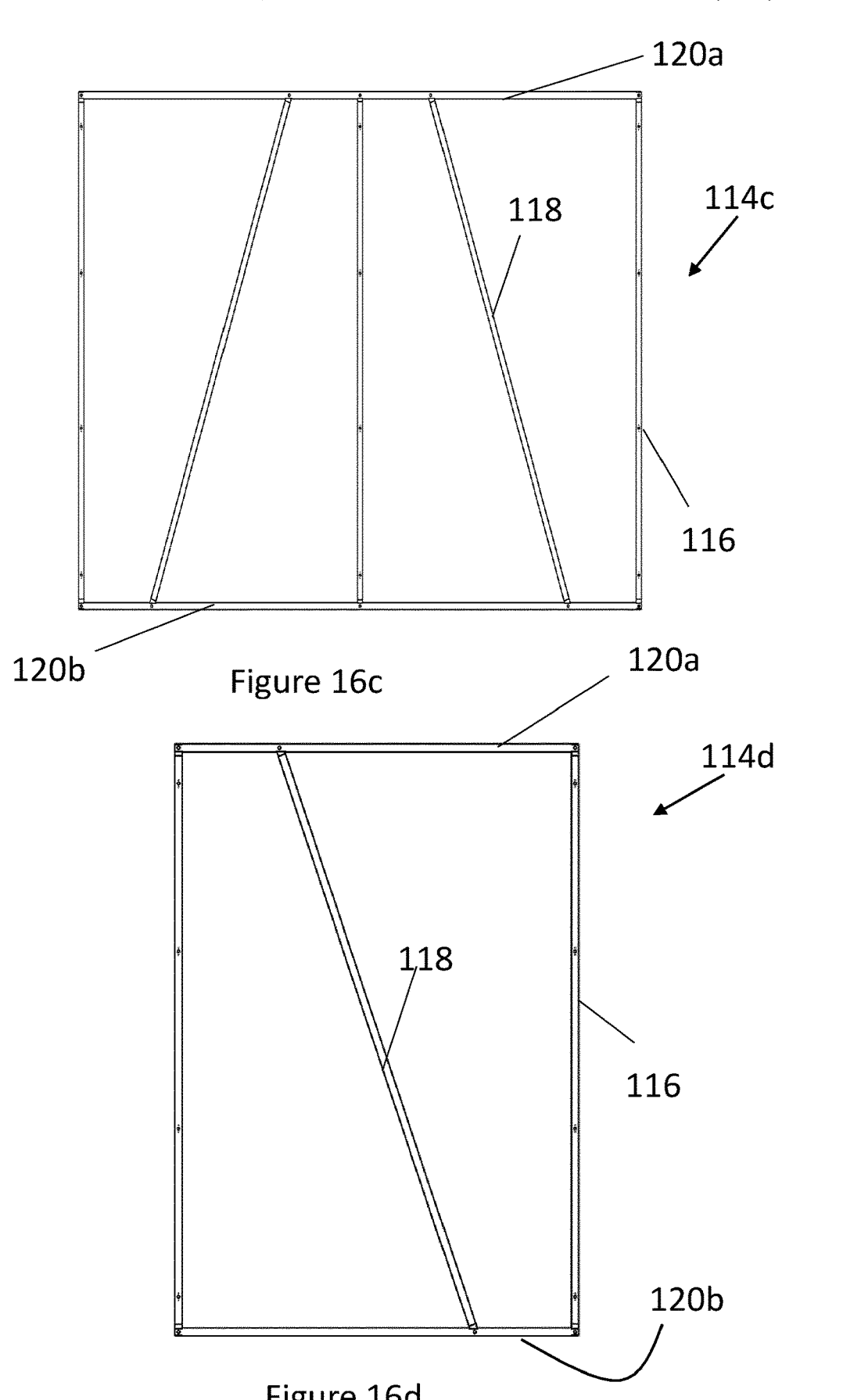

In order to achieve a rectilinear free standing supporting framework structure as shown in FIG. 14, different types of prefabricated braced frames 114(a to d) according to the present invention are connected together by one or more fasteners. The different types of prefabricated braced frames 114(a to d) shown in FIGS. 16a to 16d provide a triangulated 3 dimensional system of straight interconnected structural members that are in axial tension and/or compression. Each of the different types of prefabricated braced frames 114(a and d) comprises different numbers of uprights 116 braced by the one or more bracing members 118, 20a,b so as to provide different lengths of the prefabricated braced frames such that when assembled together a rectilinear free standing supporting framework structure results. In detail, the prefabricated braced frame 114a type shown in FIG. 16a comprises five uprights 116 spaced apart by being connected at their respective upper and lower ends by horizontal bracing members 120a,b and a diagonal bracing member 118 extending between the horizontal bracing members, i.e. a pair of connected uprights laterally disposed either side of a middle upright. The prefabricated braced frame type 114b shown in FIG. 16b is half the length of the prefabricated braced frame type 114a shown in FIG. 16a and comprises three upright 116 spaced apart by being connected to horizontal members 120a,b at their upper and lower ends and a diagonal bracing member 118 disposed between a pair of uprights 116. The simplest prefabricated brace frame type 114d is shown in FIG. 16d and comprises a pair of uprights 116 connected at their upper and lower ends by horizontal bracing members 120a,b and a diagonal bracing 118 extending between the pair of uprights 116.

Figure 17:
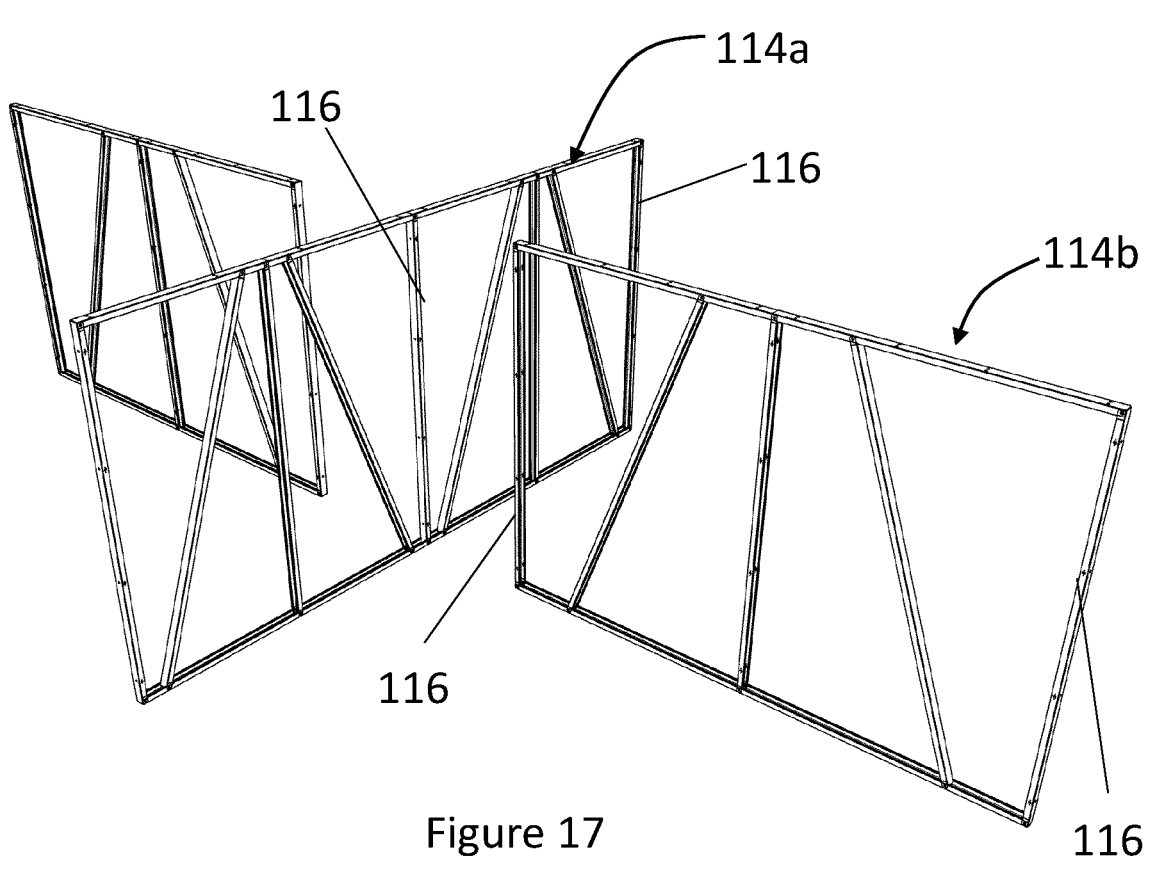
FIG. 17 is a perspective view showing the prefabricated braced frames being offered up to each other for connection.
Figure 18:
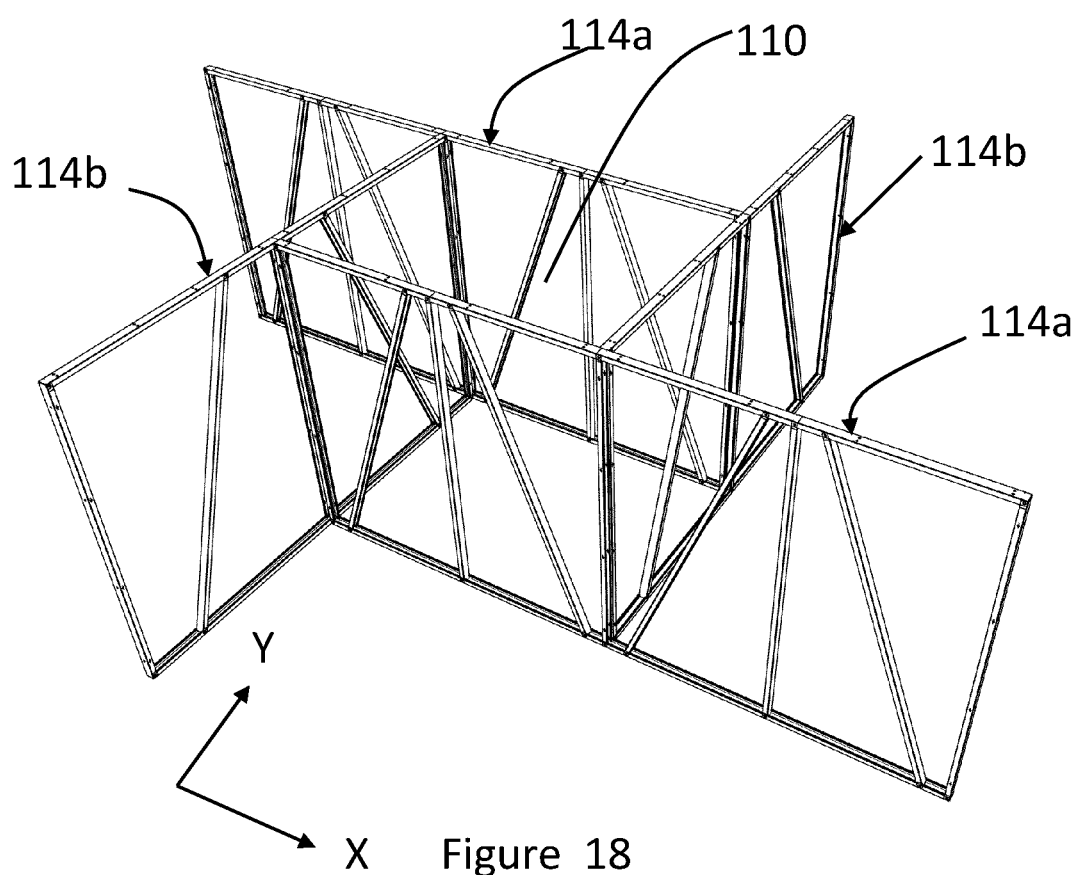
FIG. 18 is a perspective top plan view of a section of the supporting framework structure showing the arrangement of the prefabricated modular panels to define a grid cell according to the present invention.
Figure 19:
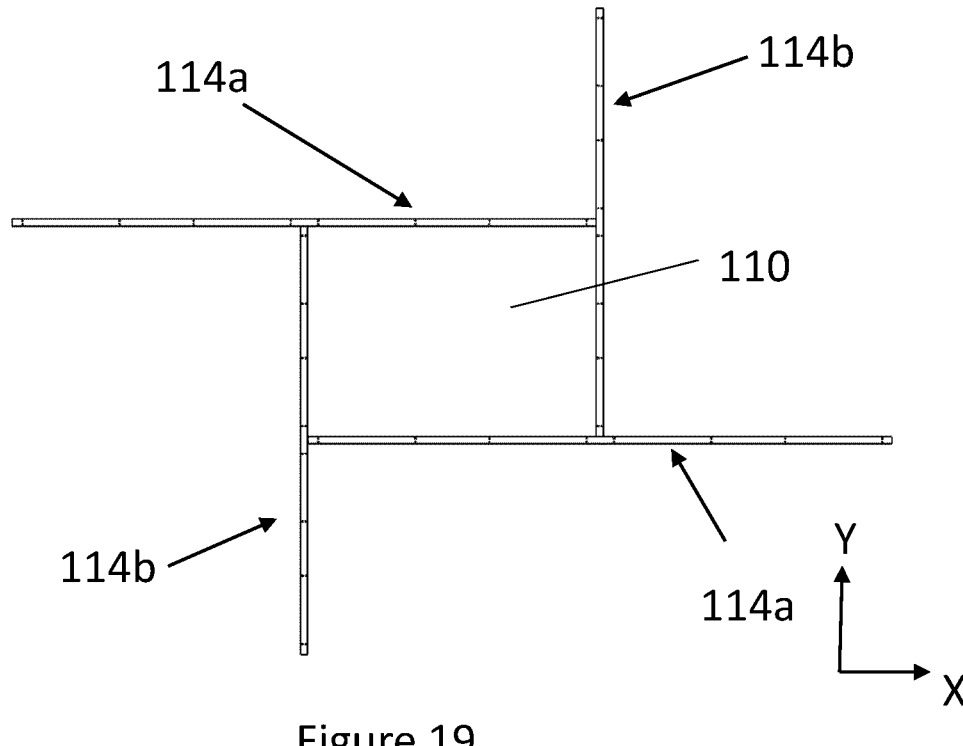
FIG. 19 is a perspective view showing the pattern of the prefabricated modular panels along one direction according to the present invention.
Figure 20:
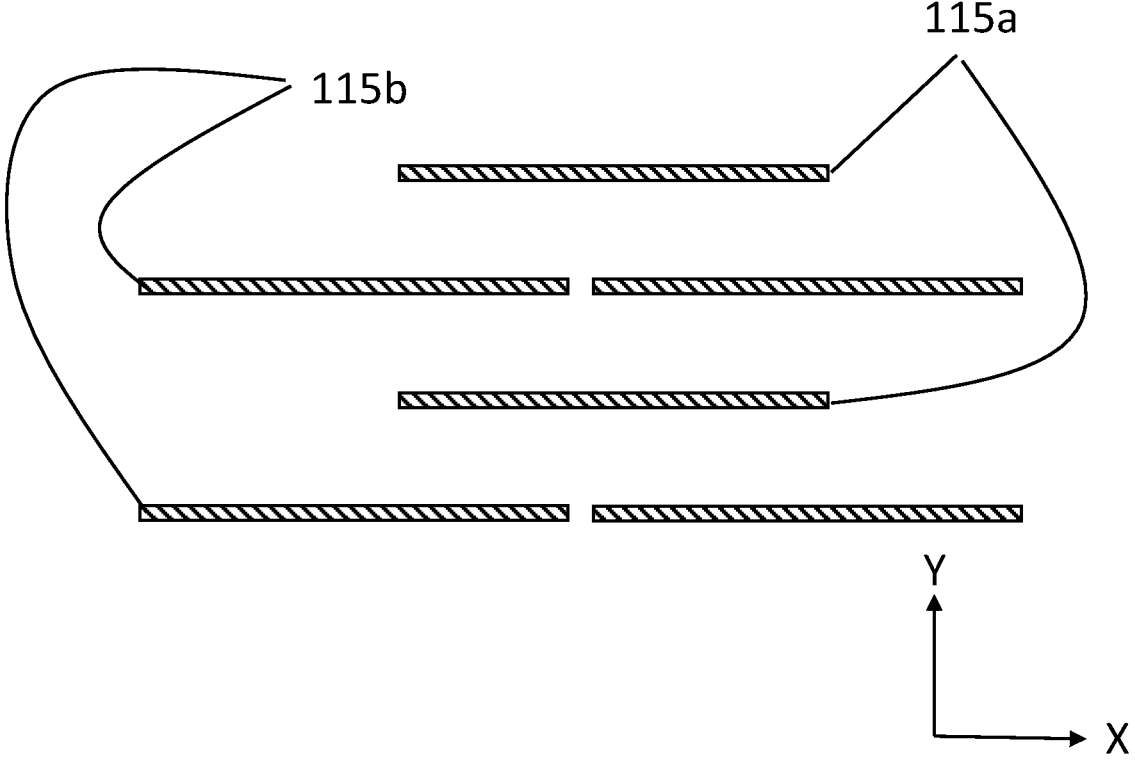
FIG. 20 is a perspective view showing the arrangement of the prefabricated braced frames to define a grid cell according to the present invention.

Connection of adjacent prefabricated braced panels in the supporting framework structure involves connecting one of the plurality of uprights of a prefabricated braced frame extending in the first direction with one of the plurality of uprights of a prefabricated braced frame extending in the second direction as demonstrated in FIG. 17. Here, the outer uprights 116 of adjacent prefabricated braced frames 114b extending in one direction are brought together to a middle upright 116 of another prefabricated braced frame 114a extending in the other direction such that the connected prefabricated braces frames 114a, 114b are substantially perpendicular. Various fasteners or fixtures known in the art can be used to connect adjacent prefabricated braced frames together. These include but are not limited to bolts, riveting, welding or even the use of a suitable adhesive. To improve the structural integrity of the supporting framework structure as a free standing structure, the first and second sets of parallel prefabricated braced frames are connected together such that parallel sets of prefabricated braced frames extending in the first and/or second direction are offset by at least one grid cell of the supporting framework structure. This is clearly demonstrated in the assembly shown in FIG. 18 and in a plan view in FIG. 19 showing a subset of the first set of parallel prefabricated braced frames 114a connected to a subset of the second set of parallel prefabricated braced frames 114b in a grid pattern to define a grid cell 110. This results in the first and second sets of parallel prefabricated braced frames adopting a woven-like or brick-like pattern where the prefabricated braced frames are offset by at least one grid cell in the first direction and/or in the second direction. To achieve this offset of the sets of parallel prefabricated braced frames in the first and second direction, the sets of parallel prefabricated braced frames can be sub-divided into a subset of parallel prefabricated braced frames extending in the first and/or second direction of the grid framework structure. Thus, the first set of parallel prefabricated braced frames is sub-divided into a first subset of parallel prefabricated braced frames and a second subset of parallel prefabricated braced frames. The second set of parallel prefabricated braced frames is similarly sub-divided into a first subset of parallel prefabricated braced frames and a second subset of parallel prefabricated braced frames. Each of the first and second subset of parallel prefabricated braced frames from the first and second sets of prefabricated braced frames can be any of the prefabricated braced frames 114(a to d) described above with reference to FIGS. 16a to 16d. The first and second subsets of the prefabricated braced frames extending in the first direction are spaced apart in the second direction. Similarly, first and second subsets of the prefabricated braced frames extending in the second direction are spaced apart in the first direction. An example of the offsetting pattern of the spaced apart first and second subsets of parallel prefabricated braced frames along one direction, e.g. the first direction, of the supporting framework structure is demonstrated in FIG. 20. The first direction is shown by the arrow extending in the X direction and the second direction is shown by the arrow extending in the Y direction. Here, the first 115a and second 115b subsets of parallel prefabricated braced frames extending in the first direction (X direction) are spaced apart in the second direction (Y direction), and are arranged in an alternating pattern. The same principle applies to the first and second subsets of parallel prefabricated braced frames extending in the second direction (Y direction), in the sense that they are spaced apart in the first direction (X direction) and are arranged in an alternating pattern. The cumulative effect of the alternating first and second subsets of parallel prefabricated braced frames in the first and second direction provides a free standing supporting framework structure.

Figure 21:
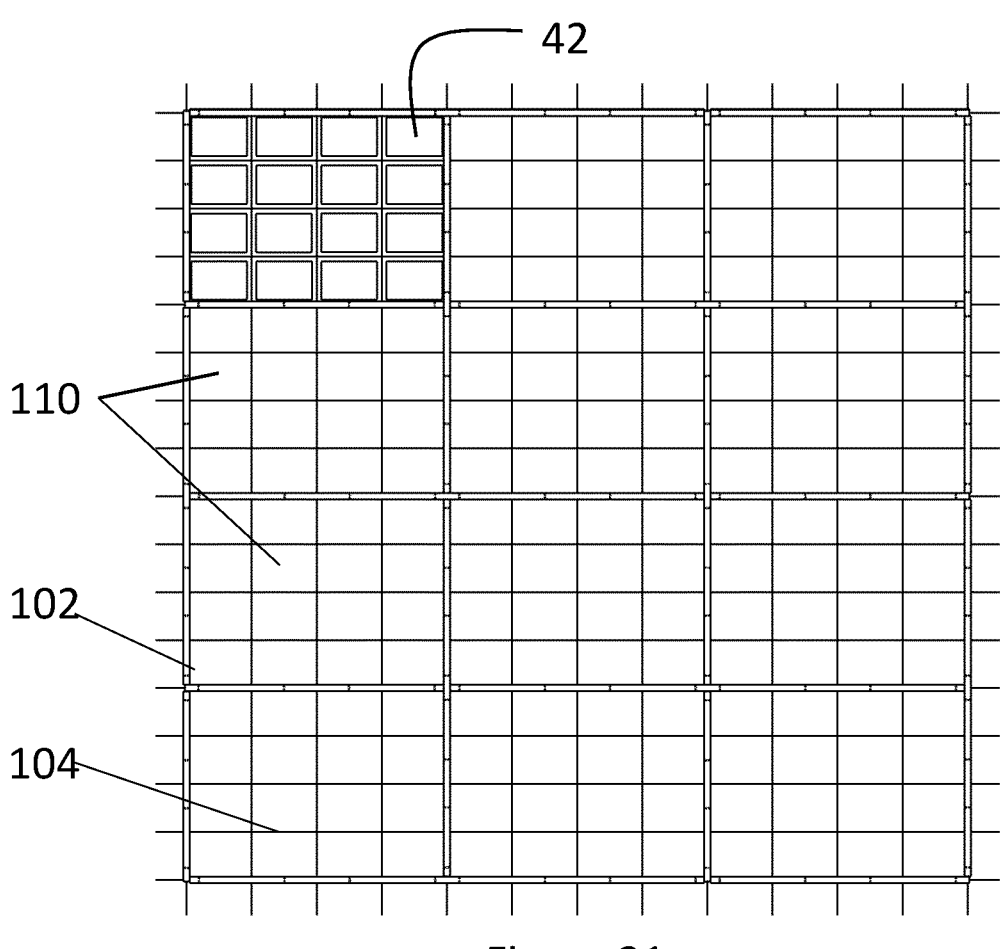
FIG. 21 is a perspective view showing a top plan view of the grid cells of the track system nested with each of the grid cells of the supporting framework structure.

As the plurality of prefabricated braced frames 114(a to d) in the supporting framework structure are arranged in a grid pattern comprising a plurality of grid cells 110 as demonstrated in FIG. 14, the grid cells 110 of the supporting framework structure function as storage columns for storing one or more stacks of storage containers or bins. To reduce the number of components of the supporting framework structure and thus increase the speed in which the supporting framework structure can be erected, the grid cells 110 of the supporting framework structure are sized so as to support a plurality of grid cells 42 of the grid structure 104. In other words, the ratio of the number of grid cells 42 of the grid structure 104 per grid cell 110 of the supporting framework structure 102 is X:1, where X is any integer greater than one, i.e. each of the grid cells 110 of the supporting framework structure 102 is sized to support a subset of the plurality of grid cells 42 of the grid structure 104, said subset comprising two or more grid cells 110 of the grid structure 104. In the particular embodiment of the present invention shown in the top plan view of the grid framework structure in FIG. 21, the plurality of the grid cells 110 of the supporting framework structure 102 are broken down such that there are twelve grid cells 42 of the grid structure 104 per grid cell 110 of the supporting framework structure 102. Thus, each of the grid cells 110 of the supporting framework structure 102 provides a storage space for the storage of twelve stacks of storage containers. The plurality of grid cells 110 of the supporting framework structure 102 shown in FIG. 21 generates multiple storage spaces for the storage of a plurality of stacks of storage containers within each of the storage spaces of the supporting framework structure. The supporting framework structure 102 shown in FIGS. 13 and 14 is not just limited to the prefabricated braced frames and can apply to any prefabricated modular panels including but not limited to 3D printed prefabricated modular panels, i.e. first and second subsets of prefabricated modular panels are arranged such that the first and second subsets of prefabricated modular panels in the first and second direction are offset by at least one grid cell.

The arrangement of the prefabricated braced frames in a grid pattern creates open storage spaces as demonstrated in the supporting framework structure shown in FIG. 14. Such grid cells 110 are able to accommodate multiple stacks of storage containers in the open storage spaces. However, conventional wisdom is of the understanding that the grabber device of the lifting mechanism and the storage containers in a stack below the grid structure would need to be guided along all four corners of the grabber device and/or the storage container along a storage column as it is lifted or hoisted towards the load handling device operative on the grid structure so as to prevent the storage containers from swinging side to side. The presence of uprights supporting the grid structure at each of the nodes where the grid members intersect in the grid structure allows the grabber device and/or the storage containers to be guided along all four of its corners. The present invention defies such conventional wisdom by allowing the containers to be lifted in free space towards the grid, i.e. without vertical uprights to guide the containers. In the present invention, it is realised that the grabber device and the lifting tethers used to engage and lift a container from storage towards the grid structure are stable enough to sufficiently lift the storage container vertically through a grid cell towards the load handling device without excessive swaying or fouling or hitting the grid cell or another storage container from an adjacent stack as the container approaches the grid structure. Typically, the load handling device is equipped with a lifting device or crane device arranged to lift a storage container from above. The lifting device comprises a set of lifting tethers extending in a vertical direction and connected at the four corners of a lifting frame, otherwise known as a grabber device (one tether near each of the four corners of the grabber device) for releasable connection to a storage container. The grabber device is configured to releasably grip the top of a storage container to lift it from a stack of containers in a storage system of the type shown in FIGS. 1 and 2. The lifting tethers supporting the grabber device at the four corners are sufficiently stable as the container is hoisted in a near vertical direction towards the grid structure along a vertical axis with little or no swaying of the grabber device and the container engaged thereon. This allows multiple adjacent stacks of containers to be stored side by side, each stack of containers located below a respective grid cell such that a load handling device operative on the grid structure is able to hoist the relevant container from storage. The absence of the vertical uprights for guiding the containers towards the grid structure minimises the effect of the vertical uprights impacting on the available space or area for the storage of containers. As a result, stacks of one or more containers can be stored closer together and therefore occupy spaces that were once occupied by the vertical uprights.

Figure 22:
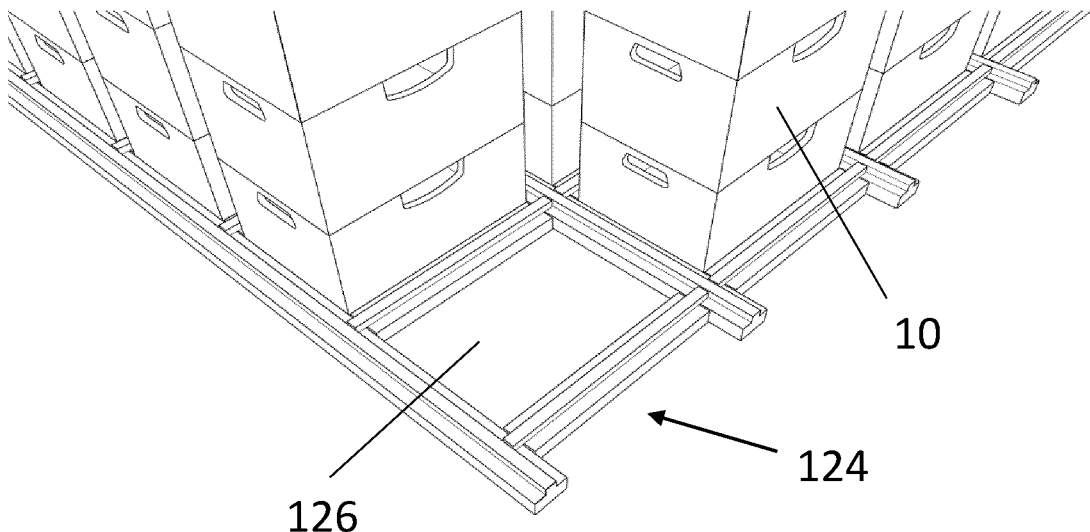
FIG. 22 is a perspective view showing the arrangement of stacks of storage containers on a floor rail according to the present invention.

However, to ensure that neighbouring stacks of containers 10 are sufficiently spaced apart in each of the storage spaces bound by the grid cells of the supporting framework structure, one or more stacks of containers can be placed on floor rails 124 arranged in a grid pattern comprising one or more grid cells 126 as shown in FIG. 22. The arrangement of the floor rail ensures that the grid pattern of the one or more grid cells 126 of the floor rail 124 aligns with the one or more grid cells of the grid structure above. This is to enable the stacks of containers to be arranged on the floor rail in the same grid pattern as the grid structure. Thus, the floor rails 124 allow one or more load handling devices operative on the grid structure 104 to be able to lower containers or storage bins in their correct position in the storage space.

Figure 23:
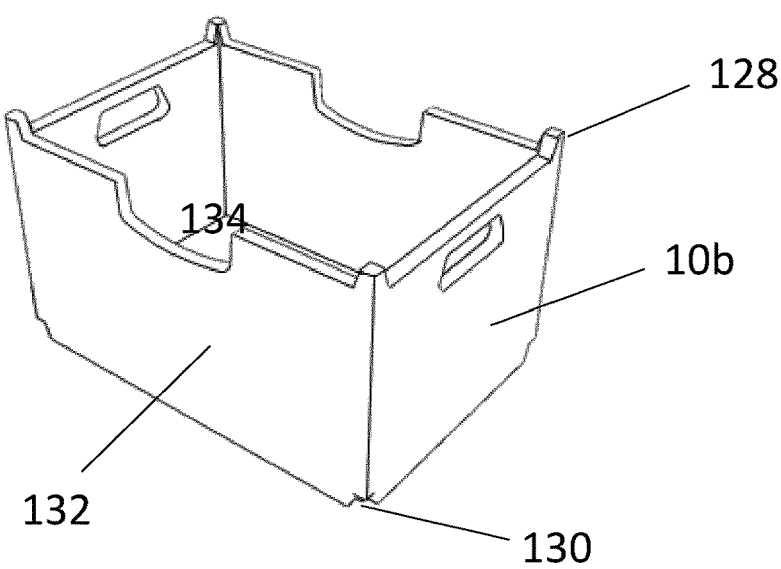
FIG. 23 is a perspective view showing an example of a self-stacking container or storage bin according to the present invention.

To further facilitate the containers or storage bins to be stacked in the correct position in the storage space, the containers or storage bins 10b can be modified with one or more locating pins or bosses 128 that are arranged to cooperate with correspondingly shaped recesses 130 in an adjacent container when placed on top in a stack. In the particular embodiment shown in FIG. 23, each of the containers or storage bins 10b comprises sidewalls 132 and a bottom wall 134 arranged in the form of a box with an open end for receiving goods or items to be stored. Each of the container or storage bin walls is modified to comprise one or more locating pins 128 at the rim of the container 10b and a corresponding recess 130 at the base or bottom wall 134 of the container. The rim of the container 10b comprises the one or more locating pins or bosses 128, which are shaped to be receivable in a corresponding shaped recess 130 in the bottom wall 134 of another container directly above in a stack. Using the terminology to describe the location of the containers in the grid framework structure discussed above where the container depth in storage is described by a depth value, Z, where Z=1 is the uppermost layer and Z=2 is the layer below the uppermost layer and so on as Z increases to the lowermost layer, the locating pins 128 of a container 10b in a lower layer (higher Z value) is arranged to be receivable in the recesses 130 in a container in an upper layer (lower Z value) as it is lowered vertically along a vertical axis by the load handling device. The locating pins 128 in the bottom container and the recesses 130 in the top container help to guide the containers in the correct position vertically in the stack. The locating pins and corresponding shaped recesses function as interlocking features that help to stabilise multiple containers vertically in a stack.

Figure 24:
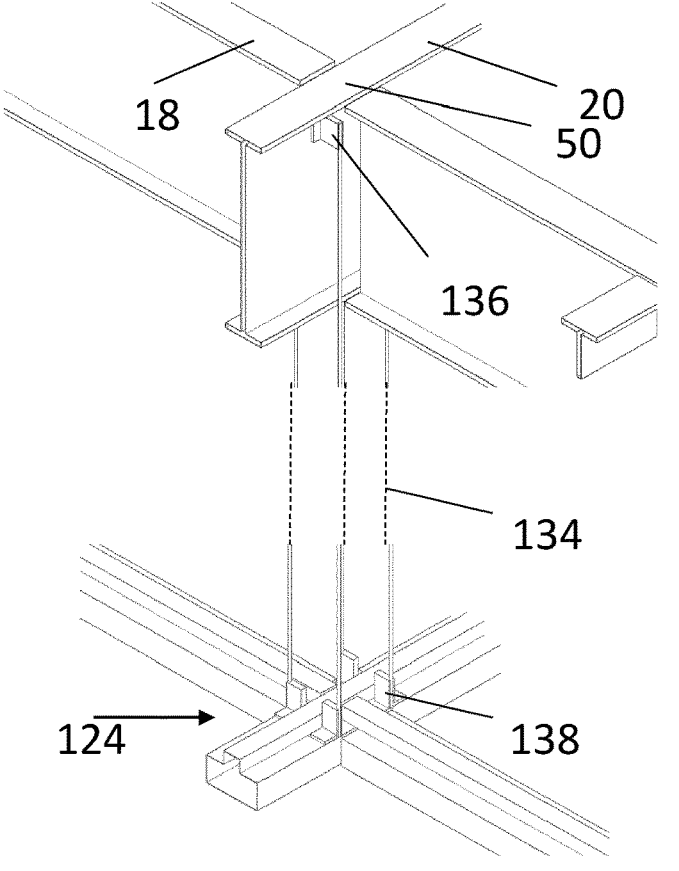
FIG. 24 is a perspective view of cable guides at the nodes or intersections of the grid members for guiding the movement of the storage bin or container in a stack.

However, the ability of the lifting tethers for stabilising lateral movement of the grabber device may diminish as the height of the supporting framework structure increases. As a result, in some circumstances, particularly for a relatively high supporting framework structure 102, it may be necessary to guide the storage containers as they are lifted towards a grid cell so as to prevent the storage containers from swinging or bumping against a neighbouring stack of storage containers and/or fouling the grid structure as they are lifted through a grid cell. In one aspect of the present invention, a plurality of guides in the form of cables or tethers (or guiding tethers) 134 can be arranged to extend between one or more intersections or nodes 50 of the grid structure and the floor. The cables or tethers 134 can be tensioned, i.e. using a pre-tensioner (not shown) commonly known in the art, to provide a surface for guiding the movement of the containers or storage bins along the tethers or cables 134 into their correct position into a stack. FIG. 24 shows a perspective view of multiple cables or tethers 134 anchored 136 at a node or intersection 50 of the grid structure 140 to one or more anchor points 138 strategically placed on the ground or floor corresponding to the corners of the grid cells such that one or more containers are guided along the tethers into the correct position in a stack. In the particular embodiment of the present invention shown in FIG. 24, a first end of a cable or guiding tether is anchored 136 to a grid member at a node and a second end of the cable or guiding tether is anchored 138 to a point where the floor rails 124 intersect on the ground.

The tethers or cables 134 are sufficiently tensioned to provide a guiding surface for the containers or storage bins to be lowered or be lifted in the correct position vertically in a stack or through a grid cell and thereby prevent containers in neighbouring stacks from colliding with each other as they are being lifted or lowered. Guiding of the containers vertically into a stack or through a grid cell is not limited to the tethers being anchored at the intersections or nodes of the grid cell since the containers or storage bins can be guided along any contact surface or wall of the containers or storage bins so as to allow the containers or storage bins to be positioned into the correct stack. Like the vertical uprights, a group of two or more tethers or cables 134 can be arranged to extend between the grid structure and the floor to create a single storage column for one or more containers or storage bins to be stored in a stack. Multiple tethers or cables 134 can be arranged to extend between the grid structure and the floor to create multiple storage columns. Each tether or cable 134 in the grid framework structure may be common for up to two or more separate storage columns, i.e. one or more tethers may be shared amongst adjacent storage columns. Four guiding tethers are shown in FIG. 24 extending between the grid structure and the floor rail at a node of the grid structure to provide a guiding surface for four adjacent containers or storage bins. This is repeated at one or more nodes of the grid structure.

Figure 25:
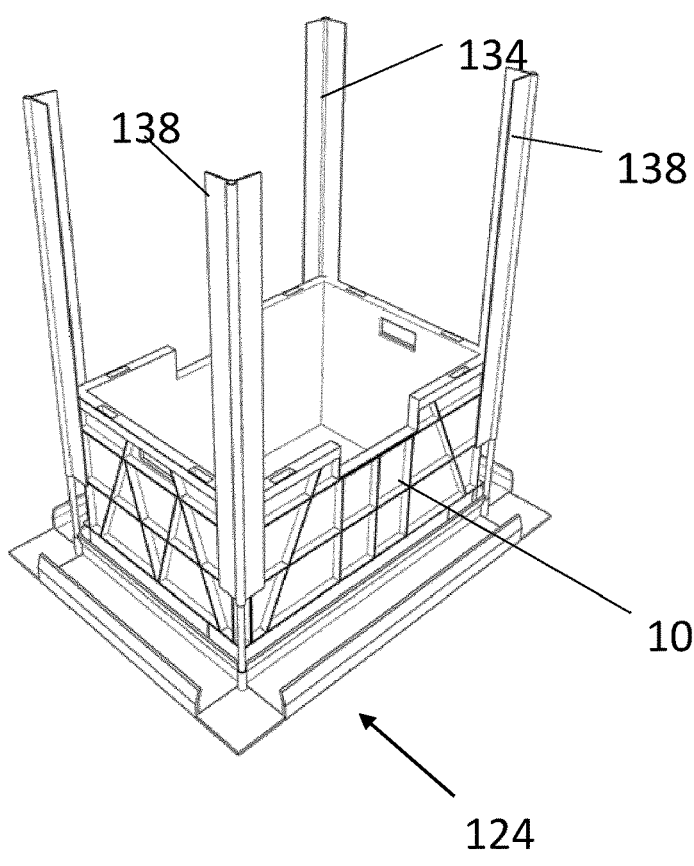
FIG. 25 is a perspective view of the cable guides comprising sleeves that are shaped to accommodate the corners of a storage bin or container according to an embodiment of the present invention.

Various known fixtures can be used to anchor the tethers or cables to the grid structure and the ground or floor. These include but are not limited to hooks. Tensioners include but are not limited to sprung based tensioners commonly known in the art. The guiding tethers 134 can be any cabling including but not limited to steel cabling, rope, etc. The guiding tethers 134 can comprise a sleeve 138 (see FIG. 25) or be coated with a polymeric material to facilitate the movement of the containers or storage containers along the guiding tethers to minimise abrasion to the containers or storage bins which are largely composed of plastic or wear to the guiding tethers. The sleeve 138 can be shaped to correspond to a corner section of container or storage bin. In the particular embodiment of the present invention shown in FIG. 25, the sleeve 138 is shaped to comprise two perpendicular bin guiding plates for accommodating a corner of a storage bin.

Other means to provide a guiding surface for guiding the storage container in a stack through a grid cell are applicable in the present invention. In the particular embodiment of the present invention shown in FIGS. 26, 27a and 27b, each guide 140 for guiding a storage container through a grid cell comprises an angled bar 142 where the longitudinal length of the angled bar extends between the grid structure and the floor. The angled bar 142 provides two perpendicular bin guiding plates for accommodating a corner of the storage container. The angled bars 142 function similarly to the guides 48 mounted to the vertical uprights described with reference to FIG. 2. The only difference is that the guides are not mounted to a vertical upright as found in existing supporting framework structures but rather is absent of the upright so as to largely behave as a guide for accommodating a corner of a storage container having little load bearing capability. The bulk of the load bearing capability of the supporting framework structure is provided by the prefabricated braced frames discussed above.

Four angled bars 142 are shown secured to a cap plate 144 at the upper and lower ends of the guides. The four angled bars 142 are arranged around a common cap plate 144 so as to accommodate the corners of four adjacent storage containers, i.e. four angled bars are symmetrically arranged about a centre point defined by the four angled bars such that the four angled bars are shared amongst four adjacent storage containers; the centre point being the cap plate 144. The cap plate 144 secured at the upper ends of the angled bars can be secured to the grid structure at the nodes where the grid members intersect by one or more bolts. The symmetrical arrangement of four angled bars about a centre point (cap plate) offers some level of load bearing capability for supporting the grid structure mounted to the cap plate and ensuring that the grid structure lies in a horizontal plane.

Figure 26:
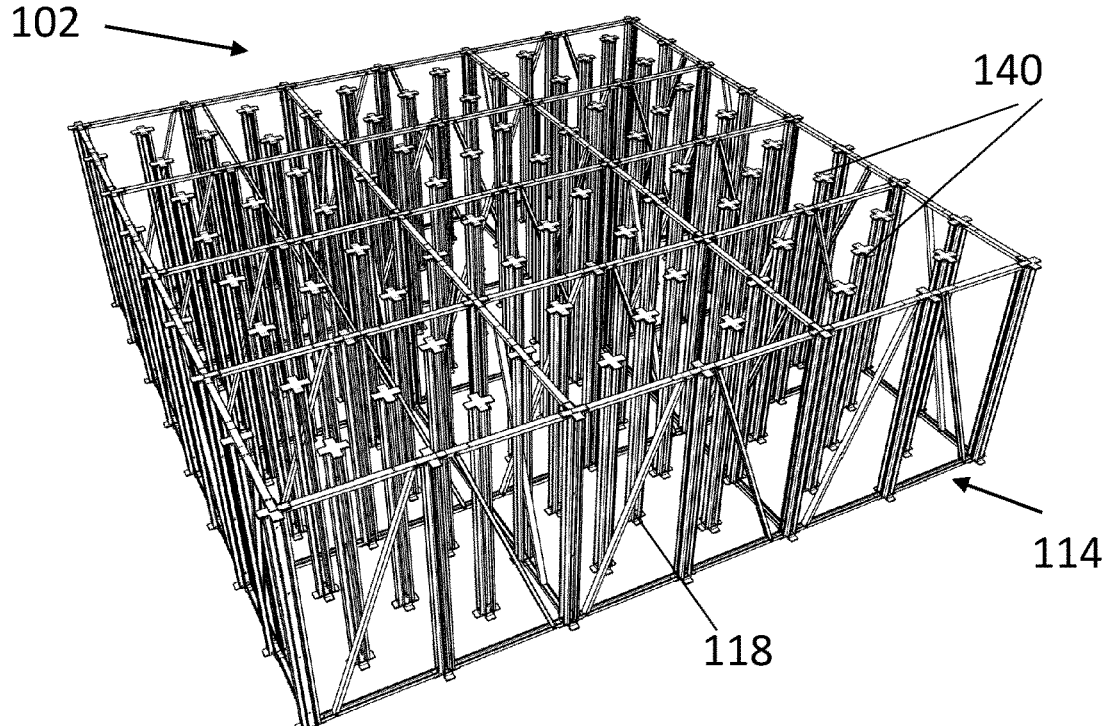
FIG. 26 is a perspective view of the supporting framework structure where the grid cells of the supporting framework structure comprise guides for guiding the storage containers through a grid cell of the grid structure according to the present invention.
Figure 27A:
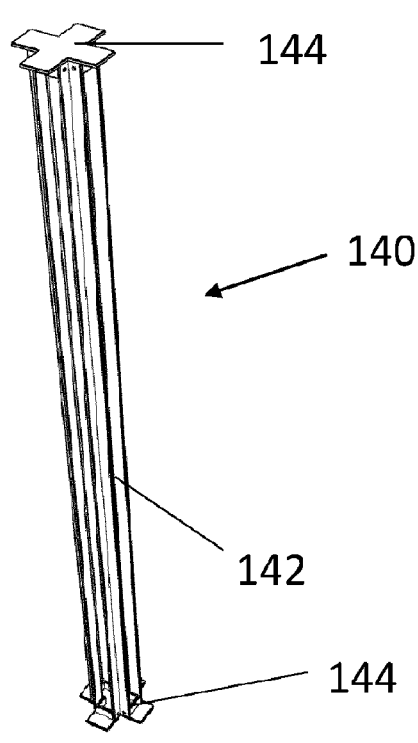
FIGS. 27*a* to 27*b* are a) a perspective view of a plurality of guides secured to a cap plate at the upper and lower ends of the plurality of guides, b) is an exploded view showing the arrangement of the plurality of guides and the cap plates at the upper and lower ends of the plurality of guides shown in FIGS. 28*a* to 28*d*.
Figure 27B:
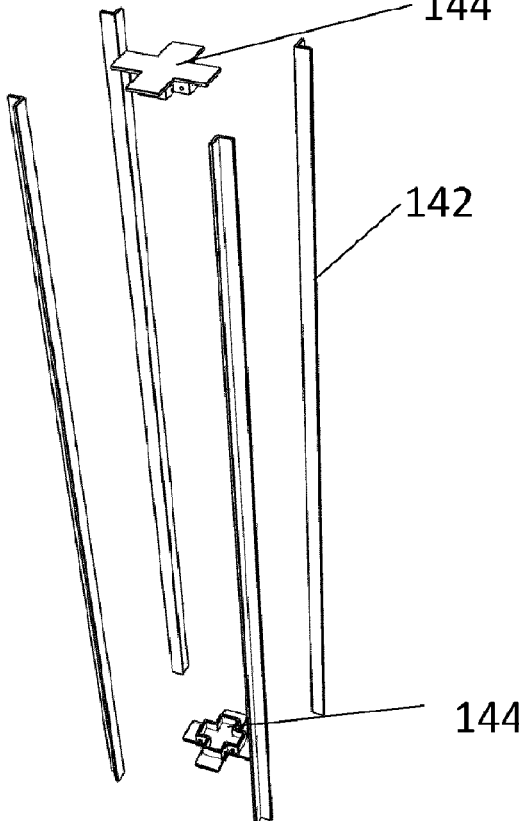
Figure 28A:
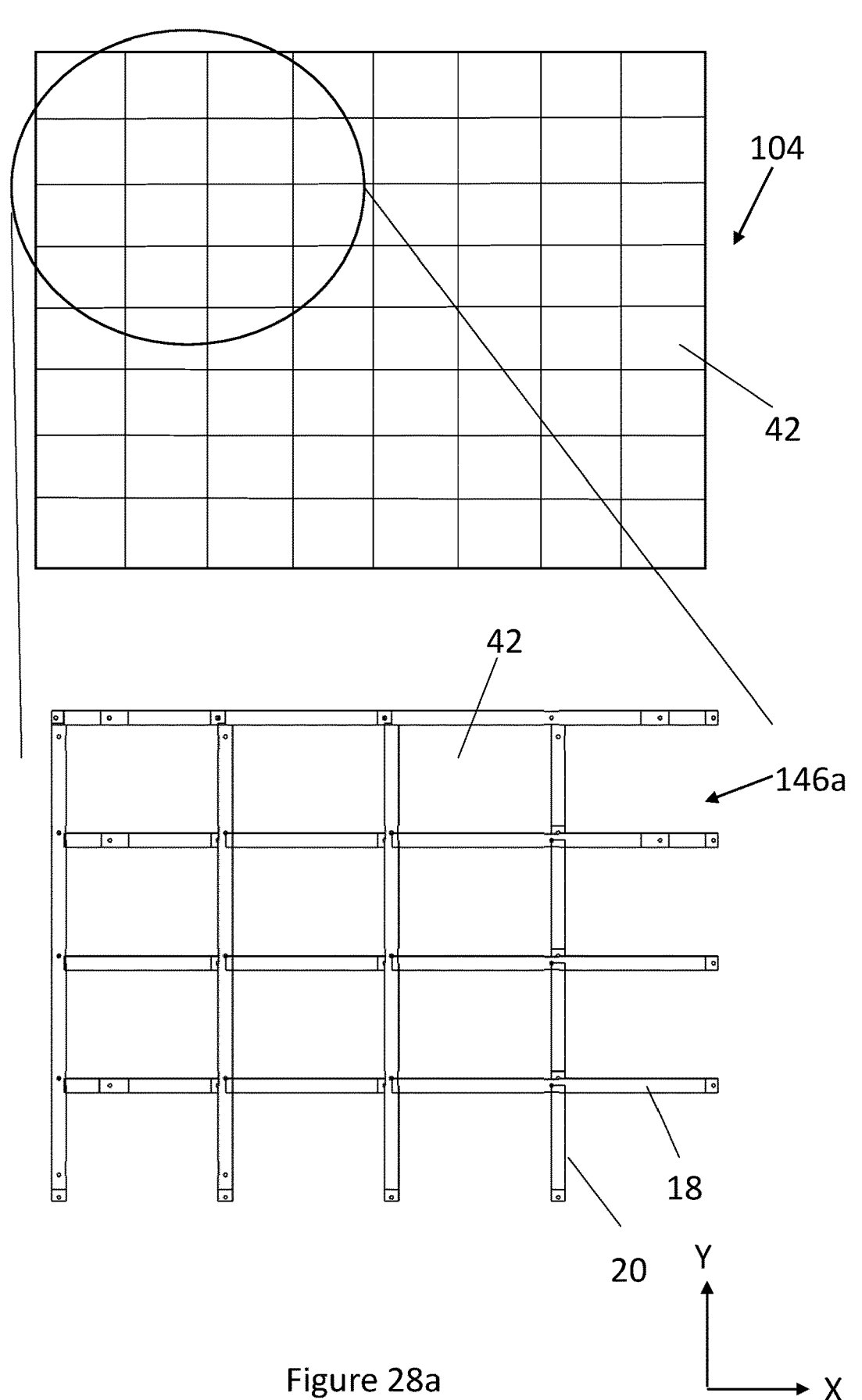
FIGS. 28*a* to 28*d* are schematic drawings showing the arrangement of a plurality of prefabricated sub-grid structures forming the grid structure, each of the plurality of prefabricated sub-grid structures representing a corner section of the grid structure.
Figure 28B:
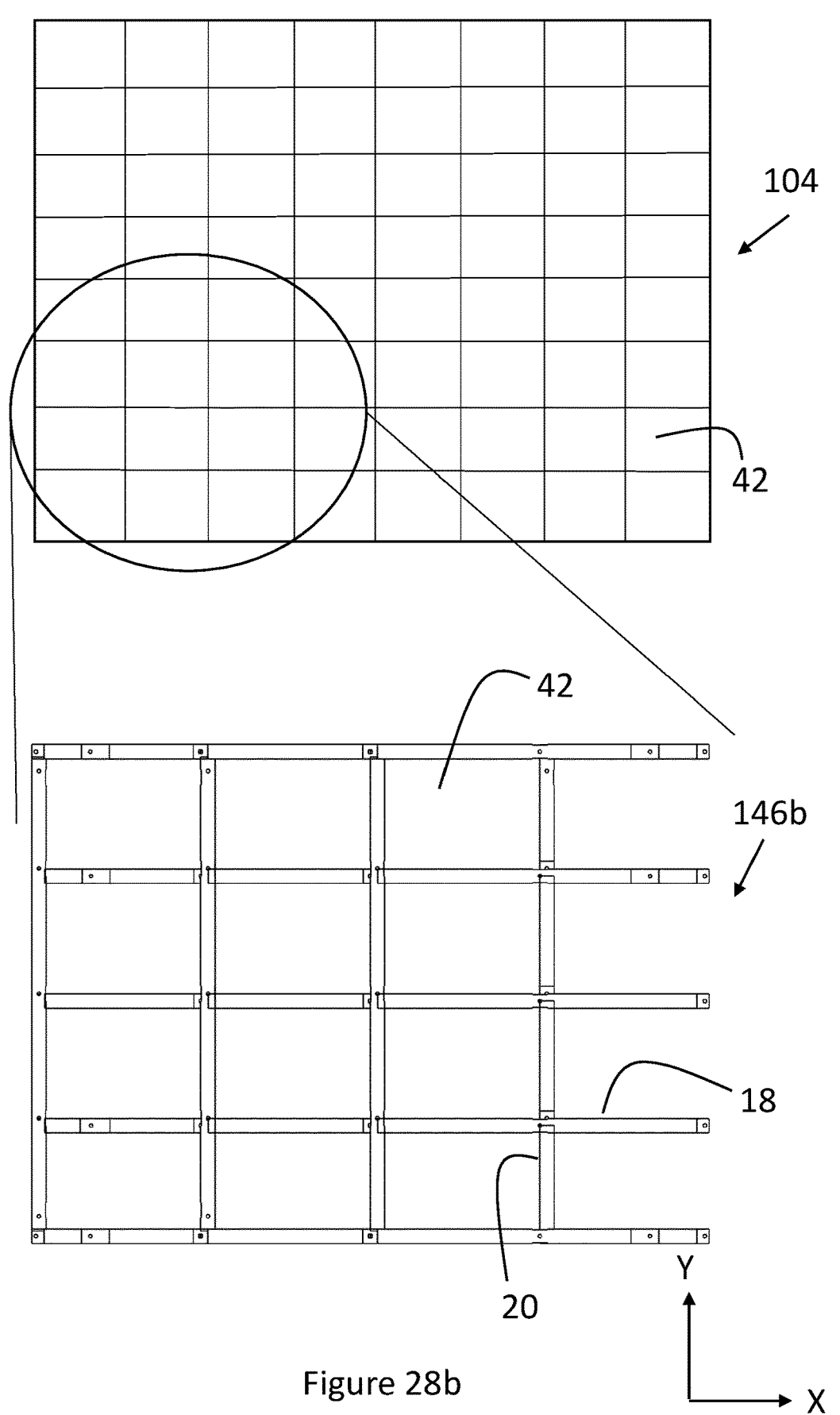
Figure 28C:
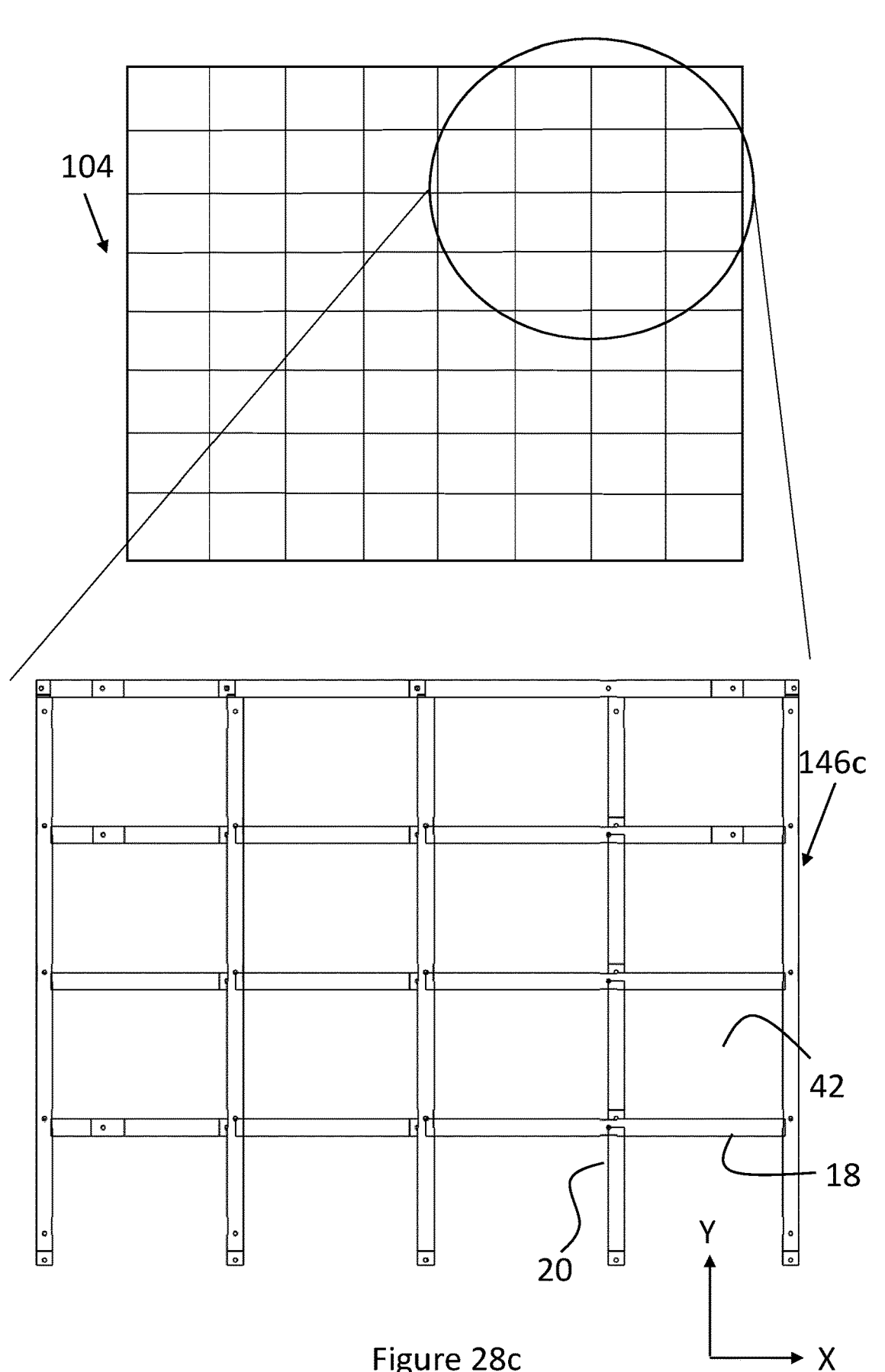
Figure 28D:
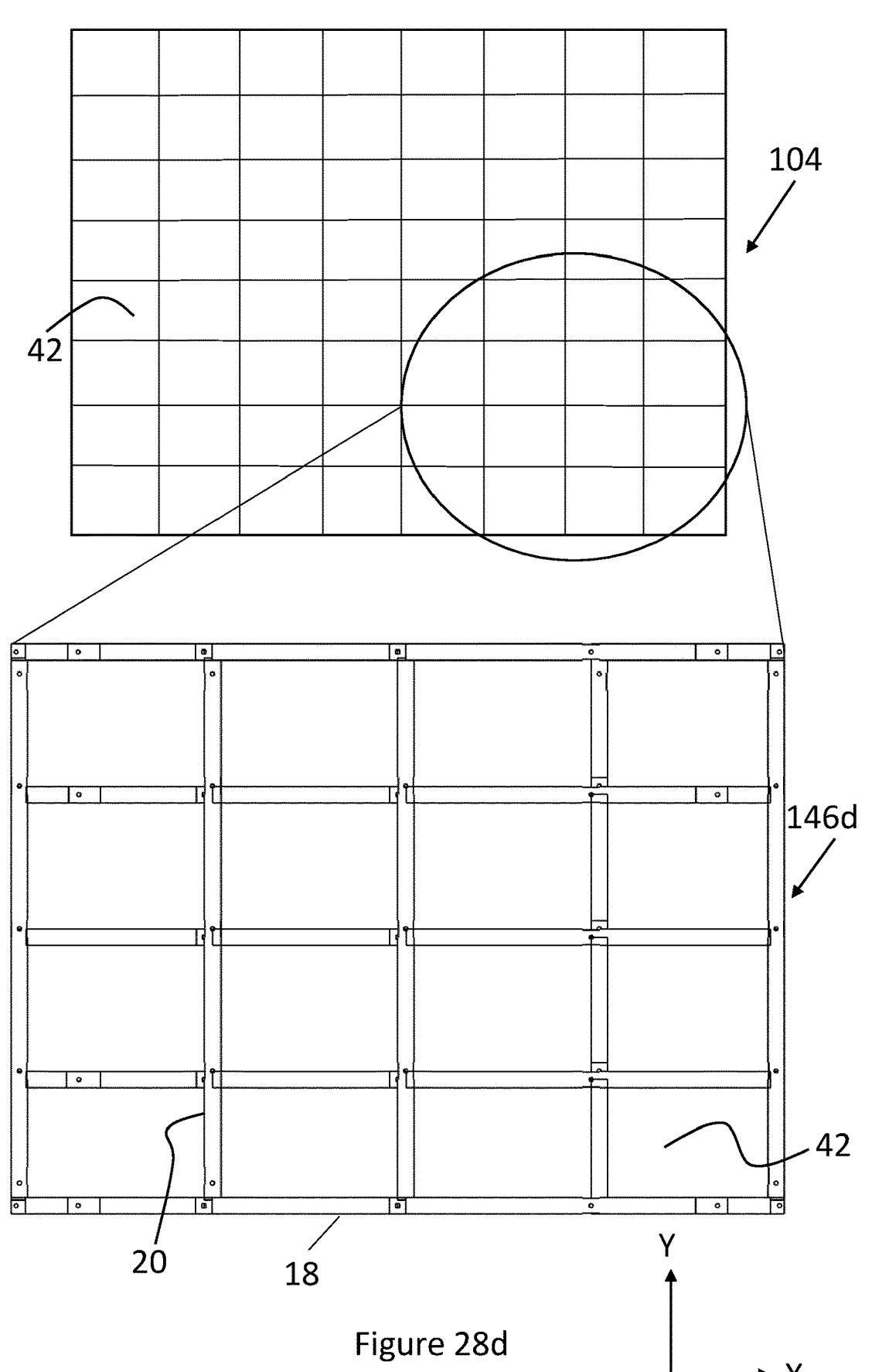

A plurality of guides 140 are held in space relation with each other in the storage space so as to provide a plurality of storage columns, each of the plurality of storage columns being sized to accommodate a single stack of storage containers. In other words, four guides provide four corner sections, one from each of four cap plates, to ensure that a storage container in the storage column is guided into a correct position through a grid cell. At the periphery of the supporting framework structure only two guides are necessary at each of the nodes where the grid members intersect. The angled bar can be composed of metal, e.g. steel, to provide some load bearing capability of the guides. The spatial arrangement of each of the guides within each of the storage spaces or grid cell of the supporting framework structure is shown in FIG. 26. The guides are spatially arranged to provide multiple storage columns within a grid cell of the supporting framework structure.

It may be not necessary to engage or accommodate all four corners of a storage container along the guides to provide lateral stability to the storage containers as they are hoisted towards the grid structure by the lifting mechanism of the load handling device. In an alternative embodiment of the present invention, the plurality of guides 140 are arranged to engage with only a pair of diagonally opposing corners of the grabber device and/or the containers, i.e. the grabber device and/or the containers are guided by engaging with the guides at their diagonally opposing corners. This gives the grabber device and the containers a level of lateral stability in the X and Y directions as the container is hoisted along diagonally opposed guides, each of the diagonally opposed guides accommodating diagonally opposed corners of the storage containers. Thus, in comparison to having guides at all of the nodes of the grid structure, in the alternative embodiment of the present invention, the guides are arranged at alternate nodes in the first direction (e.g. x direction) and in the second direction (e.g. y direction) such that the one or more containers are stacked between only two guides and are guided by the two guides. By having guides at alternative nodes or intersections, half of the number of guides will be needed to guide the grabber device and/or storage container through a grid cell. Additionally, the grabber device and the container is only accommodated at two of its corners as it is hoisted towards a grid cell. The spatial arrangement of the guides 140 for guiding each of the storage containers towards the grid structure at only their diagonally opposed corners of the storage containers is shown in FIG. 26. The reduced number of guides necessary to guide the storage containers through a grid cell contributes to the reduction of the number of components necessary to erect the supporting framework structure according to the present invention.

As one or more load handling devices are operative on the grid structure, it is paramount that the grid structure lies in a substantially horizontal plane as this will affect the direction in which the containers or storage bins are hoisted into the correct position through a grid cell. If the level of the grid structure deviates from the horizontal plane, this will not only put a strain on the one or more load handling devices travelling on the grid structure but will cause the lifting tethers to sway to one side depending on the direction of the deviation and in a worst case scenario, cause the grabber device to fail to engage with the container or storage bin below. The problem is exacerbated when the floor on which the grid framework structure is installed is uneven. One or more of the uprights of the prefabricated braced frames and/or guides can be mounted on an adjustable grid levelling mechanism (not shown) for adjusting the level of the grid structure. The level of the grid structure mounted on the uprights is adjusted by having an adjustable levelling foot at the base or lower end of the uprights and/or guides to compensate for an uneven floor. The level of the grid structure is adjusted by adjusting the adjustable levelling foot at the base of one or more uprights and/or guides in a grid framework structure and checking the level of the grid structure at the top of the grid structure each time an adjustment is made, e.g. by use of a suitable levelling measurement instrument such as a laser level commonly known in the art.

The grid framework structure is not complete without the grid structure and the track system for guiding one or more robotic load handling devices on the grid structure. As with the supporting framework structure, both the grid structure and/or the track system can be modularised so as to enable easy assembling of the grid structure and/the track system.

Grid Structure

The grid structure 104 can be assembled from a plurality of prefabricated modular sub-grid structures 146(*a* to *d*), wherein each of the plurality of prefabricated modular sub-grid structures comprises a portion of the first set of grid members and a portion of the second set of grid members so providing two or more grid cells (see FIGS. 28*a* to 28*d*). Like the prefabricated modular panels, the first and second sets of grid members 18, 20 are arranged in a Cartesian coordinate system where the first set of grid members extend in the first direction and the second set of grid members extend in the second direction, the second direction being substantially perpendicular to the first direction. In contrast to the plurality of prefabricated modular panels 114(*a* to *d*) where each of the prefabricated modular panels lies in its respective vertical plane in the assembly, the prefabricated modular sub-grid structures 146(*a* to *d*) lie in a substantially horizontal plane when assembled on the supporting framework structure (see FIGS. 28*a* to 28*d*).

There are different arrangements of assembling the prefabricated modular sub-grid structures 146(*a* to *d*) according to the present invention to provide a grid structure 104 comprising a plurality of grid cells 42. An example of the arrangement of the prefabricated modular sub-grid structures 146(*a* to *d*) to generate at least of a portion of the grid structure comprising 8×8 grid cells according to the present invention is shown in FIGS. 28*a* to 28*d*. Four types of prefabricated modular sub-grid structures 146(*a* to *d*) are shown arranged at different positions such that when connected together provide a grid structure comprising 8×8 grid cells. Each of the four types of prefabricated modular sub-grid structures 146(*a* to *d*) comprises different numbers of grid members 18, 20 extending in the first direction and the second direction. The position of the different types of prefabricated modular sub-grid structures in the assembly are indicated by the circular outlines shown on the grid structure 104 in FIGS. 28*a* to 28*d*. The grid cells 42 at the periphery of the prefabricated modular sub-grid structure types 146(*a* to *d*) are generally incomplete as shown in the prefabricated modular sub-grid structures types shown in FIGS. 28*a*, 28*b*, and 28*c* which are completed by joining to an adjacent prefabricated modular sub-grid structure types in the assembly. For example, when referring to the prefabricated modular sub-grid structure types shown in FIGS. 28*a* and 28*b*, the prefabricated modular sub-grid structure type 146*a* shown in FIG. 28*a* forms the top left hand corner of the grid structure 104 on the page and the prefabricated modular sub-grid structure type 146*b* shown in FIG. 28*b* forms the bottom left had corner of the grid structure 104 on the page. Similarly, the prefabricated modular sub-grid structure type 146*c* shown in FIG. 28*c* forms the top right hand corner of the grid structure 104 on the page and the prefabricated modular sub-grid structure type 146*d* shown in FIG. 28*d* forms the bottom right had corner of the grid structure 104 on the page.

Adjacent prefabricated modular sub-grid structure types are joined together by connecting the ends of the grid members of one prefabricated modular sub-grid structure type with an adjacent prefabricated modular sub-grid structure type. Various fasteners known to the person skilled in the art can be used to connect the ends of the grid members from adjacent prefabricated modular sub-grid structure types together. These include but are not limited to the use of bolts, rivets, welding and/or the use of an adhesive. The joint between adjacent prefabricated modular sub-grid structure types can occur at the location where the grid members intersect at the nodes. Since the joint between adjacent prefabricated modular sub-grid structure types occurs where the grid members intersect at the nodes, a cap plate used for securing the guides discussed above can be used to connect the adjacent prefabricated modular sub-grid structure types together. The distribution of the cap plates at the nodes of the grid structure is more apparent in the schematic drawing of the supporting framework structure shown in FIG. 26. In addition to securing the grid structure 104 to the cap plate secured the guides, the grid structure 104 is also secured to the horizontal bracing members 120*a* connecting the plurality of uprights 116 of the individual prefabricated braced frames 114(*a* to *d*) together in the supporting framework structure 102.

Various other patterns of the prefabricated modular sub-grid structure types 146(*a* to *d*) can be used to assemble the grid structure according to the present invention. The number of the prefabricated modular sub-grid structure types for assembling the grid structure is dependent on the size of the grid structure in the sense of the number of grid cells and the degree by which the number of grid cells of the grid structure can be broken down into prefabricated modular sub-grid structure types. In the particular embodiment of the present invention shown in FIG. 30(*a* to *d*), the grid structure is broken down into four prefabricated modular sub-grid structure types, wherein each of the four prefabricated modular sub-grid structure types comprises 4×4 grid cells. To guide one or more robotic load handling devices on the grid structure, a track system is mounted to the grid structure to guide one or more robotic handling devices on the grid structure.

Track System

Like the grid structure, the track system 106 comprises a first set of parallel tracks 122*a* extending in the first direction and a second set of parallel tracks 122*b* extending in the second direction, the second direction being substantially perpendicular to the first direction to adopt the grid like pattern of the grid structure. Since the track system 106 is mounted on the grid structure 104, the grid structure 104 is occasionally referred to as track supports comprising first and second sets of track supports extending in the first and second direction. Traditionally, the first and second set of parallel tracks 122*a*, 122*b* comprise individual elongated rail or track sections that are interconnected together in the first and second direction at their interconnections where the track or rail sections meet at the top ends of the upright columns (see FIG. 8). The rails or tracks typically comprise an elongated element which is profiled to guide a load handling device on the grid structure, and are typically profiled to provide either a single track surface so as to allow a single load handling device to travel on the track or a double track so as to allow two load handling devices to pass each other on the same track. In the case, where the elongated element is profiled to provide a single track as shown in FIG. 12, the track comprises opposing lips (one lip on one side of the track and another lip at the other side of the track) along the length of the track to guide or constrain each wheel from lateral movement on the track. In the case where the profile of the elongated element is a double track, the track comprises two pairs of lips along the length of the track to allow the wheels of adjacent load handling devices to pass each other in both directions on the same track. To provide two pairs of lips, the track typically comprises a central ridge or lip and a lip either side of the central ridge.

Ideally, the surface of the track system mounted to the grid structure is continuous and substantially smooth to prevent the undesirable up and down bumping impact to the wheels of the load handling device travelling on the track. It is believed that the areas of the grid structure that are most vulnerable to cause this up and down bumping of the wheels of the load handling device are where the track sections meet at the nodes in the grid structure. This is the area of the grid structure where the track sections intersect or converge and are interconnected at their top ends to the vertical uprights. Generally in the art, to ensure that the grid structure is level and to compensate for an uneven floor, the level of the grid structure mounted to vertical uprights is adjusted by having an adjustable levelling foot at the base or lower end of the vertical uprights comprising a threaded shaft that can be extended or retracted relative to the base of the vertical upright. However, whilst attempts have been made to ensure that the robotic load handling devices have a smooth drive across the intersections of the track segments or sections, each segment or section of the track are cut at right angles and joined together. The rails or tracks are extruded from metal, e.g. aluminium. Sometimes a gap is left in between the ends of adjacent tracks for the purpose of thermal expansion of the rail segments or sections. The cut of the rail sections are such that the gap perpendicularly intersects the track. In WO2018/146304 (Autostore Technology AS), when making the intersection between the first and second sets of rails or tracks, the second set of rails or tracks all comprise a recess into which the first set of rails or tracks may be arranged. The first set of rails comprise areas where there are no ridges so that when received in the recess of the second set of rails, the area is coincident with the recesses of the second set of rails, thus providing the intersection areas/crossroad of the grid. The recesses of the second set of rails have right angle cuts so that when joined with the first set of rails, the joint at the intersections are at right angles to the longitudinal direction of the rails, i.e. extend across the width of the rails or tracks. As a result, the joints at the intersections tend to be misaligned so as to present a small step to an oncoming vehicle travelling on the rails or tracks. When a robotic load handling device approaches a track joint at the intersections, the wheels of the vehicle tend to snag or strike the edge of the rails or tracks as the wheels cross the sets of rails. Although the vertical displacement of the wheels is minute as the vehicle travels across the intersections, this up and down bumping impact to the wheels is one of the main source of noise and vibration of the travelling vehicle or load handling device. In a worst case scenario, the bumping of the wheels on the rails or tracks imparts wear and tear not only to the wheel or tyres of the vehicles but also to the rails or tracks to the extent that damage occurs to either or both of the wheels and rails. The bumping is exacerbated when there is a gap between the intersecting sets of rails or tracks. In this case, when a robotic load handling device approaches a track joint, the wheel will sink in to the gap once it passes the first set of rails. Because of the narrow gap, as the wheel sinks down, it will strike the edge of the next section of the track. After the wheel rolls over the gap, it rises to the surface of the next section of the track.

The absence of one or more adjustable grid levelling mechanisms for adjusting the level of the grid structure exacerbates the problem of the misalignment between adjacent track elements in the track system. With the move towards reducing the number of components required to assemble a grid framework structure, removal of the adjustable grid levelling mechanisms for adjusting the level of the grid structure has become an attractive proposition. The absence of one or more adjustable grid levelling mechanisms for adjusting the level of the grid structure exacerbates the problem of the misalignment between adjacent track elements in the track system. The grid framework structure shown in FIG. 15 is an example where the level of the grid structure is totally reliant on the level of the underlying floor being even as there are no adjustable grid levelling mechanisms for adjusting the height and thus the level of the grid structure.

The present applicant has realised that devising a track section element 150 that covers areas of the grid structure that are most vulnerable to this variation in height displacement of the grid members 18, 20, namely at the nodes 50 of the grid structure 104, mitigates the up and down bumping impact of the wheels of the load handling devices as they travel on the track/grid structure. In other words, the track section 150 of the present invention masks any imperfections or edges in the underlying grid members which largely occur at the nodes where the grid members intersect or converge together and to transfer the joint where adjacent track sections meet to the areas of the grid structure that are less susceptible to such height variations. The areas of the grid structure that are less susceptible to such height variations as a result of adjoining grid members are along the length of the grid members, more specifically between or intermediate of adjacent or neighbouring nodes 50 of the grid structure.

To provide an uninterrupted track surface on the grid structure, in an aspect of the present invention, the track system 106 comprises a plurality of track sections 150, each track section 150 of the plurality of track sections being formed as a single unitary body. Adjacent track sections are arranged to meet between the nodes 50 of the grid structure 104, i.e. meet at a point 152 between the crossings of the tracks (see FIG. 29). The single piece moulding allows a one to one relationship to exist between each track section 152 and each of the nodes 50 of the grid structure in the sense that only a single track section occupies a single node of the grid structure rather than at least two track sections as found in prior art grid structure described above and shown in FIG.

8. In the particular embodiment shown in FIG. 29, each track section 150 has connecting portions or elements 154 that extend in the directions of the underlying (grid members) track supports 18, 20 so as to provide a track surface that extends in the first direction and the second direction, i.e. each track section 150 is cross shaped having connecting portions or elements 154 extending in transverse directions. For the purpose of explanation of the present invention, the connecting portions or track section elements 154 can be termed 'branches' that extend in transverse directions from the nodes 50.

Multiple track sections 150 are mounted to the underlying grid structure or track support 18, to provide a continuous uninterrupted track surface between adjacent track sections for one or more load handling devices to move on the grid structure 104. The distal ends 152 of the connecting portions or elements (branches) 124 of adjacent track sections meet substantially half way or mid-point between neighbouring nodes 50 of the grid structure 104, i.e. meet or join at the mid-point between adjacent track crossings. This has the advantage of reducing the number of differently shaped track sections necessary to assemble the track for a substantial portion of the grid structure, i.e. removes the "jigsaw" effect where a track section has a specific place in the track, and thereby reduces the time to assemble the track on the grid structure. In addition, the tooling costs to manufacture the track sections would be greatly reduced since a smaller number of tooling designs would be necessary to mould the track section of the present invention in comparison to prior art tracks.

Figure 30:
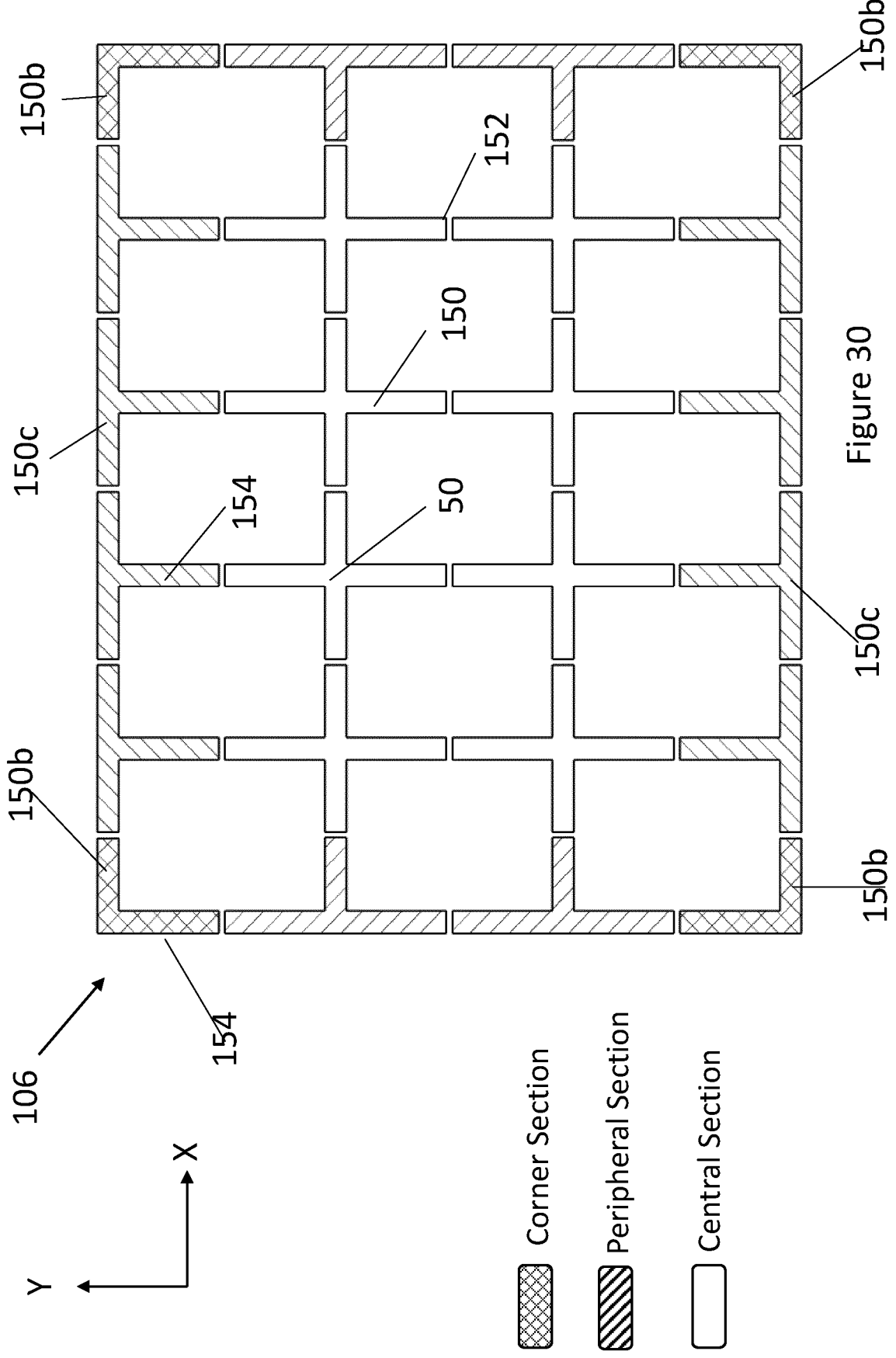
FIG. 30 is an illustration of the arrangement of track sections in a track system according to the present invention.

With reference to FIG. 15, the grid framework structure can be considered as a free standing rectilinear assemblage of prefabricated braced frames supporting the grid structure formed from intersecting horizontal grid members (track supports), i.e. a four wall shaped framework. As a result, the number of connecting portions or elements of the track sections 150 (i.e. the number of meeting points or branches) at the corners and around the periphery of the track would be different to the rest of the track where they are largely cross shaped as shown in FIG. 30. For the purpose of explanation, the different areas of the grid structure can be termed corner section, peripheral section, and central section. The different areas of the track system 106 where the track system has a rectilinear shape is shown in the sketch drawing of the pattern of the track sections in FIG. 30. The sketch of the pattern of track sections shown in FIG. is not to scale and it is simply for illustration purposes. The track sections 150 at the corner section 150*b* of the track system 106 are shown with a different shaded area and each of the track sections 150*b* at the corner has two connecting portions or elements 154, i.e. two branches. The track sections at the peripheral section 150*c* of the track system 106 are shown with a different shaded area. In the particular embodiment of the present invention shown in FIG. 30, each of the track sections 150*c* at the periphery of the track comprises three connecting portions or elements 154, i.e. three branches. In the embodiment illustrated in FIG. 30, the track sections 150*c* at the periphery can have two connecting portions 154 extending in opposite directions along the first direction and a third connecting portion 154 extending in the second direction, or two connecting portions 154 extending in opposite directions along the second direction and a third connecting portion 154 extending in the first direction The track sections 150*c* at the peripheral sections are not limited to having three connecting portions or branches 154 and can comprise more than three connecting portions depending on whether the peripheral section extends across more than one node 50. The nodes 50 represent the areas of the track system 106 where the individual track sections' 150 elements or branches intersect. For example, a peripheral section can comprises two extending in opposite directions along the first direction and multiple connecting points extending in the second direction for connecting to or meeting with adjacent track sections in the central section of the grid structure, i.e. more than three branches.

As is clearly apparent in the schematic sketch shown in FIG. 30, a substantial portion of the track system falls within the central section of the track where each of the track sections 150 is cross shaped having connecting portions or meeting points that branch or extend in transverse directions, i.e. first direction (X) and second direction (Y). In all of the differently shaped track sections 150, 150b, 150c in the particular embodiment shown in FIG. 32, there is a one to one relationship between each of the plurality of track sections and each of the nodes 50 of the track and/or grid structure. For example, there is a one to one relationship between a track section 150b and the node 50 at the corner of the track/grid structure. Likewise, there is a one to one relationship between each of the track sections 150c and each node 50 at the periphery of the track/grid structure. A similar principle applies to the tracks sections 150 in the central section of the track/grid structure. However, the present invention is not limited to there being a one to one relationship between each of the plurality of track sections and each of the nodes since a single track section can extend across more than one node in the track/grid structure. For example, the branches or connecting elements 154 of one or more of the track sections 150 can be sized to extend across one or more nodes of the grid structure 104. The larger sized track sections 150 would mean that fewer track sections 150 would be needed to make up the track system 106, i.e. to assemble the track together. The connecting ends 152 of one or more of the branches or connecting elements 154 extend to meet between the nodes of the grid structure 104 as this is the area of the grid structure where the underlying track support or grid members 18, 20 are less susceptible to any vertical displacement as present at the nodes 50 as discussed further below. The single piece track sections having a track surface or path extending in transverse directions greatly reduces the complexity and the components required to assemble the grid framework structure of the present invention. In all cases, each track section 150, 150b, 150c is a single unitary body having portions or elements 154 extending in transverse directions so as to provide a track surface or path for a load handling device to move on the grid structure extending in transverse directions.

The ability of adjacent track sections to meet halfway or mid-point between neighbouring nodes 50 of the track and/or grid structure allows each adjacent track section to be mounted to the underlying track supports in different orientations, as the track sections are not restricted to one specific orientation on the grid structure. In other words, due to the symmetry, e.g. rotational symmetry, of the track section of the present invention, the track sections can be mounted to the grid structure in multiple different orientations without affecting their ability to connect to an adjacent track section on the grid structure. In the context of the present invention, the rotational symmetry is the ability to rotate the track section by an angle so that the rotated track section coincides with the un-rotated track section. In the case where the grid cells are square (equal length tracks in the X and Y direction), the rotational symmetry of the track section is such that the angle of rotational symmetry is 90°, which means that the track section can be rotated four times and still coincide with itself, i.e. order of symmetry of four. In the case where the grid cells are rectangular, the rotational symmetry of the track section is of order two.

Figure 31:
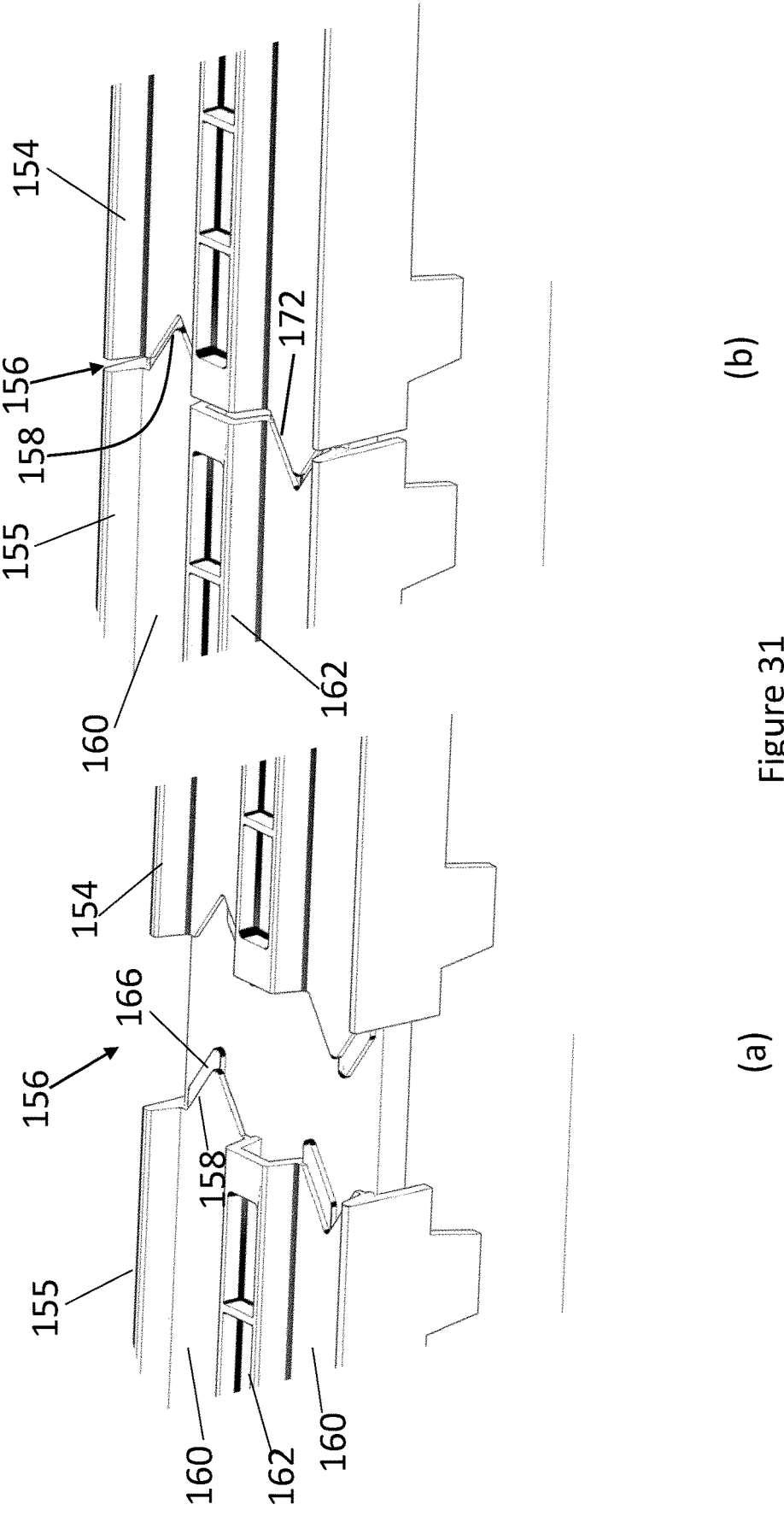
FIGS. 31 (*a* and *b*) is an expanded view of the joint linking adjacent track sections together according to the present invention.

In the particular embodiment of the present invention shown in FIG. 30, the distal ends 152 of the connecting track section portions or elements 154 of adjacent track sections 150 meet halfway between neighbouring nodes 50 of the grid structure. This improves the speed by which each of the track sections can be assembled on the grid structure as a single track section can be mounted to each node 50 of the grid structure 104 when assembling the track system 106 to the grid structure 104. The areas extending between the nodes 50 are largely not susceptible to any differences in height variation of the interlocking track supports 18, 20 in comparison to at the nodes as discussed above, and thus the track surface connecting adjacent track sections on the grid structure will not be largely influenced by any irregularities of the underlying track support sections extending between the nodes 50. As a result, the surface between the nodes is largely flat and uninterrupted. However, to mitigate the ends of abutting track section elements 154 creating a step at the joint between adjacent track sections 150 causing a vertical displacement of the wheels of a travelling load handling device across the junction between the connecting adjacent track sections, the connecting ends 152 of the track section are mitred or tapered as shown in FIG. 31(a and b). The joint 156 connecting adjacent track sections comprises at least one tapered edge 158 changing the conventional 90° angle cut to a substantial 45° angle cut edge. The two track section portions or branches 154 of the track sections are cut in such a manner to be mitred together. Thus, before the wheels of the load handling device rolls over the edge of a first track section portion 154 completely, part of the wheels already has touched the mitred end of a second track section portion 154. This provides a gradual transition of adjoining track sections and prevents the wheels from sinking into any gap between the connecting ends of adjacent track section portions.

In the particular embodiment shown in FIG. 31(a and b), the joint or the connecting ends 158 of adjacent track section portions 154 comprises multiple tapered edges 158. The edges 158 are tapered in such a manner that a track section portion or element 154 of a first track section is seated or butts up against a correspondingly shaped tapered edge of a track section portion or element 154 of a second adjacent track section. In the particular embodiment shown in FIG. 31(a and b), the edges 158 of the track section portions 154(a and b) are shaped in such as manner to create a V-shaped edge that is receivable in a correspondingly shaped V-shaped cut out. The number of tapered ends 158 at the joint 156 between adjacent track sections may be dependent on the number of tracks for guiding the wheels of the load handling device. FIG. 31 shows the adjacent track sections in (a) a separated configuration and; (b) a connected configuration.

Figure 32:
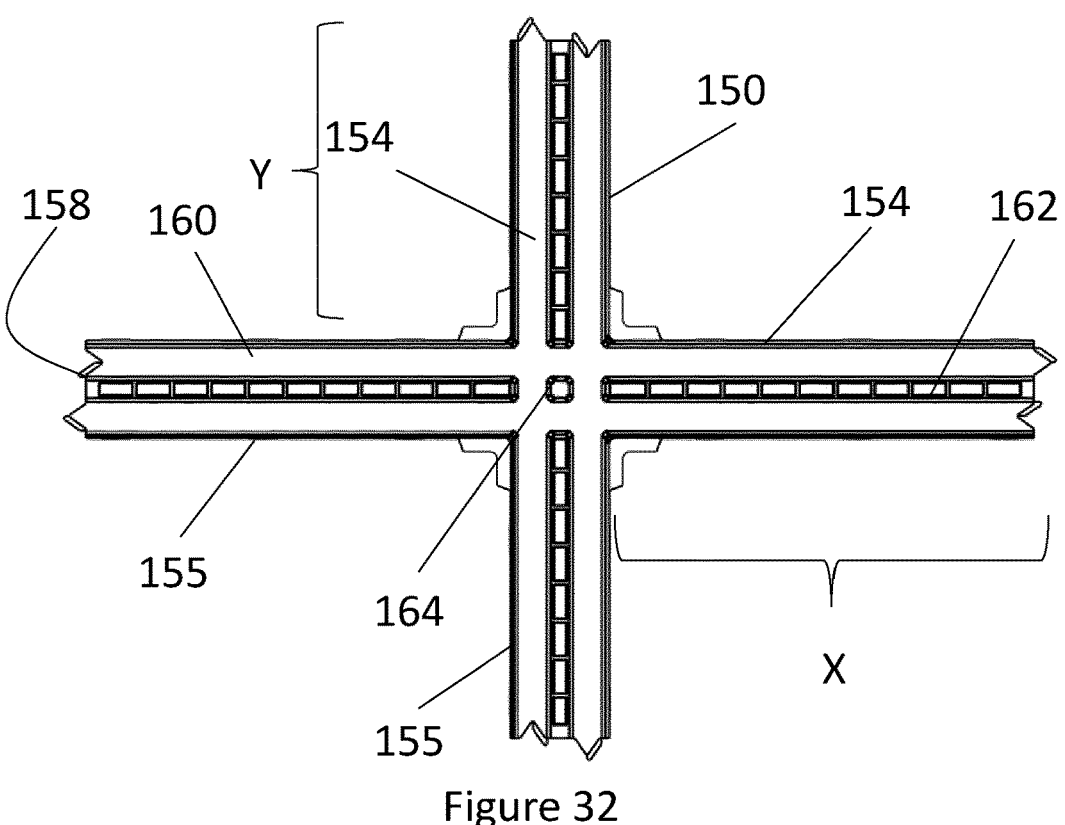
FIG. 32 is a top plan view of a single track section according to the embodiment of the present invention.

In the particular embodiment shown in FIG. 31, the track is a double track comprising two ridges or depressions 160 running side by side along the longitudinal length of each of the track section elements 154 for receiving and guiding the wheels of the load handling device and a central ridge 162 running parallel to the two ridges or depressions 160. The depressions 160 either side of the central ridge 162 provide the paths for the wheels of the load handling device to engage. Each track section element 154 for guiding the wheels of the load handing device comprises two lips 155; one at either side of the wheel. For a double track, there are two pairs of lips 155 side by side running along the longitudinal length of the track for guiding two pairs of wheels. This is to ensure that two load handling devices can pass each other in the X direction and the Y direction when running on the double track in different directions on the same track section. To allow one or more load handling devices to cross at the crossing or intersection of the track section, i.e. cross at the cross roads, which correspond to the nodes of the grid structure, the crossing or intersection of the tracks comprises a small island 164 as shown in FIG. 32 so as to permit the wheels to be guided in transverse directions. This is particularly the case in areas where the tracks cross or intersect, which are predominantly around the central section of the grid structure. Also shown in FIGS. 31 and 32 is an optional central ridge or rib 162 running longitudinally along the length of the track and the tracks or paths 160 for guiding the wheels of the load handling device running either side of the central ridge or rib 162. The central ridge or rib 162 is integrally formed into the track section or embossed, the underside of which is shaped to be seated on a correspondingly shaped ridge or rib in the underlying track support (see cross-section view of the track in FIG. 35). The central ridge or rib 162 provides an underlying surface to key the track section to the track support and prevent sideways movement of each of the track sections on the track support.

The track system of the present invention is not limited to a double track and the track can be one or more tracks comprising one or more depressions or ridges. For example, the track can be a single track comprising a single ridge or depression formed from a pair lips either side of the track for guiding a single wheel along the track. In this case, the joint connecting adjacent track sections together is not limited to having multiple tapered ends or mitred joints and can comprise a single tapered edge at each end so as to allow the wheels of the load handling device to transition from one track section to an adjacent track section.

Figure 33:
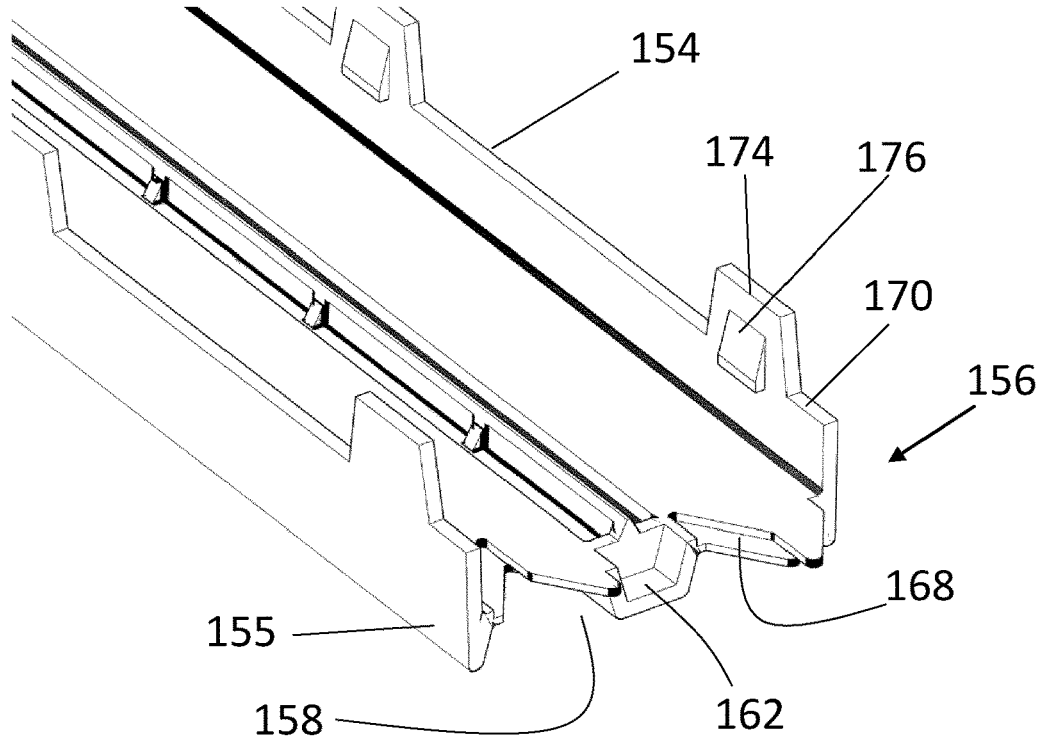
FIG. 33 is a perspective view of the underside of the connecting portion of the track section showing the shaped grooves of the tongue and groove joint at the edge of the connecting portion according to an embodiment of the present invention.

Also shown in FIGS. 31(*a* and *b*) and 33, the joint 156 connecting adjacent track sections together may also comprise an overlapping joint in the sense that the joint 156 comprises a tongue 166 that is receivable in a correspondingly shaped groove 168 of an adjacent track section. When assembling the track sections together on the grid structure, the tongue 166 of a first track section is arranged to slide so as to be receivable in a correspondingly shaped groove 168 in a bottom wall 170 of a second adjacent track section to create the overlapping joint (see FIGS. 31(*a* and *b*) and 33). FIG. 33 shows the underneath of one of the connecting portions or track section elements 154 of the track section showing the groove 168 in the bottom wall 170 that is shaped for receiving the tongue 166 of an adjacent track section. The overlapping joint provides structural stability to the joint to bear the weight of the load handling device travelling across the junction between adjacent track sections. The thickness of the tongue 166 and/or depth of the shaped groove 168 also controls the track surface between adjoining track sections. To allow for thermal expansion between adjacent track sections, the joint 156 between adjacent track sections comprises a gap 172 as shown in FIG. 31(*b*). Because the edges between adjoining track sections are tapered or mitred, the gap 172 between adjacent track sections would not impact the track surface because the gradual transition of the track joint would prevent the wheels of the load handling device sinking into the gap 172. The tongue 166 and groove 168 can be incorporated into the tooling when moulding the track section as a single piece mould, i.e. formed integrally with the track section.

The length of the track section elements or branches 154 of a given track section is dependent on whether grid cells are square or rectangular. For a square grid cell, the length X and Y of the track section elements are equal. However, for a rectangular shaped grid cell the length of one track section element X is different to the length of the other track section element Y.

To secure the track to the grid structure, each of the track sections can be snap fitted to the track supports. In the particular embodiment of the present invention, the underside of the track section shown in FIGS. 33 to 35 comprises one or more lugs 174 that are configured to be snap fitted to the track support 18, 20. As clearly demonstrated in the cross-sectional view of the track section shown in FIG. 35, the one or more lugs can comprise a bead or protruding edge 176 that is arranged to deflect and catch an edge of the track support in a snap fit arrangement. The particular snap fit feature shown in FIGS. 33 and 35 is a cantilever snap fit as is commonly known in the art. However, other forms of snap fit connections commonly known in the art for securing the track section to the track support are applicable in the present invention. Equally, other forms of securing the track section to the track support besides a snap fit joint are applicable in the present invention, e.g. the use of fasteners or an adhesive. Each branch or transverse portion or track section element 154 of the track section comprises a plurality of lugs 148 that is arranged to be snap fitted to an underlying track support.

Figure 34:
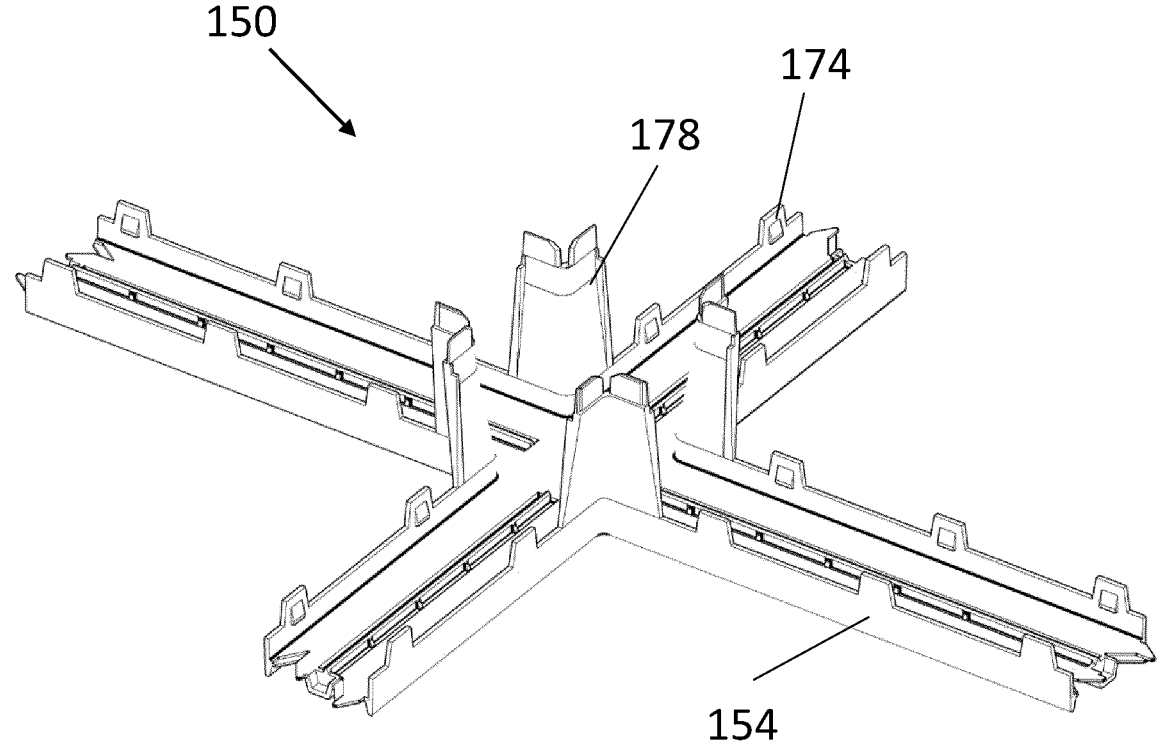
FIG. 34 is a perspective view of the underside of the track section according to the present invention.
Figure 35:
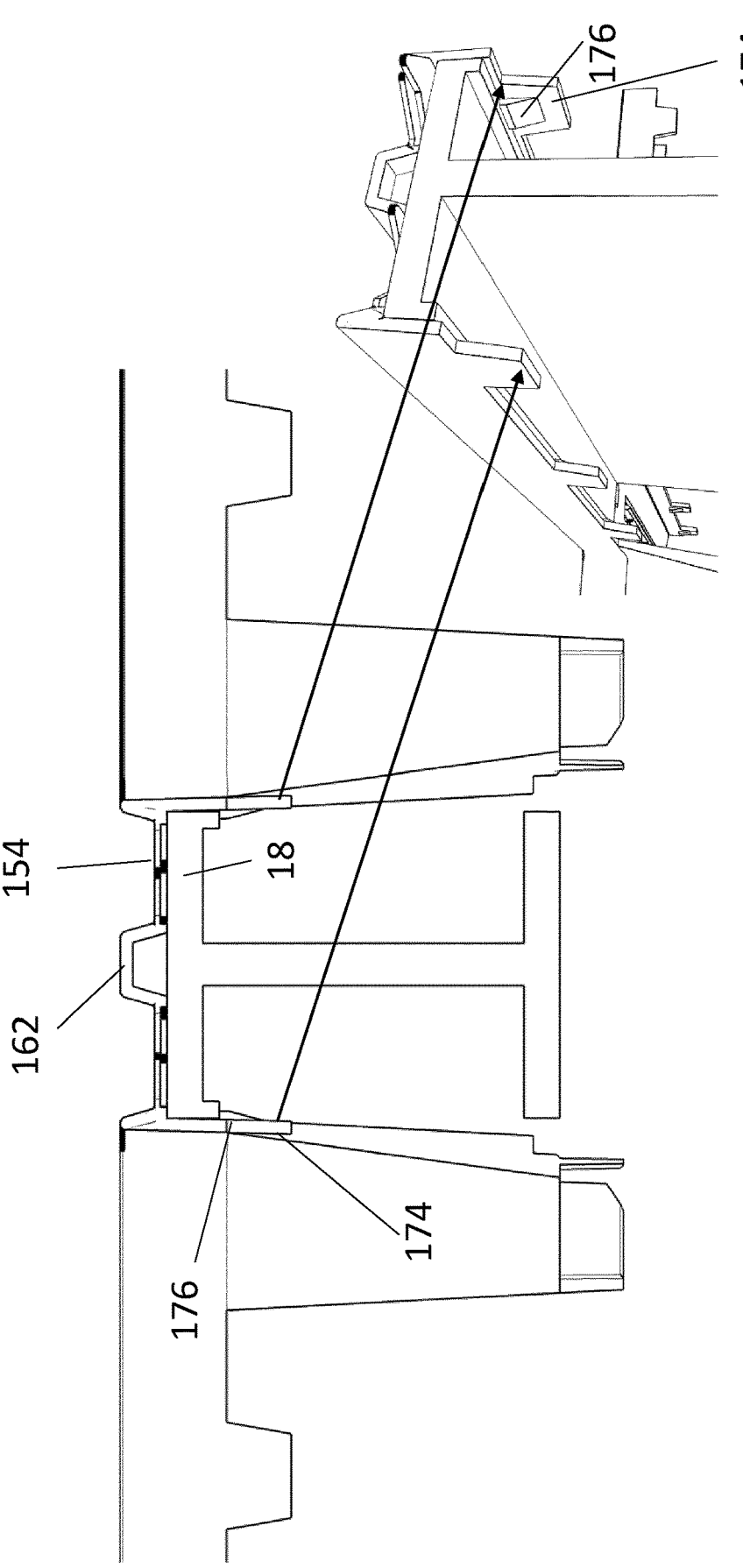
FIG. 35 is a cross sectional view of a track mounted to the track support element according to the embodiment of the present invention.

Also shown in FIG. 34, each of the track sections comprises guide members 178 at the intersection between their respective transverse sections or track section elements 154 of the track section that extend downwardly. The guide members are shaped for guiding a grabber device and/or containers through the grid cells in the area where the intersecting track supports are connected at the nodes of the grid structure as shown in FIG. 29. Without the guide members, the grabber device and/or the containers would snag against the area where the intersecting track supports are connected together as clearly shown in FIG. 29 where the track section is shown removed from the grid structure. Four guide members are shown in FIG. 34 configured to cooperate with the four corner sections between the intersecting track supports so as to correctly locate the track section at the node of the grid structure and provide a guiding surface for the grabber device and/or the containers through a given grid cell. Each of the guides 178 is in the form of a downwardly extending skirt and comprises two perpendicular plates (two guiding plates perpendicular to each other) that extend downwardly in the direction of the upright column, i.e. vertically, and arranged to cooperate with the corner section between the intersecting track supports. Each of the two perpendicular plates of the downwardly extending guides can also extend to cooperate with the corner sections of the vertical uprights supporting the grid structure (see FIG. 29). Once seated on the grid structure, the guide members also help to prevent lateral movement of the track section on the track support and provide a guiding surface for the grabber device and/or the container.

The track system can be mounted to the track support or grid member. As a result of this configuration, the track support can bear a greater proportion of the weight or the full weight of one or more load handling devices operative on the track. Thus, the track can be made from material with a lower load bearing capacity, in comparison to metal used in conventional practice. This has the advantage that different forming methods can be used to mould the track sections than the current extrusion process which is preferred forming process where the track is largely fabricated from metal, e.g. aluminium. Extrusion consists of forcing a metallic work piece through a shaped die to reduce its cross section and convert it to the desired shape. However, the dimensional tolerances of extrusion is not so great in comparison to other forming processes such as injection moulding and additive manufacturing such as 3D printing. Since the track sections are fabricated to tight dimensional tolerances so as to provide a continuous uninterrupted track surface when the individual track sections are assembled together on the grid structure, the extruded track sections are subsequently subjected to a machining process. Moreover, extrusion is not able to produce the various cut outs and islands in the profile of the track without a subsequent machining process.

In the particular embodiment of the present invention, the track comprises a plastic material rather than being formed entirely from metal. Examples of a plastic that can be used to form the track sections of the present invention include but are not limited to various thermoplastic polymers such as polypropylene, nylon etc. As a result, better forming processes can be used that provide better dimensional tolerances in the formed part. One example of a forming process that is able to produce a part with improved dimensional tolerances that is used in the present invention is injection moulding, but other forming processes are applicable in the present invention including but not limited to additive manufacturing, such as 3D printing, and casting. In the particular embodiment of the present invention, the track section is injection moulded. Injection moulding is able to produce parts with various intricate profiles to tight dimensional tolerances removing the need to carry any extensive machining process to the finished part. A smaller number of tools would need to be used to mould the track sections of the present invention. These include tooling for the corner, peripheral and central sections of the grid structure. Also the use of plastic material allows the track sections to be easily snap fitted to the track supports without the need to use excessive force, and in some cases the track sections can be snap fitted by hand to the track supports. The ability of plastic material to deflect in comparison to metal allows the fitting of the track section of the present invention to the track support to be automated with no or limited use of tooling. Thus, the entire process of fitting the track to the grid structure can be automated.

Whilst the use of plastic material provides advantages in terms of its mouldability to tight dimensional tolerances, one of the drawbacks of the use of plastic material is its inability to conduct static electricity accumulated on the surface of the track to ground as a result of the engagement of the wheels of the load handling device, in particular the tyres of the wheels. To overcome this drawback, in a particular embodiment of the present invention, the plastic material is made conductive by the incorporation or mixing of a conductive material. For example, conductive fillers can be mixed with the plastic material prior to moulding to render the plastic material conductive. Examples of known conductive fillers include but are not limited to carbon (e.g. graphite) and metallic fillers, e.g. copper, silver, iron etc. The conductive fillers can be in particulate form or fibres. For example, conductive fillers in the range of 20% to 50% by weight can be added to the plastic material to render the plastic material conductive. Alternatively, conductors can be insert moulded within the plastic material to provide a continuous conductive path in the track. However, in the case where each of the track sections making up the track is composed of metal, then other forming processes known in the art that provide the necessary dimensional tolerance are applicable in the present invention, such as casting, e.g. pressure die casting.

Assembly of the Grid Framework Structure

Figure 36A:
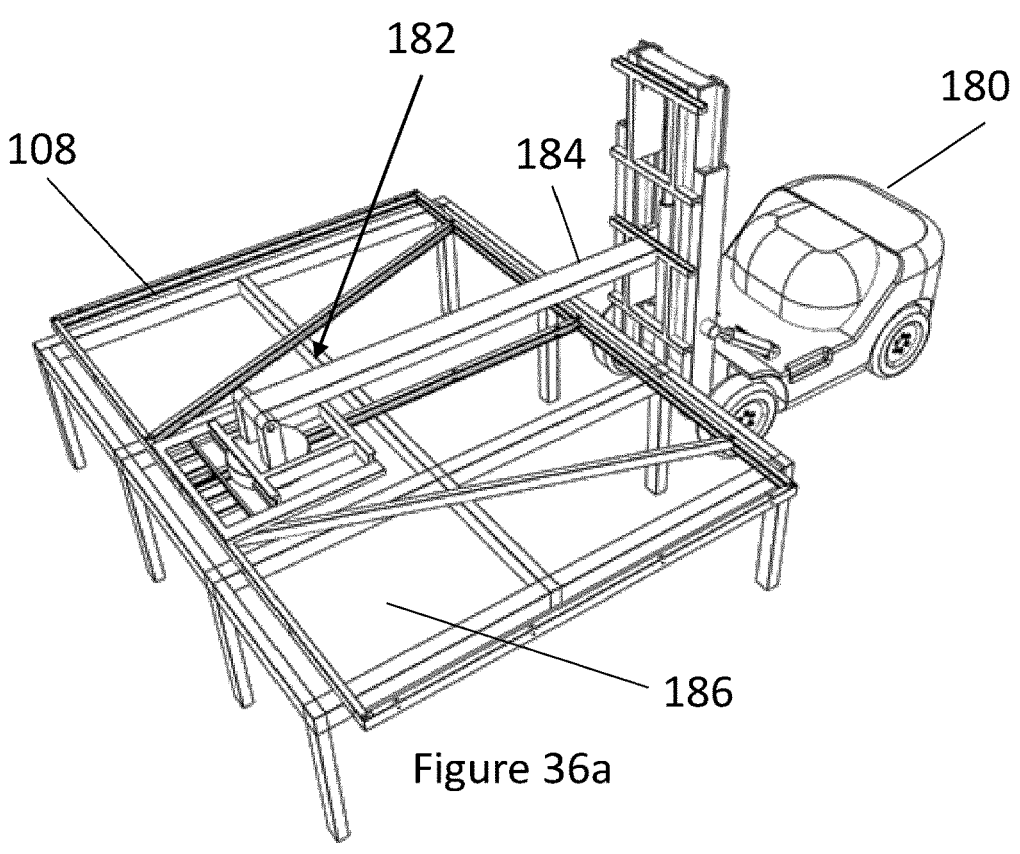
FIGS. 36*a* to 36*b* are (a) a perspective view of an AGV and lifting mechanism engaging with a prefabricated braced panel prior to being lifted; (b) orientation of the prefabricated braced panel prior to be assembled on the supporting framework structure.
Figure 36B:
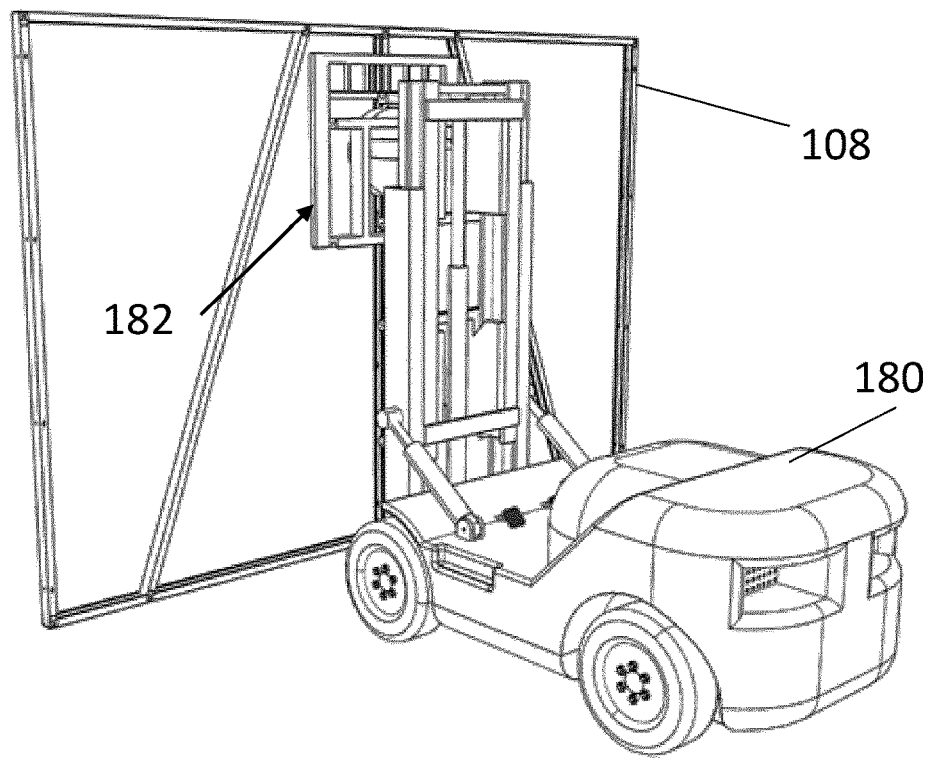

Assembly of the grid framework structure according to the present invention involves erecting a plurality of prefabricated modular panels into a grid pattern comprising a plurality of grid cells, each of the plurality of grid cells providing a storage space for storing multiple stacks of storage containers. The modular panels can be prefabricated on site or at a remote location and transported to the site to be assembled into the supporting framework structure. For example, prefabrication can involve bracing a plurality of uprights by one or more bracing members on site. Prefabrication of the modular panels can be done manually or automatically. A lifting device can be used to orientate and position the prefabricated modular panels together. The lifting device can be operated manually or automatically. FIGS. 36a and 36b are an example where an AGV (automated guided vehicle) 180 comprises a tool or gimbal 182 that is specially adapted to engage with a prefabricated modular panel 108 and orientate it for assembly into the supporting framework structure according to the present invention. A gimbal is defined as a pivoted support that permits rotation of an object about an axis. The gimbal is connected to a lifting mechanism via a lifting arm 184 as shown in FIG. 36a to enable the prefabricated modular panel 108 to be lifted in position where it can be secured to an existing prefabricated modular panel in the supporting framework structure. A support surface 186 mounted one legs as shown in FIG. 36a can be used to offer up the prefabricated modular panel to the gimbal of the lifting device. The support surface 186 can comprise a specially designed jig (not shown) to facilitate prefabrication of the modular panels. For example, in the case of the prefabricated braced frames, the specially designed jig can be used to properly align the plurality of uprights prior to being braced by one or more bracing members.

Once the prefabricated modular panel is engaged with the gimbal, the lifting mechanism is able to lift the prefabricated modular panel clear of the support surface so as to allow the AGV to be driven to a desired location on site. The gimbal allows the prefabricated modular panel to be orientated for assembly onto an adjacent prefabricated panel. Multiple AGVs can be controlled by a control system so as to orchestrate assembly of a plurality of the prefabricated modular panels into a framework work supporting structure. Connection of adjacent prefabricated modular panels involves using a number of fasteners commonly including but not limited to one or more bolts, welding, rivets, or adhesive. Securing the prefabricated modular panels together can be done manually or automatically when a prefabricated modular panel is offered up to one of the other prefabricated modular panels in the framework assembly.

In addition to assembling the prefabricated modular panels together, one or more AGVs can be used to assemble the prefabricated modular sub-grid structures together to form the grid structure. The individual prefabricated modular sub-grid structures can be secured together by one or more fasteners, e.g. bolts, rivets, welding, or adhesive. Once the grid structure has been assembled together, a plurality of track sections can then be fitted to the grid structure to complete the grid framework structure. As the individual track sections comprise snap fitting features as discussed above, individual track sections can be snap fitted at the nodes of the grid structure to form the track system. The transverse sections of individual track sections help to mask any underlying imperfections to the grid structure particularly at the nodes where the grid members intersect in the grid structure. In contrast to assembling the grid framework structure known in the art where individual uprights are erected first and the top ends of the uprights are interconnected together by grid members extending in orthogonal directions, the prefabrication of the components of the grid framework structure prior to assembly greatly reduces the time to erect the grid framework structure. Other advantages include ensuring that the grid cells are uniformly sized throughout the grid structure, since there is little need for adjustments of the grid members in situ as portions of the grid structure are prefabricated prior to assembly. A specially designed jig can be used to prefabricate the modular subgrid structures so as to ensure that the individual grid cells are 'square on' and/or correctly aligned prior to being mounted to the supporting framework structure.

Various materials can be used in the fabrication of the components used in the prefabricated modular panels, prefabricated modular sub-grid structures and/or the track sections. These include metals, e.g. aluminium, plastics, or a fibre composite material.

Assembly of a Supporting Framework Structure with Multiple Layers

In some large storage and retrieval systems the supporting framework structure may be greater than the height of an individual prefabricated modular panel. For ease of manufacturing, handling, storage, and assembly, prefabricated modular panels may be used that have a height less than the full height of the supporting framework structure. The advantage of using prefabricated modular panels of a smaller height is that they can be assembled either on site or in a separate manufacturing facility, and they can be handled more easily, either by human operators or by AGVs. Transport of shorter panels is also more convenient, since the panels can fit into a smaller vehicle rather than requiring a specialized larger vehicle. Storage of smaller panels is also more convenient.

Several smaller prefabricated modular panels may be attached together in a vertical configuration vertically on top of one another, in order to form a taller structure of panels that extends up to the top of the supporting framework structure. For example, if the prefabricated modular panels are half the height of the supporting framework structure, two prefabricated modular panels may be used in order to form a panel of the full height of the supporting framework structure. The supporting framework structure may be constructed in layers, with each layer being the height of a single prefabricated modular panel. In the example where the prefabricated modular panels are half the height of the supporting framework structure, the supporting framework structure may comprise two layers, a lower layer and an upper layer, each of the two layers being the same height as a prefabricated modular panel.

When assembling a supporting framework structure comprising multiple layers, the lowermost layer must be assembled first. The individual prefabricated modular panels in the lowermost layer can be secured together by one or more fasteners, e.g. bolts, rivets, welding, or adhesive.

Assembly of upper layers in a supporting framework structure with multiple layers presents more of a challenge; the prefabricated modular panels in the upper layers must be secured together, and secured to the prefabricated modular panels in the layer below. Once the supporting framework structure has been assembled together, a plurality of track sections can then be fitted to the uppermost layer of the supporting framework structure to complete the grid framework structure. The points on the prefabricated modular panels in the upper layers at which the panels are secured together, and the points at which the track sections are fitted to the prefabricated modular panels in the uppermost layer, may be at a significant distance from the ground. These points are more difficult to access, as opposed to the points on the prefabricated modular panels in the lowermost layer, which may be easily accessed by an operator from the ground.

A solution to this problem is to design the prefabricated modular panels in such a way as to facilitate access, for example by creating access corridors within the lowermost layer of prefabricated modular panels. The access corridors permit access within the supporting framework structure. A vehicle with an elevated platform may be used, for example a crane or scissor lift, or any other suitable mechanism. The vehicle can drive down the access corridors into the interior of the grid framework, and a platform may be elevated to the required height in order for an operator to secure the prefabricated panels of the upper layers together, and to fit the track sections to the top of the supporting framework structure.

Figure 37A:
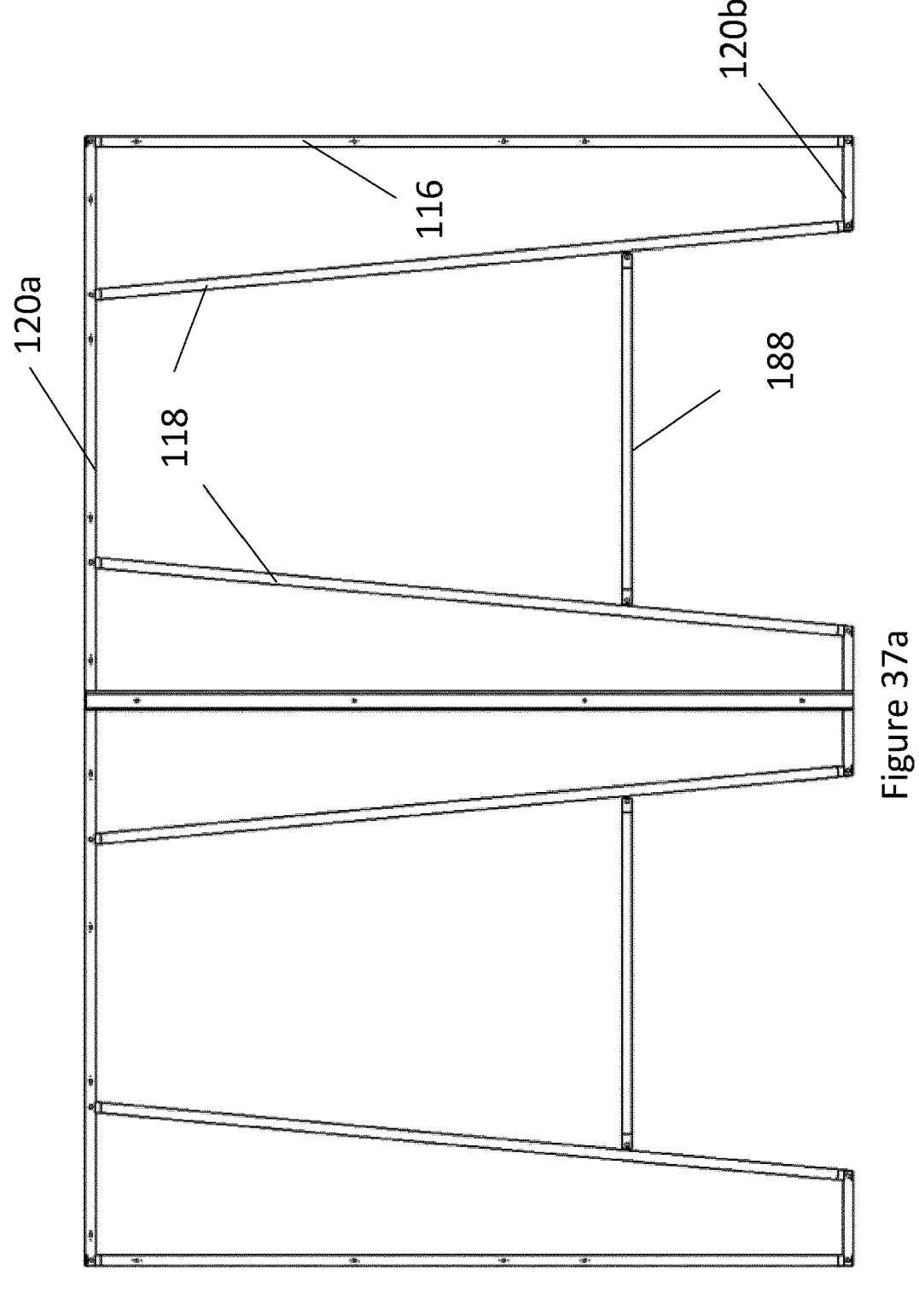
FIGS. 37*a* to 37*b* illustrates an embodiment of a prefabricated braced frame comprising an A-frame forming an opening (a) with horizontal cross members 188 and (b) with horizontal cross members removed.

In some embodiments, one or more of the prefabricated modular panels may comprise an opening to facilitate the use of one or more vehicles to assemble the supporting framework structure. One example of a prefabricated modular panel is illustrated in FIG. 37a. In the particular embodiment illustrated in FIG. 37a the prefabricated modular panel is a prefabricated braced frame 114. The prefabricated braced frame 114 comprises three vertical uprights 116, connected at their top ends by horizontal bracing members 120a. Pairs of diagonal bracing members 118 form A-frames. The sides of the A-frames are formed from the diagonal bracing members 118, the tops of the A-frames are formed from the horizontal bracing members 120a, and the cross members of the A-frames are horizontal bracing members or horizontal cross members 188. The horizontal cross members 188 brace the pairs of diagonal bracing members 118. Horizontal bracing members 120b connect the lower ends of the vertical uprights 16 with the lower ends of the diagonal bracing members 118. In contrast to the prefabricated braced frames 114 illustrated in FIGS. 16a to 16d the horizontal bracing members 120b at the bottom of the prefabricated braced frame 114 illustrated in FIG. 37a do not extend across the full distance between the lower ends of the vertical uprights 116, but leave an opening to facilitate entry of a vehicle for assembly.

Figure 37B:
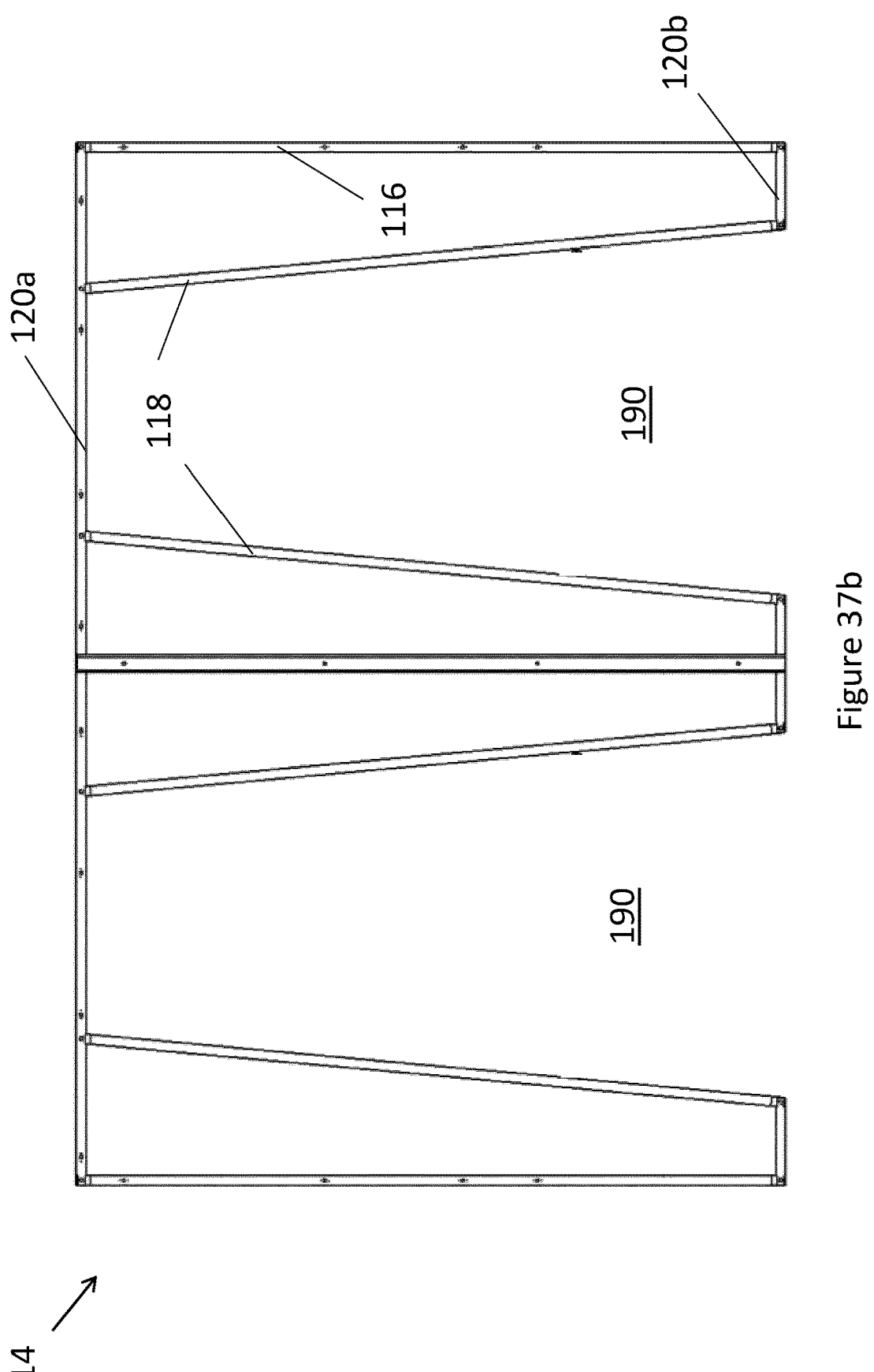
Figure 38:
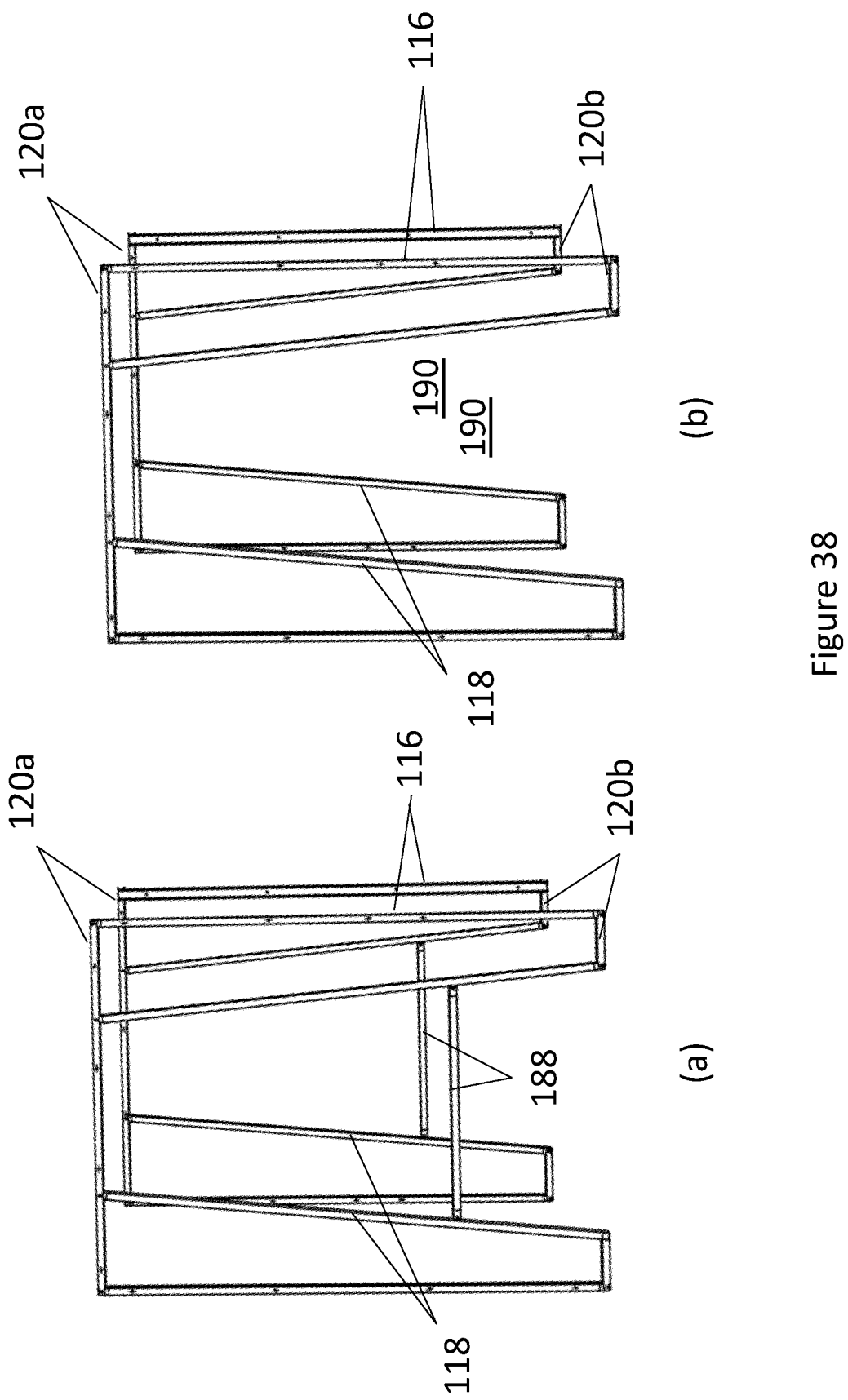
FIG. 38 illustrates the lower layer of a supporting framework structure with access corridors through the openings in the prefabricated braced frames.

The horizontal cross members 188 are temporary; during transport, storage, and assembly of the prefabricated braced frame 114 they serve the function of bracing the diagonal bracing members 118 and thus helping to keep the other members of the prefabricated braced frame 114 in the same plane, including keeping the vertical uprights 116 parallel to one another. When the prefabricated braced frame 114 is assembled in its position in the supporting framework structure, however, the horizontal cross members 188 are removed in order to facilitate vehicle access. FIG. 37b illustrates the prefabricated braced frame 114 of FIG. 37a, with the horizontal cross members 188 removed. In the absence of the horizontal cross members 188, the A-frames form openings 190 that are large enough to permit access for a vehicle. As mentioned above the horizontal bracing members 120b at the bottom of the prefabricated braced frame 114 do not extend across the full distance between the lower ends of the vertical uprights 116, but leave an opening; this enables a vehicle to drive through the opening 190 in the prefabricated braced frame 114 without any lip or obstruction on the ground to impede the wheels of the vehicle. When several prefabricated braced frames 114 are used in the lower layer of a supporting framework structure, they may be configured so that the openings 190 align to form access corridors or tunnels throughout the grid framework structure. FIG. 38(*a* and *b*) illustrates the prefabricated braced frames 114 of two half-panels. The planes containing the prefabricated braced frames are parallel to one another, and arranged so that the two A-frames are displaced relative to one another in a direction perpendicular to the plane of the prefabricated braced frames. FIG. 38(*a*) shows the two prefabricated braced frames with the horizontal cross members 188. In FIG. 38(*b*), the horizontal cross members 188 have been removed, and the openings 190 within the A-frames align to form an access corridor.

Figure 39A:
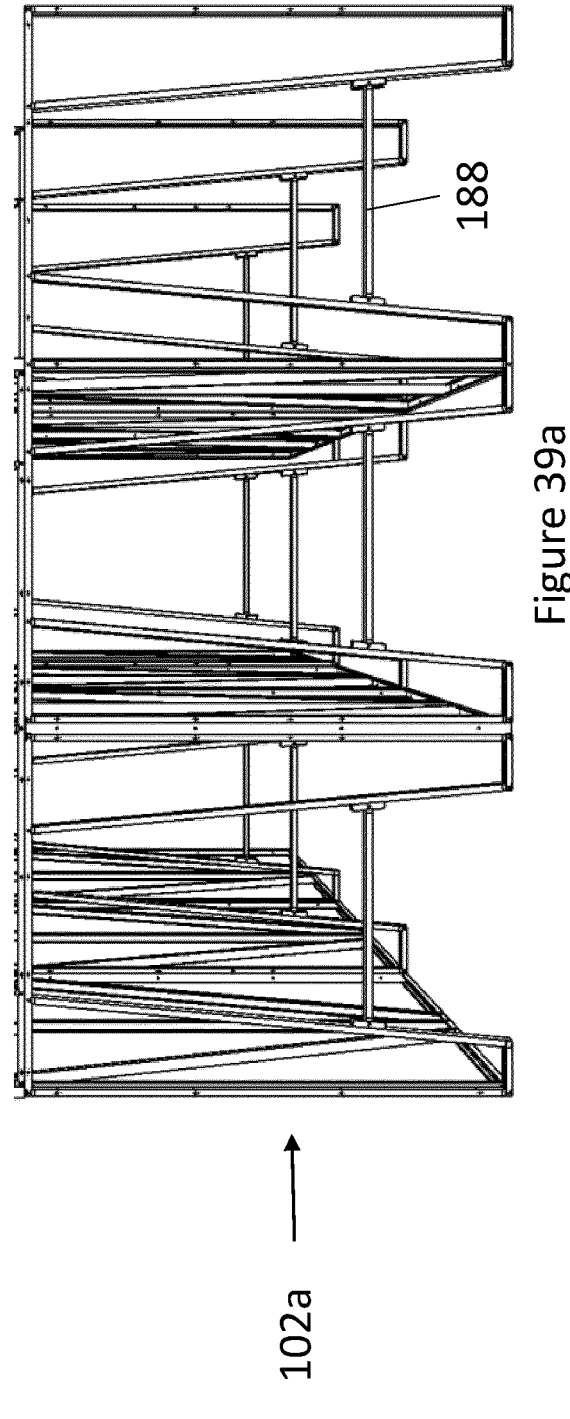
FIGS. 39a to 39c schematically illustrates stages in the process of assembling an embodiment of the supporting framework structure: (a) the lower layer of the supporting framework structure is assembled with horizontal cross members in position (b) the lower layer of the supporting framework structure with horizontal cross members removed (c) the upper layer of supporting framework is assembled.
Figure 39B:
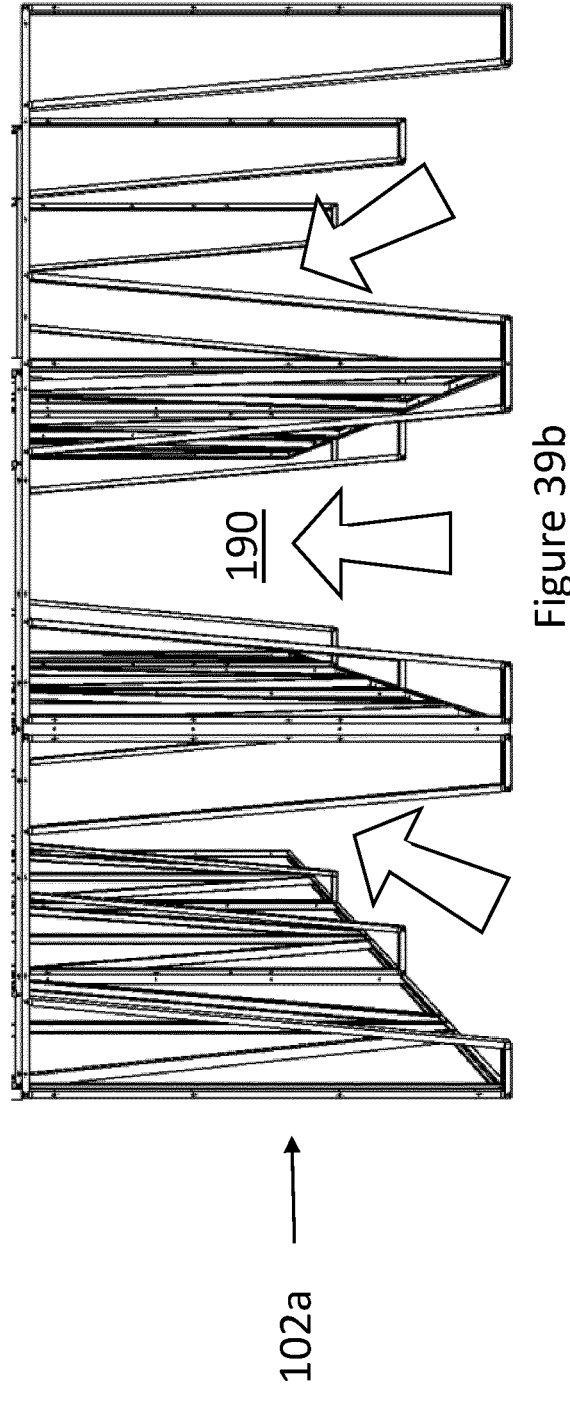
Figure 39C:
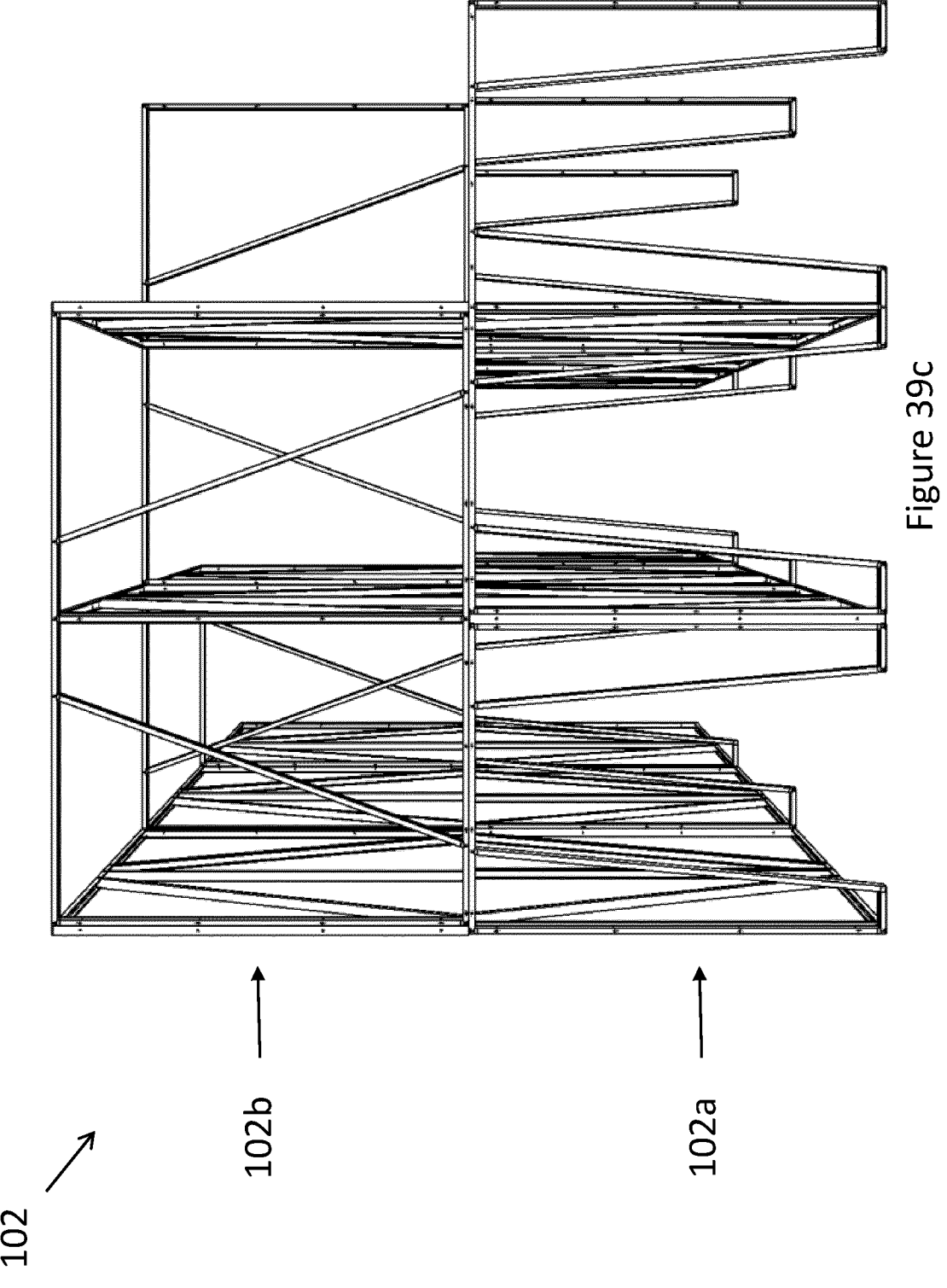

An embodiment of the supporting framework structure 102 is illustrated in FIGS. 39*a* to 39*c*. The supporting framework structure 102 comprises a lower layer 102*a* and an upper layer 102*b*. The prefabricated braced frames 114 in the lower layer 102*a* of the supporting framework structure comprise A-frames as described above with reference to FIGS. 37*a*, 37*b* and 38, whereas the prefabricated braced frames 114 in the upper layer 102*b* of the supporting framework structure are similar to those described in relation to FIGS. 16*a* to 16*d*.

The process of assembling the embodiment of the supporting framework structure 102 illustrated in FIGS. 39*a* to 39*c* occurs in stages. During the first stage (illustrated in FIG. 39*a*), the lower layer 102*a* of the supporting framework structure is assembled. During this stage the horizontal cross members 188 are in position, forming the cross members of the A-frames of the prefabricated braced frames. The prefabricated braced frames 114 of the lower layer 102*a* of the supporting framework structure are secured together suitable fasteners, e.g. bolts, rivets, welding, or adhesive.

Once the first stage of assembly is complete, the horizontal cross members 188 are removed from the lower layer 102*a* of the supporting framework structure. The removal of the horizontal cross members 188 creates access corridors to allow a vehicle to drive through the openings 190 in the prefabricated braced frames 114 of the lower layer 102*a* and into the centre of the supporting framework structure 102. FIG. 39*b* illustrates the lower layer 102*a*. The arrows inn FIG. 39*b* indicate the direction of travel of one or more vehicles into the access corridors.

The access corridors enable vehicles to complete the assembly of the upper layer 102*b* of the supporting structure. One or more vehicles drive into the access corridors, and an operator on an elevated platform is able to easily and safely reach the required height to secure the prefabricated braced frames 114 of the upper layer 102*b* to one another, and also to fit the track elements to the top of the prefabricated braced frames 114 of the upper layer 102*b*. FIG. 39*c* illustrates the supporting framework structure with both the lower layer 102*a* and the upper layer 102*b* assembled.

Although this example has been described with reference to a supporting structure with only two layers, a lower layer 102*a* and an upper layer 102*b*, it will be appreciated that the access corridors in the lowermost layer of the supporting structure enable further layers to be assembled. For example, a third layer 102*c* of prefabricated braced frames 114 may be assembled on top of the upper layer 102*b*, and the track elements may be fitted to the top of the prefabricated braced frames 114 of the third layer 102*c* to form a grid framework structure where the supporting stricture comprises three layers.

In this example the prefabricated modular panels 108 are prefabricated braced frames 114, but it will be appreciated that the idea of access corridors in the lower layer of a supporting framework structure is applicable to any kind of prefabricated modular panels 108, and not limited to prefabricated braced frames.

The invention claimed is:

1. A grid framework structure configured to support one or more robotic load handling devices thereupon, said grid framework structure comprising:

i) a grid structure lying in a horizontal plane, said grid structure including a first set of parallel grid members extending in a first direction and a second set of parallel grid members extending in a second direction, the second direction being substantially perpendicular to the first direction such that the first and second sets of parallel grid members are arranged in a grid pattern containing a plurality of grid cells or grid spaces;

ii) a track system mounted to, or integrated into, the grid structure, the track system including a plurality of tracks arranged in the grid pattern of the grid structure;

iii) a supporting framework structure for supporting the grid structure above ground to create one or more storage spaces for the storage of one or more containers in multiple stacks of containers such that, in operation, one or more load handling devices operative on the track system can lift one or more containers through a grid cell from one of the multiple stacks below the grid structure; and iv) a plurality of guides extending substantially vertically between the grid structure and a floor, the plurality of guides being arranged in a pattern for accommodating a plurality of stacks of storage containers between the plurality of guides and configured to guide the plurality of storage containers through a grid cell, wherein the supporting framework structure includes a plurality of prefabricated modular panels, wherein said prefabricated modular panels are load bearing such that, when assembled together, the assembled prefabricated modular panels form the supporting framework structure, providing a load bearing structure to support the one or more load handling devices moving on the grid structure, wherein said prefabricated modular panels are arranged in a three dimensional grid pattern including a first set of parallel prefabricated modular panels extending in the first direction and a second set of parallel prefabricated modular panels extending in the second direction to define a plurality of grid cells, each of the plurality of grid cells of the supporting framework structure being sized to support a subset of the plurality of grid cells of the grid structure, said subset including two or more grid cells of the grid structure, and wherein the assembly of the prefabricated modular panels generates the one or more open storage spaces for accommodating the multiple stacks of containers, a surface area of each of the one or more open storage spaces having a surface area so as to accommodate multiple of the plurality of grid cells of the grid structure.

2. The grid framework structure of claim 1, wherein one or more of the plurality of prefabricated modular panels comprises: an opening configured for a vehicle to enter within the grid framework structure.

3. The grid framework structure of claim 2, wherein the one or more of the plurality of prefabricated modular panels of the first and/or the second set is arranged such that their respective openings align to define an access corridor for a vehicle to enter within the grid framework structure.

4. The grid framework structure of claim 1, wherein one or more of the plurality of prefabricated modular panels comprises:

a prefabricated braced frame, said prefabricated braced frame including a plurality of parallel uprights extending in a common vertical plane and connected together by one or more bracing members lying in the common vertical plane of the plurality of parallel uprights.

5. The grid framework structure of claim 1, wherein two or more of the plurality of prefabricated modular panels comprise:

a prefabricated braced frame, and two or more of the prefabricated braced frames are assembled together by connecting one of the plurality of uprights of the prefabricated braced frame with one of the plurality of uprights of an adjacent prefabricated braced frame.

6. The grid framework structure of claim 4, wherein the one or more bracing members of the prefabricated braced frame comprises:

one or more horizontal and/or diagonal bracing members.

7. The grid framework structure of claim 6, wherein the one or more bracing members are arranged between the plurality of parallel uprights of the prefabricated braced frame in a cross-brace or a K-brace or a V-brace or an eccentric brace arrangement.

8. The grid framework structure of claim 6, wherein the one or more bracing members of the prefabricated braced frame comprises:

one or more horizontal and diagonal bracing members, and the one or more horizontal bracing members connects respective upper ends and/or lower ends of the plurality of uprights of the prefabricated braced frame such that the one or more diagonal bracing members extends between the horizontal bracing members at the upper and lower ends of the plurality of uprights.

9. The grid framework structure of claim 8, wherein at least a portion of the grid structure is mounted to the one or more horizontal bracing members connecting the upper ends of the plurality of uprights of at least a portion of the plurality of prefabricated braced frames.

10. The grid framework structure of claim 4, wherein the one or more bracing members are arranged to form an A-frame comprising:

diagonal bracing members joined by a horizontal bracing member.

11. The grid framework structure of claim 10, wherein the horizontal bracing member joining the diagonal bracing members is configured to be removable to form an opening for a vehicle to enter within the grid framework structure.

12. The grid framework structure of claim 4, wherein the plurality of prefabricated braced frames comprises:

a first type and a second type of prefabricated braced frame, the first type prefabricated braced frame including a different number of uprights relative to the second type prefabricated braced frame.

13. The grid framework structure of claim 1, wherein one or more of the plurality of prefabricated modular panels are configured of additive manufacture panels.

14. The grid framework structure of claim 1, wherein one or more of the prefabricated modular panels are configured as cast panels.

15. The grid framework structure of claim 1, wherein the first set of parallel prefabricated modular panels are subdivided into a first subset of parallel prefabricated modular panels and a second subset of parallel prefabricated modular panels, the first subset of parallel prefabricated modular panels being spaced apart from the second subset of parallel prefabricated modular panels in the second direction, and wherein the first set of parallel prefabricated modular panels are arranged such that the first subset of the first set of parallel prefabricated modular panels are offset from the second subset of the first set of parallel prefabricated modular panels by at least one grid cell of the supporting framework structure in the first direction.

16. The grid framework structure of claim 15, wherein the first and second subsets of the first set of parallel prefabricated modular panels are arranged in an alternating pattern.

17. The grid framework structure of claim 15, wherein the second set of parallel prefabricated modular panels is subdivided into a first subset of parallel prefabricated modular panels and a second subset of parallel prefabricated modular panels, the first subset of parallel prefabricated modular panels being spaced apart from the second subset of parallel prefabricated modular panels in the first direction, and wherein the second set of parallel prefabricated modular panels are arranged such that the first subset of the second set of parallel prefabricated modular panels are offset from the second subset of the second set of parallel prefabricated modular panels by at least one grid cell of the supporting framework structure in the second direction.

18. The grid framework structure of claim 17, wherein the first and second subsets of the second set of prefabricated modular panels are arranged in an alternating pattern.

19. The grid framework structure of claim 1, wherein the grid structure comprises:

a plurality of prefabricated modular sub-grid structures that are assembled together to form the grid structure, each of the plurality of prefabricated modular sub-grid structures including two or more grid cells.

20. The grid framework structure of claim 19, wherein each of the prefabricated modular sub-grid structures comprises:

a portion of the first set of grid members and a portion of the second set of grid members.

21. The grid framework structure of claim 1, wherein the track system comprises:

a plurality of interconnected modular track sections, each track section of the plurality of interconnected modular track sections including substantially perpendicular elements so as to provide a track surface extending in the first direction and the second direction.

22. The grid framework structure of claim 21, wherein the plurality of track sections are assembled in the track system such that adjacent modular track sections in the track system meet between areas of the grid structure where the first and second sets of grid members intersect or converge in the grid pattern.

23. The grid framework structure of claim 22, comprising:

a joint, wherein adjacent modular track sections are connected together by the joint which includes tapered edges.

24. The grid framework structure of claim 21, wherein each of the plurality of interconnected modular track sections is formed from plastic material.

25. The grid framework structure of claim 1, wherein the plurality of guides are arranged for guiding one or more storage containers in a stack along only a pair of diagonally opposing corners of the one or more containers.

26. The grid framework structure of claim 1, wherein each guide of the plurality of guides comprises: two perpendicular bin guiding plates extending between the grid structure and the floor for accommodating a corner of a storage container.

27. The grid framework structure of claim 1, wherein each guide of the plurality of guides comprises:

two perpendicular bin guiding plates extending between the grid structure and the floor for accommodating a corner of a storage container.

28. The grid framework structure of claim 24, wherein the at least portion of the plurality of guides comprises:

four guides, said four guides being symmetrically arranged about a centre point defined by the four guides such that the four guides are arranged for guiding corners of four adjacent storage containers.

29. The grid framework structure of claim 1, wherein the supporting framework structure comprises:

a lower layer of prefabricated modular panels and an upper layer of prefabricated modular panels, and the prefabricated modular panels of the lower layer and the prefabricated modular panels of the upper layer are attached together in a vertical configuration on top of one another.

30. A kit of parts for erecting a grid framework structure of claim 1, the kit comprising:

i) a plurality of prefabricated modular sub-grid structures suitable for being assembled together to form a grid structure including a first set of grid members extending in a first direction and a second set of grid members extending in a second direction, the second direction being substantially perpendicular to the first direction such that the first and second set of grid members are arranged in a grid pattern containing a plurality grid cells or grid spaces, each of the plurality of prefabricated modular sub-grid structures including a portion of the first set of grid members and a portion of the second set of grid members;

ii) a plurality of modular track sections, each modular track section of the plurality of modular track sections including transverse elements so as to provide a track surface extending in the first direction and the second direction such that, when connected together, the plurality of track sections form a track system configured for guiding one or more robotic load handling devices on the grid structure; and iii) a plurality of prefabricated modular panels suitable for being arranged in a three dimensional grid pattern containing a plurality of grid cells.

31. The kit of parts of claim 30, wherein at least a portion of the plurality of prefabricated modular panels comprises:

a plurality of prefabricated braced frames, each of the plurality of the prefabricated braced frames including parallel uprights extending in a common vertical plane connected together by one or more bracing members lying in a common vertical plane of the plurality of parallel uprights.

32. A storage and retrieval system in combination with a grid framework structure of claim 1, the storage and retrieval system combination, comprising:

a plurality of stacks of containers arranged in storage columns located below the track system, wherein each storage column is located vertically below a grid cell; and a plurality of load handling devices configured for lifting and moving containers stacked in the stacks, the plurality of load handling devices being configured to be remotely operated to move laterally on the track system above the storage columns to access the containers through the grid cells, each of said plurality of load handling devices including:

a) a wheel assembly for guiding the load handling device on the track system;

b) a container-receiving space located above the track system; and c) a lifting device configured and arranged to lift a single container from a stack into the container-receiving space.

\* \* \* \* \*